United States Patent
Takei et al.

(10) Patent No.: US 10,140,035 B2
(45) Date of Patent: Nov. 27, 2018

(54) METHOD FOR APPROPRIATELY CONTROLLING DUPLICATED VOLUMES IN VIRTUAL VOLUME SUBSYSTEMS

(71) Applicant: HITACHI, LTD., Tokyo (JP)

(72) Inventors: Tomohiro Takei, Tokyo (JP); Yohey Ishikawa, Tokyo (JP); Hideo Saito, Tokyo (JP); Ken Tokoro, Tokyo (JP); Keishi Tamura, Tokyo (JP); Tomohiro Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 15/121,875

(22) PCT Filed: Jun. 25, 2014

(86) PCT No.: PCT/JP2014/066768
§ 371 (c)(1),
(2) Date: Aug. 26, 2016

(87) PCT Pub. No.: WO2015/198412
PCT Pub. Date: Dec. 30, 2015

(65) Prior Publication Data
US 2017/0017421 A1 Jan. 19, 2017

(51) Int. Cl.
*G06F 3/06* (2006.01)
*G06F 12/00* (2006.01)
(Continued)

(52) U.S. Cl.
CPC .............. *G06F 3/0619* (2013.01); *G06F 3/06* (2013.01); *G06F 3/0659* (2013.01);
(Continued)

(58) Field of Classification Search
CPC ............ G06F 3/06; G06F 12/00; G06F 13/10; G06F 3/0619; G06F 3/0659; G06F 3/0665; G06F 3/0689; G06F 12/0868
(Continued)

(56) References Cited

U.S. PATENT DOCUMENTS

2004/0268038 A1   12/2004   Nagasoe et al.
2005/0160248 A1*   7/2005   Yamagami ............ G06F 3/0619
                                                                  711/170
(Continued)

FOREIGN PATENT DOCUMENTS

JP   2005-018568 A    1/2005
JP   2006-285388 A   10/2006

OTHER PUBLICATIONS

International Search Report of PCT/JP2014/066768 dated Sep. 16, 2014.

Primary Examiner — Pierre Miche Bataille
(74) Attorney, Agent, or Firm — Mattingly & Malur, PC

(57) ABSTRACT

A storage system according to one preferred embodiment of the present invention is composed of at least a first storage subsystem and a second storage subsystem. Write data from a host computer is duplicated to a first volume of the first storage subsystem and a second volume of the second storage subsystem, and the host computer is composed to be able to access both the first volume and the second volume. Attribute information which is information related to an order of write and/or write capability is set for each volume, and when an access command to the volume is received from the host computer, the storage subsystem determines whether I/O to the first volume and/or the second volume is required or not based on the attribute set for each volume.

13 Claims, 28 Drawing Sheets

(51) Int. Cl.
*G06F 13/10* (2006.01)
*G06F 12/0868* (2016.01)

(52) U.S. Cl.
CPC .......... *G06F 3/0665* (2013.01); *G06F 3/0689* (2013.01); *G06F 12/00* (2013.01); *G06F 13/10* (2013.01); *G06F 12/0868* (2013.01)

(58) Field of Classification Search
USPC .......................................... 711/170, 202, 203
See application file for complete search history.

(56) References Cited

U.S. PATENT DOCUMENTS

| | | | |
|---|---|---|---|
| 2006/0224845 | A1 | 10/2006 | Hiraiwa et al. |
| 2006/0282617 | A1 | 12/2006 | Nagasoe et al. |
| 2010/0095078 | A1* | 4/2010 | Yamagami ............... G06F 3/067 711/162 |
| 2011/0154102 | A1* | 6/2011 | Akutsu ............... G06F 11/2058 714/6.1 |
| 2012/0297292 | A1* | 11/2012 | Dougherty .......... G06F 17/2229 715/238 |
| 2013/0117516 | A1* | 5/2013 | Sobolewski ............ G06F 12/16 711/162 |
| 2013/0238852 | A1 | 9/2013 | Kawaguchi |
| 2014/0337562 | A1* | 11/2014 | Long .................... G06F 3/0659 711/103 |
| 2015/0121005 | A1* | 4/2015 | Deguchi ............... G06F 9/5027 711/114 |

* cited by examiner

| PORT ID (T301) | LUN (T302) | LDEV# (T303) | R-Ser# (T304) | VLDEV# (T305) | V-Ser# (T306) | I/O MODE (T307) R300-1 |
|---|---|---|---|---|---|---|
| 3e243174 aaaaaaaa | 0 | 0x2000 | 65000 | 0x1000 | 63500 | 0000 |
| | 1 | 0x2001 | 65000 | 0x2001 | 63500 | 0010 |
| | .. | .. | .. | | | |
| 3e243174 bbbbbbbb | 0 | 0x3000 | 65000 | | | 0100 |
| | .. | .. | .. | | | |
| .. | | | | | | |

T300-2

| PORT ID (T301) | LUN (T302) | LDEV# (T303) | R-Ser# (T304) | VLDEV# (T305) | V-Ser# (T306) | I/O MODE (T307) R300-2 |
|---|---|---|---|---|---|---|
| 3e582232 aaaaaaaa | 0 | 0x5000 | 66000 | 0x1000 | 63500 | 0000 |
| | 1 | 0x5001 | 66000 | 0x2001 | 63500 | 0010 |
| | .. | .. | .. | | | |
| 3e582232 bbbbbbbb | 0 | 0x4000 | 66000 | | | 0100 |
| | .. | .. | .. | | | |
| .. | | | | | | |

Fig. 4

| PAIR NUMBER (T401) | PAIR STATUS (T402) | PDKC# (T403) | P-VOL# (T404) | SDKC# (T405) | S-VOL# (T406) | RESTORATION FLAG (T407) | POSITION (T408) |
|---|---|---|---|---|---|---|---|
| 1 | 1 | 65000 | 0x2000 | 66000 | 0x5000 | 1 | 0x0020 |
| 2 | 1 | 65000 | 0x2001 | 66000 | 0x5001 | | |
| 3 | 0 | 65000 | 0x2002 | 66000 | 0x5002 | | |
| 4 | 0 | 65000 | 0x2003 | 66000 | 0x5003 | | |
| .. | .. | | .. | | | | |

T400

STATE:
1=mirror(pair)
0=suspend

Fig. 27
[STATE 1]
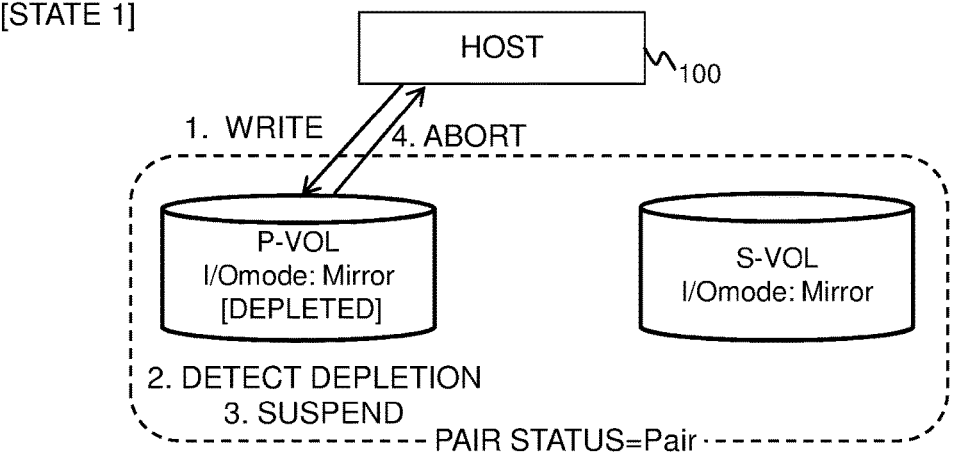
[STATE 2]
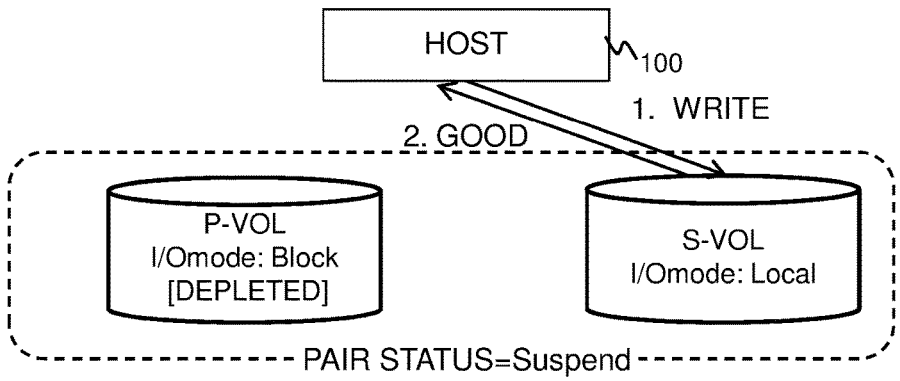
[STATE 3]
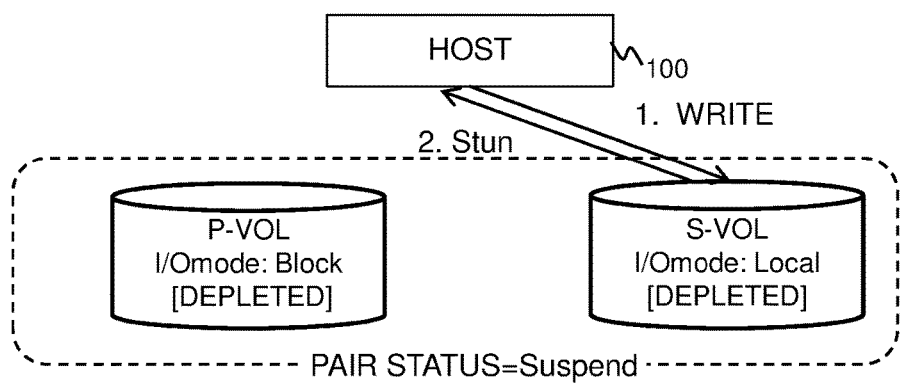

Fig. 28
[STATE 1']
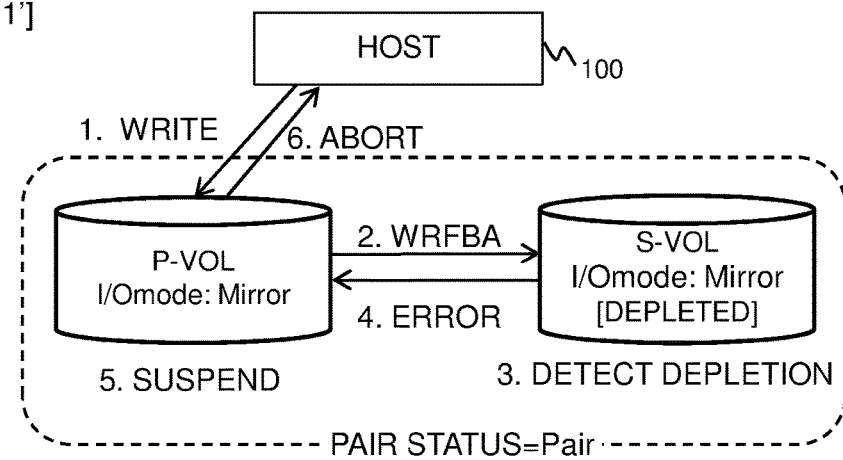
[STATE 2']
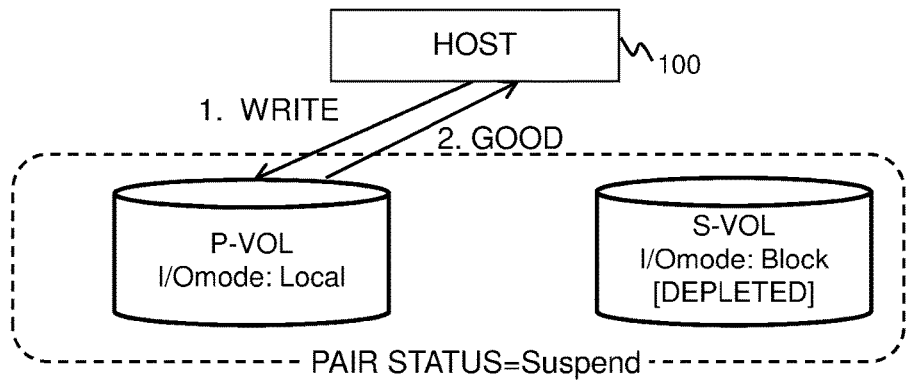
[STATE 3']
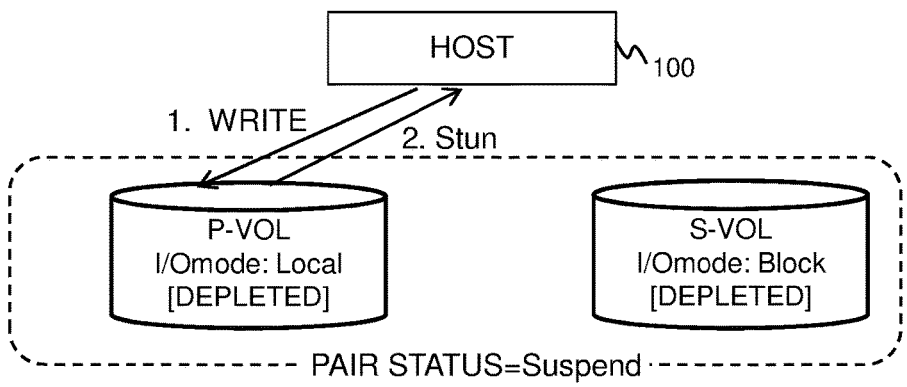

US 10,140,035 B2

METHOD FOR APPROPRIATELY CONTROLLING DUPLICATED VOLUMES IN VIRTUAL VOLUME SUBSYSTEMS

TECHNICAL FIELD

The present invention relates to a storage system.

BACKGROUND ART

Along with the rapid increase in the amount of electronic information handled in companies and other organizations, a large number of storage subsystems are introduced and operated in the IT systems of organizations. One of the drawbacks of introducing a large number of storage subsystems in a computer system is that the management costs by the administrator of the computer system are increased. The art of storage virtualization is adopted widely, in which multiple storages are enabled to be accessed virtually as a single storage with the aim to facilitate management of multiple storage subsystems.

As one embodiment for virtualizing storages, a configuration is proposed where multiple physical storage subsystems are provided to a superior system such as a host computer utilizing the storage subsystem as a single virtual storage subsystem. For example, Patent Literature 1 discloses an art related to a computer system in which multiple (such as two) physical storage subsystems are mutually connected via a network, and provided as volumes in a single virtual storage subsystem to the host computer.

CITATION LIST

Patent Literature

[PTL 1] United States Patent Application Publication No. 2013/0238852

SUMMARY OF INVENTION

Technical Problem

One of the objects for adopting a configuration as disclosed in Patent Literature 1 where multiple (such as two) physical storage subsystems are provided as a single virtual storage subsystem to a superior system is to enhance fault tolerance or to enable load distribution. For example, a configuration is considered where volumes are duplicated among two physical storage subsystems (hereinafter referred to as "subsystem A" and "subsystem B") constituting a virtual storage subsystem, wherein each of the duplicated volumes are recognized as an identical volume by the superior system. According to this configuration, when volumes within subsystem A cannot be accessed due to causes such as failure, operation can be continued by having the superior system access volumes within subsystem B which is the other physical storage subsystem. Further, when the access path to the volume of subsystem A is busy, the system can access the volume of subsystem B to suppress deterioration of access performances.

In that case, the method for processing I/O requests received from the superior system, such as the host compute, differs according to the state of the system or the state of the volume. For example, due to the failure of the access path between the superior system and the storage subsystem, the I/O request having been received by subsystem A can be received by subsystem B. The processes to be performed by the storage subsystem differ between the case where the I/O request is received by subsystem A and a case where the I/O request is received by subsystem B. However, regardless of which subsystem has received the I/O request, the state after having received the I/O request should be the same. Further, various states may occur, such as a state where the volumes are not being able to be duplicated, but in the prior art technique, there is no consideration on the processes to be performed in such various cases.

The object of the present invention is to provide a method for appropriately controlling duplicated volumes in virtual storage subsystems.

Solution to Problem

A storage system according to one preferred embodiment of the present invention is composed of at least a first storage subsystem and a second storage subsystem. A first volume of the first storage subsystem and a second volume of a second storage subsystem are managed as a volume pair where write data from a host computer are duplicated, and the host computer is configured to be able to access both the first volume and the second volume. Attribute information which is information related to a write order and/or a write propriety is set for each volume, and when an access command to a volume is received from the host computer, the storage subsystem determines whether I/O to the first volume and/or the second volume is required or not according to the attribute set for each volume.

Advantageous Effects of Invention

According to the present invention, appropriate processing can be performed to volumes duplicated among physical storage subsystems, regardless of the state of the system or the state of the volumes.

BRIEF DESCRIPTION OF DRAWINGS

FIG. 3 illustrates a content of a volume management table.

FIG. 4 illustrates a content of a pair management table.

FIG. 21 is a flowchart (5) of a process performed when an error occurs during processing of a WRITE command.

FIG. 27 is a view illustrating the change of state of the computer system when a physical storage area is depleted.

FIG. 28 is a view illustrating the change of state of the computer system when a physical storage area is depleted.

DESCRIPTION OF EMBODIMENTS

Now, a storage system according to a preferred embodiment of the present invention will be described with reference to the drawings. However, the present invention is not restricted to the preferred embodiments illustrated below.

Embodiment 1

(1) Configuration of Computer System

Figure 1:
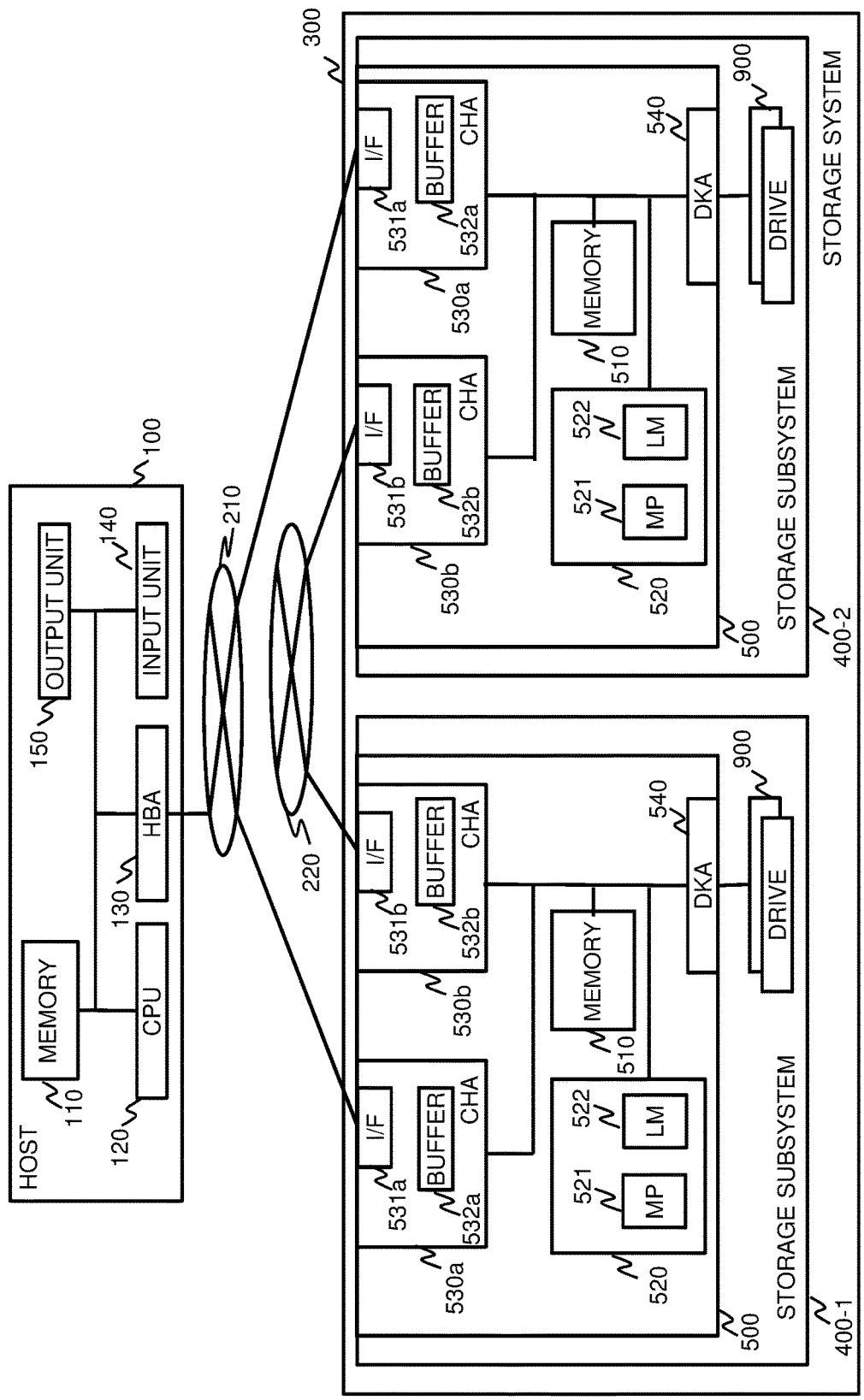
FIG. 1 is a configuration diagram of a storage system according to the preferred embodiment of the present invention.

FIG. 1 is a configuration view of a computer system according to a preferred embodiment of the present invention. A computer system is composed of a host computer 100 (hereinafter abbreviated as "host 100") and a storage system 300. The storage system 300 is composed of at least two storage subsystems 400-1 and 400-2. The host 100 is connected via a SAN (Storage Area Network) 210 to both storage subsystems 400-1 and 400-2.

We will now describe a hardware configuration of the storage subsystems 400-1 and 400-2. According to the storage system 300 of the present embodiment, the hardware configurations of both the storage subsystems 400-1 and 400-2 are the same. In the following description, when the storage subsystems 400-1 and 400-2 are referred to without distinguishing the two, they are referred to as the "storage subsystem 400". However, it is not necessary for the hardware configurations of the storage subsystems 400-1 and 400-2 to be the same.

The storage subsystem 400 is composed of a storage controller 500 having one or more channel adapters (CHA 530) (530*a* and 530*b*), one or more disk adapters (DKA) 540, one or more memory packages (memories) 510 and one or more MP packages (MPPK) 520, and one or more drives 900.

The CHA 530 has one or more interfaces (I/F) 531 for connecting with the host 100 or other storage subsystems 400, and it is a component for relaying control information and data transmitted to and received from the host 100 and other storage subsystems 400. In the storage subsystem 400 of the present embodiment, a command in compliance with standards defined by SCSI (Small Computer System Interface) (hereinafter called SCSI command) is used for communicating with the host 100. Therefore, in principle, the I/F 531 has a function to send and receive SCSI commands and accompanying information (such as write data, read data and response information) to/from the host 100.

The CHA 530 has a buffer 532 in addition to the I/F 531. The buffer 532 is a storage area for temporarily storing the control information and data relayed by the CHA 530, and it is formed of various volatile memories and nonvolatile memories. In FIG. 1, only two CHAs 530 (CHA 530*a* and CHA 530*b*) are illustrated in a single storage subsystem 400, but the number of CHAs 530 are not restricted thereto. Further, the number of I/Fs 531 are also not restricted to the illustrated example.

In FIG. 1, the CHA 530 connected to the host 100 is denoted as the CHA 530*a*, and the CHA connected to other storage subsystems 400 (such as the storage subsystem 400-2) is denoted as the CHA 530*b*. However, the hardware configuration of CHA 530*a* and CHA 530*b* are the same. Further, in FIG. 1, there is only a single transmission line connecting the host 100 and the storage subsystem 400-1 and only a single transmission line connecting the host 100 ad the storage subsystem 400-2, but it is also possible to have multiple transmission lines connecting the host 100 and the storage subsystem 400 to enhance fault tolerance. Further, there is only a single line connecting the storage subsystems 400-1 and 400-2 illustrated, but it is also possible to have multiple transmission lines connecting the same.

The DKA 540 has multiple interfaces (not shown) for connecting to the drives 900, and it is a component for relaying control information and data transmitted and received between the drives 900 and the memory 510 or the MPPK 520.

The MPPK 520 is composed of a processor (MP) 521, a local memory (LM) 522, and an internal bus and an internal port not shown. The MPPK 520 is a component for performing various data processing in the storage subsystem 400. The processing in response to various commands received from the host 100 described hereafter is carried out by the MP 521 executing programs in the LM 522.

In FIG. 1, only one MP 521 is illustrated, but it is possible to have multiple MPs 521 installed. When multiple MPs 521 are installed, the processes according to the various commands received from the host 100 described later can be executed by an arbitrary MP 521. The LM 522 can be composed using various volatile memories and nonvolatile memories.

The memory 510 is a component having a cache for temporarily storing the write data from the host 100 or the data read from the drive 900, and a shared memory for storing various control information. In the following, the area used as the cache in the memory 510 is called a cache area. Further, the area used as the shared memory for storing the control information is called a shared memory area. The memory 510 can be formed with a battery for preventing data loss in case power failure or other failure occurs, so as to retain the data in the memory 510 at the time of power failure.

The drive 900 is a storage device in which the write data from the host 100 is finally stored. As the storage media of the drive 900, magnetic storage media such as those used in HDDs, and nonvolatile semiconductor storage media such as NAND flash memories, MRAM, ReRAM and PRAM, can be used.

(2) Volume and Cache

The write data from the host 100 is finally stored in the drive 900, but the storage subsystem 400 according to the preferred embodiment of the present invention does not directly provide storage space of the drive 900 to the host 100. Instead, the storage subsystem 400 provides one or more volumes created via a known Thin Provisioning technique to the host 100. Hereafter, this volume provided to the host 100 is called a "logical volume". The storage subsystem 400 divides the storage space of the logical volume into fixed-size areas, and manages the same. This fixed-size area is called a "page". The size of the page is, as an example, 42 MB. Each page has one storage area of one or more drives 900 allocated dynamically thereto. In the following description, the storage area allocated to a page is called a "physical storage area".

The logical volume is a volume that can be defined freely by the user outputting a logical volume creating instruction from a management terminal (not shown) connected to the storage subsystem 400 or from the host 100 to the storage subsystem 400. However, at the point of time when the logical volume is defined, no storage area of the drive 900 is allocated to each page of the logical volume. When the host 100 issues a write request (write command) designating a certain address in a storage space of a logical volume to the logical volume, the storage subsystem 400 allocates a storage area that is not yet used (not yet allocated to any page) from the drive 900 the page corresponding to the designated address. Since the storage area of the drive 900 is dynamically allocated to a logical volume (page) as described above, at least in the initial state, the total storage capacity (size) of the drive 900 installed in the storage subsystem 400 can be smaller than the total size of the respective logical volumes. Then, after the operation of the storage subsystem 400 is started, the drives 900 can be added if necessary, so that the introduction cost can be cut down.

According further to the storage subsystem 400 of the embodiment of the present invention, a so-called write back cache method is adopted. Therefore, when a data update request such as a WRITE command is received from the host 100 to the logical volume, the subsystem allocates a partial area for storing the write data in the cache area, and at the point of time when the write data is stored in the allocated partial area, a response is returned to the host 100 notifying that the write process has completed. This process is a process that is normally performed in a storage subsystem having a disk cache.

In other words, at the point of time when the write data is stored in the cache area and a response notifying that the write processing has been completed is returned to the host 100, the state of the subsystem becomes substantially equivalent to the state where the data is stored in the logical volume. Therefore, in the following description, the portion stating that "data is written to the logical volume" does not necessarily mean that data is written to the drive 900. Even when the data is merely stored in the cache area and not yet written to the drive 900, it is stated that "data is written to the logical volume". In contrast, the process to "write data to the cache (such as a cache slot described later)" can be recognized that a process for storing data to the logical volume is substantially being performed.

Thereafter, the write data stored in the cache area is written (destaged) to the drive 900 asynchronously (at a given timing) with respect to the data update request from the host 100. However, the destaging process itself is a well-known process, so that the description thereof is omitted in the present description of preferred embodiments.

Now, we will describe the method for using the cache area in the storage subsystem 400 according to the preferred embodiment of the present invention. When temporarily storing the write data and the like from the host 100 to the cache area, the storage subsystem 400 allocates the unused area in the cache area as a partial area, and stores the write data to the allocated partial area. The minimum size of the partial area being allocated is a fixed size, and one example of the size is 256 KB. In the following description, this partial area having the minimum size is called a "cache slot" or a "slot".

Figure 2:
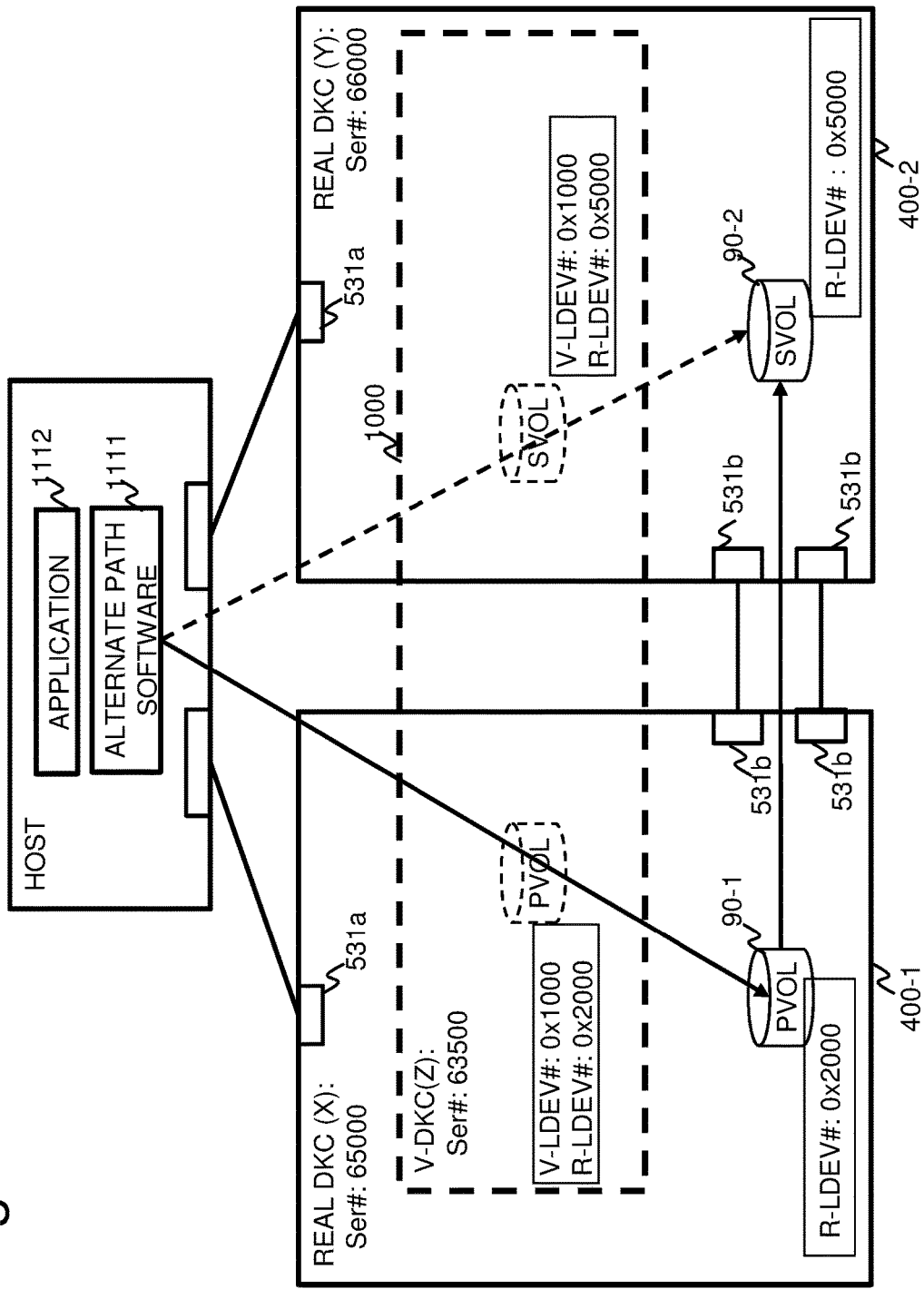
FIG. 2 is an explanatory view showing a concept of a virtual storage.

Next, with reference to FIG. 2, we will describe the relationship between the storage system 300 and the host 100 according to the preferred embodiment of the present invention. As mentioned earlier, the storage system 300 is composed of at least two storage subsystems 400, and each storage subsystem 400 is capable of defining the logical volume.

According to the storage system 300 of the present embodiment, in order to enhance the fault tolerance, in principle, the logical volume being accessed from the host 100 is replicated among two storage subsystems in the storage system 300 (storage subsystem 400-1 and storage subsystem 400-2). According to the configuration example shown in FIG. 2, the data written to the logical volume 90-1 in the storage subsystem 400-1 is also written to the logical volume 90-2 in the storage subsystem 400-2 (which is referred to as being "mirrored"). This replication process is executed by the MP 521 in the storage subsystems 400-1 and 400-2.

Hereafter, the function of replicating the contents of the logical volume executed by the MP 521 in the storage subsystems 400-1 and 400-2 is referred to as "mirroring function". Although the details will be described later, when mirroring data to two logical volumes, the order of writing data to two logical volumes is determined by a kind of attribute information set to the logical volume. The logical volume to which data is written first is called a primary volume (also referred to as P-VOL), and the logical volume to which data is written second is called a secondary volume (also referred to as S-VOL).

FIG. 2 illustrates an example where it is determined that the logical volume 90-1 is the P-VOL and the logical volume 90-2 is the S-VOL. Further, the attribute information showing the order for writing data to the logical volume 90-1 or the logical volume 90-2 (attribute information illustrating whether the volume is a P-VOL or an S-VOL) is stored in a pair management table T400 described later. When the storage subsystem 400 receives a command instructing update of a certain logical volume from the host 100, it is possible to specify the write order of the logical volume (whether the logical volume should be updated first or updated second) based on this attribute information.

Since the contents of the S-VOL (logical volume 90-2) is constantly controlled to be identical as the contents of the P-VOL (logical volume 90-1) by the mirroring function, the host 100 can access either the P-VOL or the S-VOL (the host can access identical data). Further, an S-VOL in which a replication of a certain P-VOL is stored is referred to as "volume in pair relationship with a P-VOL" or a "pair volume of a P-VOL". On the other hand, a P-VOL which is a logical volume storing a replication source data of a certain S-VOL is referred to as "volume in pair relationship with an S-VOL" or a "pair volume of the S-VOL". A set of the P-VOL and the S-VOL which is the pair volume of the P-VOL is referred to as "pair" or "volume pair".

Now, we will describe the outline of the process performed in the storage system 300 when the host 100 issues a WRITE command to the P-VOL in the storage subsystem 400-1. When the storage subsystem 400-1 receives the WRITE command and a data designated as the write target by the WRITE command (which is called a write data), the storage subsystem 400-1 stores the write data in the P-VOL, and thereafter, issues a command (WRFBA command described later) to the storage subsystem 400-2 for storing the write data to the S-VOL which is a pair volume. The WRFBA command and the write data is transmitted via the I/F (531b) of the storage subsystem 400-1 and the SAN 220 to the storage subsystem 400-2.

The storage subsystem 400-2 having received the WRFBA command stores the write data to the S-VOL. At the point of time when storing the write data to the S-VOL is completed, the storage subsystem 400-2 notifies the storage subsystem 400-1 that the storing the write data to the S-VOL is completed. In response to reception of this notice, the storage subsystem 400-1 returns a reply to the host 100 that the write process has been completed.

In contrast, we will describe the outline of the process performed in the storage system 300 when the host 100 issues a WRITE command to the S-VOL in the storage subsystem 400-2. When the storage subsystem 400-2 receives a WRITE command and a write data, the storage subsystem 400-2 issues a command (WRFBA command) to the storage subsystem 400-1 to store the write data to the P-VOL. The storage subsystem 400-1 having received this command stores the write data to the P-VOL. At the point of time when storing the write data to the P-VOL is completed, the storage subsystem 400-1 notifies the storage subsystem 400-2 that the storing the write data to the P-VOL has been completed. In response to receiving this notice, the storage subsystem 400-2 stores the write data to the S-VOL. After storing the write data to the S-VOL is completed, the storage subsystem 400-2 responds to the host 100 that the write processing has been completed.

That is, even when a WRITE command to the S-VOL is received, similar to when a WRITE command to the P-VOL is received, the storage system 300 first stores data to the P-VOL, and thereafter stores data to the S-VOL. When the storage system 300 receives the WRITE command, it performs processes according to this flow to maintain the contents of the P-VOL and the S-VOL to be identical. However, although the details will be described later, there are cases where control to make the contents identical may not be performed according to the state of the attributes set to the P-VOL or the S-VOL.

The above description illustrated an example where the P-VOL exists in the storage subsystem 400-1 and the S-VOL exists in the storage subsystem 400-2, but it is also possible to adopt a configuration where the P-VOL exists in the storage subsystem 400-2 and the S-VOL exists in the storage subsystem 400-1. Also according to that case, the write data from the host 100 is first stored in the P-VOL and thereafter stored in the S-VOL. Moreover, when there are multiple logical volumes existing in the storage subsystem 400 (such as the storage subsystem 400-1), there is no restriction stating that all logical volumes must be P-VOLs (or not all logical volumes must be S-VOLs), and it is possible to have P-VOLs and S-VOLs exist in a mixture within the storage subsystem 400.

Further, it is not necessary that all logical volumes within the storage subsystem 400-1 (or 400-2) are in pair relationship with the logical volumes within the storage subsystem 400-2 (or 400-1) (a logical volume not in a pair relationship may exist in the storage subsystem 400). However, according to the present embodiment, we will mainly describe the process performed by the storage subsystem 400 when it receives an I/O command to a volume in pair relationship.

As described above, the host 100 is capable of accessing the same data by accessing either the P-VOL (logical volume 90-1) or the S-VOL (logical volume 90-2) in pair relationship. However, the host 100 is not required to recognize whether the logical volume 90-1 and the logical volume 90-2 are volumes storing the same data or not. This is because the storage system 300 according to the preferred embodiment of the present invention has a function to make the host 100 recognize the logical volume 90-1 in the storage subsystem 400-1 and the logical volume 90-2 in the storage subsystem 400-2 as if they are the identical volume. This function will be described below.

The storage subsystem 400 has a function to have one or multiple virtual storage subsystems (hereinafter, it is referred to as virtual storage) that differs from the physical storage subsystem, such as the storage subsystem 400, seem to be existing in the SAN 210. This function is called a "virtual storage function" according to the preferred embodiment of the present invention. With reference to FIG. 2, we will describe an example where a virtual storage is defined in the storage subsystem 400.

The virtual storage has a subsystem serial number (Ser #). Hereafter, the subsystem serial number of the virtual storage is referred to as "virtual serial number". Further, in response to an instruction from a user, the virtual storage can have one or more logical volumes belong to the storage subsystem 400. FIG. 2 illustrates a configuration example where a serial number of the storage subsystem 400-1 is 65000, a serial number of the storage subsystem 400-2 is 66000, and a serial number of the defined virtual storage is 63500. Further according to FIG. 2, the storage subsystem 400-1 has a logical volume 90-1 and the storage subsystem 400-2 has a logical volume 90-2.

An identifier (identification number) that is unique within the storage subsystem 400 is assigned to each logical volume in the storage subsystem 400, and this number is referred to as "LDEV #" or "R-LDEV #". In the example of FIG. 2, the R-LDEV# of the logical volume 90-1 is 0x2000 ("0x2000" means "2000" in hexadecimal), and the R-LDEV # of the logical volume 90-2 is 0x5000.

Here, it is assumed that the logical volume 90-1 and the logical volume 90-2 are made to belong to the virtual storage based on the instruction from a user. In that case, in addition to the R-LDEV #, a unique number within the virtual storage can be assigned to the logical volume 90-1 and the logical volume 90-2. In the present embodiment, this number is called "virtual LDEV #" or "V-LDEV #". This number is a number that can be arbitrary set by the user (however, the V-LDEV # assigned to each logical volume must be unique within the virtual storage). In the example of FIG. 2, the V-LDEV # assigned to the logical volume 90-1 and the logical volume 90-2 belonging to the virtual storage is both set to 0x1000.

On the other hand, in the configuration of FIG. 2, an alternate path software 1111 is operating in the host 100. According to the alternate path software 1111, when there are multiple access paths (called paths) existing from the host 100 to the logical volume, the software has a function to recognize the paths, and when accessing the logical volume, it selects a path to be used. For recognizing the paths, the alternate path software 1111 issues a command to acquire the identification information of volumes, such as an INQUIRY command defined via SCSI standards, to the logical volume recognized by the host 100, to thereby acquire the identification information of the volume.

When the storage subsystem 400 receives an INQUIRY command with respect to a logical volume, it is configured to return a subsystem serial number and an R-LDEV # as identification information of the volume. Further, when the logical volume being the target of inquiry by the INQUIRY command belongs to a virtual storage, the subsystem has a function to return a subsystem serial number of the virtual storage and the V-LDEV # as identification information of the volume. In the configuration of FIG. 2, when the storage subsystem 400-1 receives an INQUIRY command with respect to a logical volume 90-1, the storage subsystem returns (subsystem serial number=63500, V-LDEV#=0x1000) as identification information of the logical volume 90-1. Similarly, when the storage subsystem 400-2 receives an INQUIRY command with respect to the logical volume 90-2, the storage subsystem returns (subsystem serial number=63500, V-LDEV #=0x1000) as identification information of the logical volume 90-2.

In other words, since the identical volume identification information is returned from the logical volume 90-1 and the logical volume 90-2 to the alternate path software 1111, the alternate path software 1111 recognizes the logical volume 90-1 and the logical volume 90-2 as identical volumes. As a result, it is determined that the alternate path of the path from the host 100 to the logical volume 90-1 (solid line arrow in the drawing; hereinafter, this path is referred to as "path 1") is a path from the host 100 to the logical volume 90-2 (dotted line arrow in the drawing; hereinafter, this path is referred to as "path 2"). In case path 1 is cut off due to failure or other causes and the host 100 cannot access the logical volume 90-1, if the alternate path software 1111 receives an access request from an application program 1112 or the like to the logical volume 90-1, the alternate path software 1111 issues an access request via path 2 (in other words, it issues an access request to the logical volume 90-2). As mentioned earlier, even when the alternate path software 1111 issues an access request to the logical volume 90-2, since identical data as the logical volume 90-1 is stored in the logical volume 90-2, operation can be performed without any problem.

Figure 5:
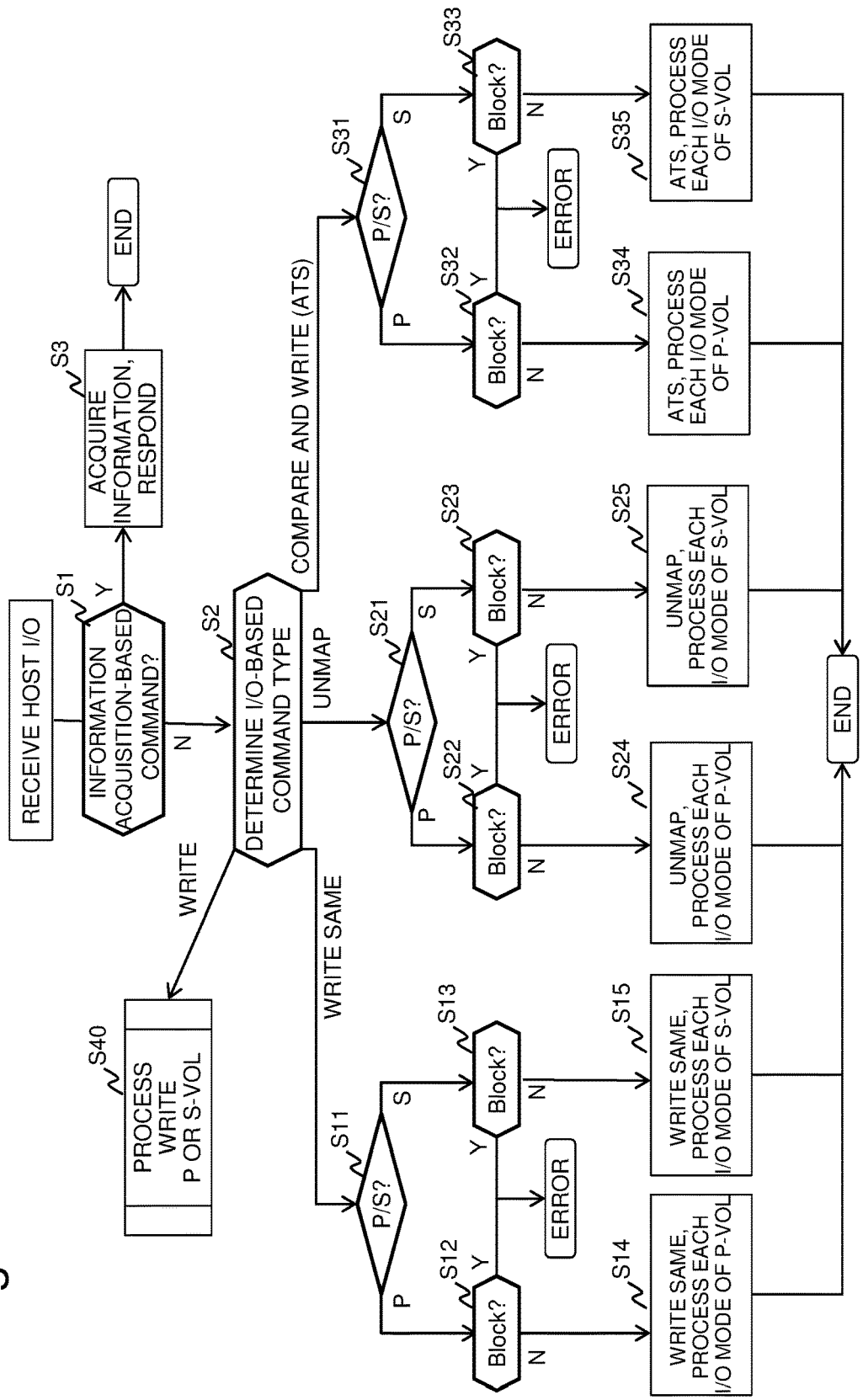
FIG. 5 is a view illustrating an overall flow of I/O processing.

With reference to FIGS. 3 through 5, we will describe the management information necessary for realizing a virtual storage function and a mirroring function.

When the host 100 accesses a logical volume by issuing a WRITE command and the like, at least a LUN (logical unit number) and an identifier of the I/F 531 (port ID) are designated as information for uniquely specifying the logical volume. Therefore, the storage subsystem 400 according to the preferred embodiment of the present invention assigns a LUN and a port ID to the logical volume which is accessed from the host 100. Then, the storage subsystem 400 manages the corresponding relationship between the logical volume and the LUN and port ID assigned to the logical volume by storing them in a volume management table T300.

FIG. 3 illustrates an example of the volume management table T300. The volume management table T300 is stored in a shared memory area in the memory 510 of the storage subsystem 400. Further, in FIG. 3, a table T300-1 on an upper portion and a table T300-2 on a lower portion are both volume management tables, wherein the table T300-1 is a volume management table managed by the storage subsystem 400-1, and the table T300-2 is a volume management table managed by the storage subsystem 400-2.

Both tables are tables including items T301 through T307 described below, so that in the following description, if there is no need to distinguish the tables T300-1 and T300-2, they are referred to as "volume management table T300", and if it is necessary to distinguish the two tables, table T300-1 is referred to as "volume management table T300-1". Further, only the information related to the logical volumes within the storage subsystem 400-1 is stored in the table T300-1, and only the information related to the logical volumes within the storage subsystem 400-2 is stored in the table T300-2.

We will now describe the respective items of the volume management table T300. Each row of the volume management table T300 shows information of a single logical volume. The R-LDEV # of the logical volume is stored in LDEV (T303), and the serial number (Ser #) of the storage subsystem in which the logical volume exists is stored in R-Ser # (T304) (in the following description, the serial number of the storage subsystem in which the logical volume exists is referred to as "serial number of a logical volume").

Port ID (T301) and LUN (T302) are fields storing the port ID and the LUN assigned to the logical volume. Further, when a logical volume belongs to a virtual storage, the virtual LDEV # set to the logical volume is stored in VLDEV # (T305), and the virtual serial number of the virtual storage to which the logical volume belongs is stored in V-Ser # (T306) (hereinafter, in order to prevent the notation from being redundant, the virtual serial number of the virtual storage to which the logical volume belongs is referred to as "virtual serial number of a logical volume").

I/O mode (T307) is one type of attribute information showing the states of the logical volume, such as whether write is possible or not, and the specific contents thereof will be described later.

In the example of FIG. 3, the V-LDEV # of the logical volume stored in row (R300-1) of the volume management table T300-1 is 0x1000, and the virtual serial number thereof is 63500. Further, the V-LDEV # of the logical volume stored in row (R300-2) of the volume management table T300-2 is also 0x1000, and the virtual serial number thereof is 63500.

Therefore, when the host 100 inquires the information of a logical volume by issuing an INQUIRY command regarding the logical volume stored in row (R300-1) of the volume management table T300-1 to the storage subsystem 400-1 (at this time, the host 100 issues an INQUIRY command by designating a port ID (3e243174 aaaaaaaa) and a LUN (0)), the MP 521 of the storage subsystem 400-1 refers to the volume management table T300-1, and returns the information on the VLDEV # (T305) and the V-Ser # (T306) of the logical volume being the target of inquiry. Similarly, when the host 100 inquires the information of a logical volume by issuing an INQUIRY command regarding the logical volume stored in the row (R300-2) of the volume management table T300-2 to the storage subsystem 400-2, the MP 521 of the storage subsystem 400-2 refers to the volume management table T300-2, and returns the information of the VLDEV # (T305) and the V-Ser # (T306) of the logical volume being the target of inquiry. As a result, (the alternate path software 1111 of) the host 100 recognizes that the two logical volumes are identical.

Next, with reference to FIG. 4, we will describe a pair management table, which is a table managed when executing a mirroring function. Similar to the volume management table, the pair management table T400 is stored in a shared memory area of the storage subsystem 400. Further, the pair management table T400 is a table that both the storage subsystem 400-1 and the storage subsystem 400-2 have. In the following description, similar to the volume management table T300, when it is necessary to distinguish the pair management tables T400 of the storage subsystem 400-1 and the storage subsystem 400-2, each of them is referred to as pair management table T400-1 and pair management table T400-2. In contrast, if it is not necessary to distinguish the tables, they are referred to as pair management table T400.

The pair management table T400 is a table for managing the information of volume pairs, wherein each row represents the information of one volume pair. Each volume pair is managed by having an identification number called pair number assigned thereto, and this pair number is stored in pair number (T401). An R-LDEV # of a logical volume, which is the P-VOL, is stored in P-VOL # (T404). A subsystem serial number of a logical volume specified by the P-VOL # (T404) is stored in PDKC # (T403). Further, an R-LDEV# of the volume (S-VOL) in pair relationship with the logical volume specified by P-VOL # (T404) is stored in S-VOL (T405), and a subsystem serial number of the logical volume specified by the S-VOL # (T405) is stored in SDKC # (T406).

Information related to a status of a volume pair is stored in pair status (T402). Hereafter, we will describe the pair status. A process performed when data is written from the host 100 to a volume pair has been described above, and in the above description, an example has been explained where the data written to the P-VOL is constantly replicated into the S-VOL. However, in actual operation, there may occur a state or the like where replication cannot be executed, depending on the status of the storage subsystem 400, or on the status of a SAN 220, which is the transmission path between the storage subsystems 400-1 and 400-2. The storage subsystem 400 manages the status of the volume pair, and performs a process according to the status of the volume pair upon executing data accesses (such as writing of data) to the P-VOL or the S-VOL.

In the present embodiment, the state where the contents of the P-VOL and the S-VOL coincide is referred to as "Pair" state. When the status of a certain volume pair is Pair, "1" is stored in pair status (T402) of the pair management table T400. Then, when a command (WRITE command etc.) instructing a P-VOL or an S-VOL of a volume pair whose pair status is Pair to update data is received from the host 100, both the P-VOL and the S-VOL are updated. For example, when a WRITE command and a write data to an P-VOL or an S-VOL is received, the write data is written to both the P-VOL and the S-VOL (duplicated).

On the other hand, it is possible to set a state where data will not be duplicated in the P-VOL and the S-VOL constituting a volume pair. The pair status of the volume pair in that state is called "Suspend" state. When the pair status is Suspend, "0" is stored in pair status (T402) of the pair management table T400. When the pair status is Suspend, when a command (such as a WRITE command) to instruct data update to the P-VOL or S-VOL of the volume pair is received, only either one of the P-VOL or the S-VOL is updated.

One example of a case where the pair status is set to Suspend state is that failure occurs to the P-VOL or the S-VOL and data access (such as read and write) to the P-VOL or the S-VOL cannot be performed. In that case, the storage subsystem 400 autonomously transits the pair status from "Pair" to "Suspend". However, there are cases where the pair status is changed by the user of the storage subsystem 400 issuing an instruction to change the pair status (such as from Pair to Suspend) to the storage subsystem 400 from a host or a management terminal.

When the contents of the P-VOL and the S-VOL become partially inconsistent since failure occurs during writing of data to the logical volume, "1" is stored in a restoration flag (T407). Further, at that time, information on the area where the contents of the P-VOL and the S-VOL are inconsistent (such as the logical block address (LBA)) is stored in position (T408). The specific method of use will be described later.

Next, we will describe an I/O mode (T307) managed by the volume management table T300. As mentioned earlier, the I/O mode is a kind of attribute information showing the state of whether write of the logical volume is possible or not, for example, wherein when the storage subsystem 400 receives a data update request such as a WRITE command and the like from the host 100 to the P-VOL or the S-VOL, it performs processes considering the I/O mode in addition to the pair status.

There are at least four types of attributes set as the I/O mode, which are "Mirror", "Local", "Remote" and "Block". When the I/O mode of a certain logical volume is "Mirror" attribute, "0001" (binary notation) is stored in the field of I/O mode (T307) of that logical volume. Further, when the I/O mode of a certain logical volume is "Mirror", "Local", "Remote" or "Block", "0010", "0100" or "1000" is stored in the field of I/O mode (T307) of that logical volume, respectively. The I/O mode set for a single logical volume is limited to one of "Mirror", "Local", "Remote" and "Block" (in other words, two I/O modes, such as Local and Block, will not be set).

When the I/O mode of a certain logical volume is "Mirror", it means that the logical volume is in a state capable of replicating data between the pair volume. When the I/O mode of a certain logical volume is "Mirror", the pair status of the volume pair composed of the logical volume and a pair volume therewith is "Pair".

When the I/O mode of a certain logical volume is "Local", when a data update request (such as a WRITE command) to the logical volume is received, only the relevant logical volume is updated. Data update of the pair volume of the relevant logical volume will not be performed.

When the I/O mode of a certain logical volume is "Remote", update of the relevant logical volume will not be performed even when a data update request regarding the relevant logical volume is received. Instead, data update is performed to a pair volume of the relevant logical volume.

When the I/O mode of a certain logical volume is "Block", update of the relevant logical volume will not be performed even when a data update request to the relevant logical volume is received, and an error is returned to the device (such as the host 100) having issued the data update request.

The I/O mode can also be autonomously changed by the storage subsystem 400 according to the status of the storage subsystem 400 or the like, similar to the pair status, but it is also possible for the user of the storage subsystem 400 to issue an instruction from the host 400 or the management terminal to change the I/O mode.

In the present embodiment, an example has been described where the storage subsystem 400 stores the management information in tables called the volume management table T300 and the pair management table T400, but the management information is not necessarily managed by a data structure of a table. The management information can be managed using a data structure other than tables.

Further, a portion of the information managed by the pair management table T400 can be managed by the volume management table T300. For example, information for identifying whether a certain logical volume is a P-VOL or an S-VOL (such as P-VOL # (T404) or S-VOL (T406)) is stored in the pair management table T400. However, information for identifying whether a certain logical volume is a P-VOL or an S-VOL can also be regarded as a kind of attribute information set in the logical volume. Therefore, it is possible that the information showing whether the logical volume is a P-VOL or an S-VOL is stored in the I/O mode (T307) of the volume management table T300.

Hereinafter, the information stored in the I/O mode (T307) of the volume management table T300 and the information for identifying whether the logical volume is a P-VOL or an S-VOL (P-VOL # (T404), S-VOL (T406) and so on) are collectively referred to as "volume attribute information".

Now, when the MP 521 of the storage subsystem 400 receives an access command (such as a WRITE command) with respect to a certain logical volume from the host 100, it refers to the volume management table T300 and the pair management table T400 stored in the shared memory area of the own subsystem to specify the volume attribute information of the access target logical volume and the attribute of the access target logical volume (whether it is a P-VOL or an S-VOL). Then, the MP 521 performs processes according to the attribute of the specified volume. The volume management table T300 and the pair management table T400 referred to at this time are tables of the own subsystem, and the tables of other subsystems are not referred to (in other words, the MP 521 of the storage subsystem 400-1 operate by referring to the volume management table T300 and the pair management table T400 managed within the storage subsystem 400-1, and it will not refer to the table stored in the storage subsystem 400-2). However, management is performed so that the contents stored in the volume management table T300 and the pair management table T400 managed in both the storage subsystem 400-1 and the storage subsystem 400-2 are not in an inconsistent state. For example, when a certain logical volume is managed as a P-VOL in pair management table T400-1, the same logical volume is also managed as a P-VOL in pair management table T400-2.

(3) Flow of Command Processing

Next, we will describe the flow of the process performed in the storage subsystem 400 when a command is received from the host 100. In the present embodiment, the flow of the process performed in the storage subsystem 400 will be described of a case where the following commands are received from the host 100.

(a) GET LBA STATUS
(b) LOG SENSE
(c) WRITE SAME
(d) UNMAP
(e) COMPARE AND WRITE
(f) WRITE

Commands (a) through (f) listed above are all SCSI-standard commands, so that only the points related to the embodiments of the present invention will be mainly described, and the detailed description of specification will be omitted. Commands (a) and (b) are also referred to as information acquisition type commands in the present specification. Information acquisition type commands are used when the host 100 wishes to acquire the status of a logical volume and the like. Command (a) is a command used when the host 100 inquires the status of a designated LBA, and specifically, it is a command for inquiring whether a physical storage area is allocated to the designated LBA and the like. Command (b) is used when the host 100 inquires the status of a designated logical volume, such as the capacity.

Since commands (c) through (0 are commands used when the host 100 performs processes related to I/Os, especially related to update, to a logical volume, they are called "I/O-based command" or "update-based command" in the present specification. The WRITE SAME command of (c) is used when the host 100 writes identical data to the whole given area (one block or greater) in a logical volume. Information for specifying an area in a logical volume (specifically, the LUN which is the information for specifying the logical volume, and LBA and data length which are information for specifying the area in the logical volume specified by the LUN) is designated as the command parameter, and further, one block of data is designated as the write data (hereinafter, this one block of data being designated is referred to as "pattern data"). The storage subsystem 400 having received this command writes the designated pattern data to all the designated areas. For example, if all zero data (data where all the bits within a block are zero) is designated, the storage subsystem 400 writes 0 to the whole designated area.

The UNMAP command of (d) is used when the host 100 wishes to unmap the given area of a logical volume (described later).

We will now describe the unmap operation. The data written to the logical volume by a user (or the host 100) may become unnecessary for the user (or the host 100) when a certain period of time has elapsed. Here, we will assume a case where all the data in a certain page (we will call it page A) in a logical volume has become unnecessary. In that case, the physical storage area can be effectively utilized by setting the physical storage area having been allocated to page A to a state where it is not allocated to page A, and then allocating the physical storage area to a different page.

The storage subsystem 400 according to the preferred embodiment of the present invention has a function to change the page where a physical storage area is allocated into a state where the physical storage area is not allocated. In the preferred embodiment of the present invention, this function is called unmap function. Further, the page being in a state where a physical storage area is not allocated is called an "unmapped state". Further, the operation for changing a page into an unmapped state is called "unmapping" or "cancellation of page allocation".

The storage subsystem 400 executes unmapping in response to receiving an UNMAP command from the host 100. The user (or the host 100) issuing an UNMAP command can designate one or multiple information of areas to be unmapped (area specified by LUN, LBA and data length) as UNMAP command parameters.

However, the minimum unit of the area capable of being designated by the UNMAP command is one block (which is a minimum access unit when the host 100 executes reading or writing of data of a volume in the storage subsystem 400, and the size can be, for example, 512 bytes). On the other hand, according to the storage system 300 of the present embodiment, the size of a page in a logical volume is, for example, 42 MB, which is greater than the size of a block. Therefore, UNMAP of a whole page may not be performed by only one UNMAP command issued from the host 100.

Therefore, when an UNMAP command is received, the storage subsystem 400 of the preferred embodiment of the present invention writes "0" to all the area designated by the parameter of the UNMAP command. Further, the storage subsystem 400 has a function for recognizing the area storing "0" out of the areas within a page (more accurately, the "physical storage areas allocated to a page", but it is described as the "areas within a page" to prevent redundant description) (or a function to determine, for each page, whether 0 is stored in all areas within a page). When an UNMAP command is received once or more than once, and as a result of performing a process to write "0" to the area designated by the UNMAP command, at the point of time when it is recognized that "0" is stored in all areas of a page, the storage subsystem 400 performs a cancellation of page allocation of the page.

The COMPARE AND WRITE command of (e) is sometimes referred to as ATS (Atomic Test and Set) command. Information for specifying an area in a logical volume (LUN, LBA and data length) is designated as the command parameter. In addition to the commands, there are two types of data being transmitted from the host 100 to the storage subsystem 400, which are a compare data and a write data. The storage subsystem 400 having received the COMPARE AND WRITE command compares the data in the area of the logical volume designated by the parameter with the compare data having been transmitted. Then, as a result of the comparison, when the contents of the data in the area of the logical volume are identical to the compare data, the write data will be written, but if not, the write processing will not be performed. Further, from the time when the data comparison process is started to when the writing of write data is completed, the area designated by the parameter will be locked. That is, data access to that area by other processes will be prohibited.

Command of (f) (WRITE command) is used when the host 100 writes designated data to a given area in the logical volume. In general, when the host 100 writes data to the logical volume based on an instruction from the application 1112, it issues the WRITE command to the storage subsystem (however, when a data of a given pattern (such as all zero, all 1 and the like) is written to a given area in the logical volume, such as when the data stored in a given range of the logical volume should all be erased, the WRITE SAME command of (c) is issued). As the command parameter, information for specifying an area in the logical volume (LUN, LBA and data length) is designated. Further, data having the same size as the length of the designated area is transmitted as the write data.

Hereafter, we will describe the process performed when the storage subsystem 400 receives one of the commands described above from the host 100. At first, the overall flow of the process will be described with reference to FIG. 5. When the storage subsystem 400 receives a command, at first, the MP 521 of the storage subsystem 400 determines whether the received command is an information acquisition type command or not (S1), and if the received command is an information acquisition type command, performs the processes of S3 and thereafter.

(3-a, 3-b) Operation regarding Information Acquisition Type Command (GET LBA STATUS, LOG SENSE)

In S3, the MP 521 performs further analysis of the command type, and for example, if the command type is GET LBA STATUS, it performs a process to acquire the LBA state designated by the command parameter (such as if a physical storage area is allocated thereto), and to return the information to the host 100. Further, if the command type is LOG SENSE, it returns the information of the logical volume or the storage subsystem 400 designated by the command parameter. In other words, when the storage subsystem 400 receives an information acquisition type command, it performs a process to return the information of the logical volume or the storage subsystem 400 designated by the command parameter to the command issue source (such as the host 100) without considering the I/O mode or the pair status of the logical volume.

On the other hand, when it is determined in S1 that the command is not an information acquisition type command (S1:N), the processes of S2 and thereafter are performed. In S2, the MP 521 determines the command type, and performs one of the processes of S11, S21, S31 or S40 according to the command type. If the command is WRITE SAME, the MP 521 performs the processes of S11 and thereafter, and if the command is UNMAP, the MP 521 performs the processes of S21 and thereafter. If the command is ATS, the MP 521 performs the processes of S31 and thereafter, and if the command is WRITE, the MP 521 performs the processes of S40 and thereafter.

Further, the storage subsystem 400 may receive a command that is not one of the commands described above (such as a READ command, which is a command used for reading the data stored in the logical volume). In that case, such as when a READ command is received, the storage subsystem 400 executes a read processing of the logical volume, but the description of such processes will be omitted in the present specification.

In the following, we will describe the process performed in the determination of S2, when the command is WRITE SAME, UNMAP, ATS or WRITE. In the following description, unless stated otherwise, the flow of the process where an error has not occurred during the processing in the storage subsystem 400 will be described.

Figure 19:
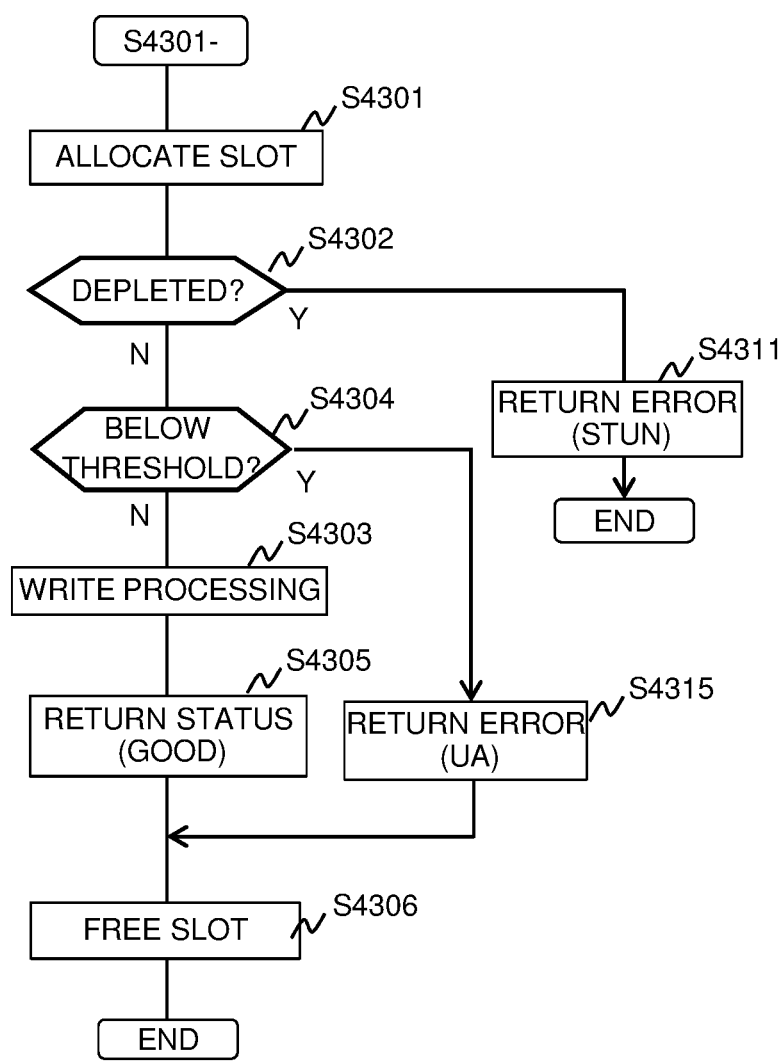
FIG. 19 is a flowchart (2) of a process performed when an error occurs during processing of a WRITE command.

In the determination of S2, when the command is WRITE SAME, UNMAP, ATS or WRITE, in any case, the MP 521 first refers to the volume management table T300, and converts the port ID and the LUN designated by the command to a logical volume number (R-LDEV#). Then, it refers to the pair management table T400, and determines whether the logical volume (access target volume) specified by the converted logical volume number is a P-VOL or an S-VOL (S11, S21, S31, S41. S41 is not illustrated in FIG. 5, but is illustrated in FIG. 19). This is because the process to be performed differs depending on whether the access target volume is a P-VOL or an S-VOL.

Thereafter, the MP 521 refers to the volume management table T300, and determines whether the status (I/O mode) of the access target volume is Block or not (S12, S13, S22, S23, S32, S33, S42, S43). If the status of the access target volume is Block, the MP 521 returns an error to the host 100, and ends the process. If the status of the access target volume is not Block, the process of S14, S15, S24, S25, S34, S44 or S45 will be performed.

(3-c) WRITE SAME Command

Figure 6:
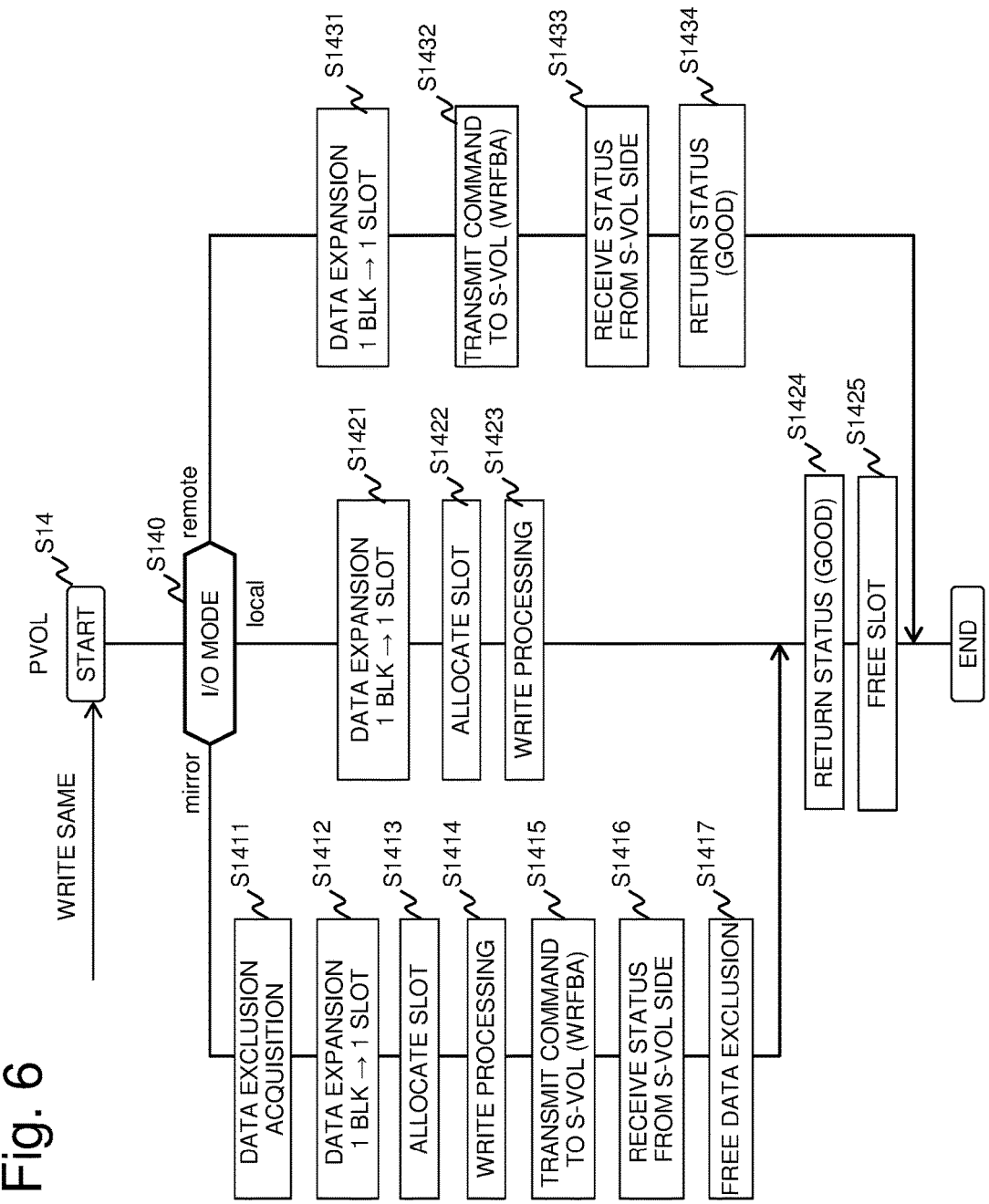
FIG. 6 is a flowchart (1) of a process according to a WRITE SAME command.

With reference to FIG. 6, we will describe the flow of the process performed by the storage subsystem 400 when the storage subsystem 400 receives a WRITE SAME command, and the volume designated as the access target volume in the command is a P-VOL. In the following description, as an example, we will describe an example where the P-VOL exists in the storage subsystem 400-1 and the volume in pair relationship with the P-VOL (S-VOL) exists in the storage subsystem 400-2. Unless stated otherwise, the processes described in the following description are executed by the MP 521 of the storage subsystem 400-1 (storage subsystem in which the P-VOL exists).

At first, the MP 521 refers to the volume management table T300, and determines the I/O mode of the access target volume (S140). Hereafter, we will describe the cases where the I/O mode is Local, Remote, or Mirror. In the following description, unless stated otherwise, the range of the access target area of the logical volume designated by the WRITE SAME command corresponds to a single slot.

When the I/O mode is Local, the MP 521 allocates a data area corresponding to a single slot in the LM 522. Then, it writes the write data (corresponding to a single block) designated by the WRITE SAME command to all the allocated area (S1421). For example, if the designated write data is all 1 (where all the bits within a single block is "1"), "1" is written to all the bits in the allocated area. Further, an area corresponding to a single slot is also allocated in the buffer 532a of the CHA 530a, so as to copy the data stored in the area allocated in the LM 522 to the area allocated in the buffer 532a.

In the following description, the process performed here, that is, the process for writing a data corresponding to a single block designated by the WRITE SAME command to the whole area corresponding to a single slot in the buffer 532, is called "data extension processing". Further, the above description has explained an example where the data corresponding to a single slot created by the data extension processing is formed in the buffer 532a of the CHA 530a, but it is also possible to create the data in an area other than the buffer 532a. For example, the present invention is also effective when the data is created in the LM 522.

Thereafter, the MP 521 allocates an unused area corresponding to a single slot in the cache area (S1422). This process is a well-known process executed in a storage subsystem having a disk cache. Further, in the following description, this process (process of allocating an unused area corresponding to one-slot or multiple-slots in the cache area) is referred to as "slot allocation processing" or "cache slot allocation processing". Further, if the range of the access target area of the logical volume designated by the WRITE SAME command is a range corresponding to multiple slots, the MP 521 allocates multiple slots.

In S1423, the MP 521 writes the data stored in the area allocated in the buffer 532a in S1421 to the unused area corresponding to a single slot in the cache area allocated in S1422. By doing this, the same data (designated by the WRITE SAME command) will be stored in the whole range of the access target area in the logical volume designated by the WRITE SAME command.

When the process of S1423 is ended, the MP 521 returns a response to the host 100 stating that the process corresponding to the WRITE SAME command has been ended normally (S1424). Based on SCSI standards, when a process has been ended normally, "GOOD" status is returned to the host 100. On the other hand, when the process was not ended normally since an error occurred during the process, "CHECK CONDITION" status is returned to the host 100. Therefore, in the following description, the state where the storage subsystem 400 returns a response to the host 100 stating that the process had been ended normally is noted as "returning a GOOD status".

Thereafter, the cache slot allocated in S1422 is freed (S1425), and the process is ended.

On the other hand, in the determination of S140, when it is determined that the I/O mode is Remote, the processes of S1431 and thereafter are executed. In S1431, the MP 521 executes a data extension processing. This process is the same as S1421.

Thereafter, in S1432, the MP 521 refers to the pair management table T400, and identifies the subsystem serial number and the LDEV# of the volume (S-VOL) in pair relationship with the access target volume. Then, a command instructing to write the data created in S1431 to the S-VOL is issued to the storage subsystem 400 in which the S-VOL exists (the storage subsystem 400-2). In the embodiment of the present invention, the command issued here is referred to as WRFBA command.

The WRFBA command is a command only effective among storage subsystems 400. The contents performed by the storage subsystem 400 having received the WRFBA command is similar to the case where the WRITE command is received, wherein a process is performed to store the designated data in a designated area (LBA) of the logical volume. Therefore, in the process of S1432, the storage subsystem 400-2 having received the WRFBA command being transmitted from the storage subsystem 400-1 performs a process to write data to the S-VOL. This process will be described in detail later.

Further, the WRFBA command is a command instructing to write data corresponding to a single slot. Therefore, when writing to an area corresponding to multiple slots is instructed by the WRITE SAME command, writing data to the S-VOL is instructed to the storage subsystem 400-2 by issuing WRFBA commands for multiple times. Further, the WRFBA command and the write data are transmitted via the I/F (531b) and the SAN 220 to the storage subsystem 400-2.

Figure 25:
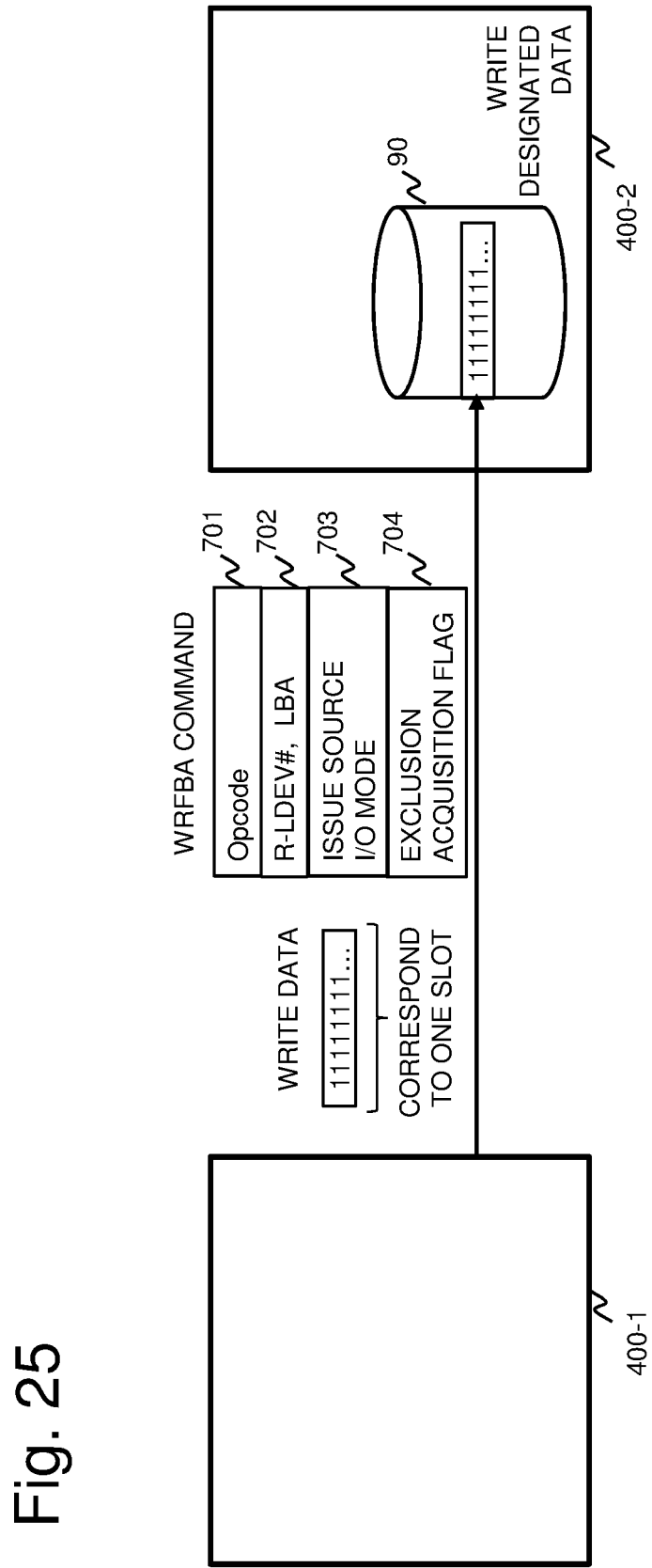
FIG. 25 is a view illustrating a format of a WRFBA command.

An example of a format of the WRFBA command used in the storage subsystem 400 according to the preferred embodiment of the present invention is illustrated in FIG. 25. The WRFBA command includes an operation code (also referred to as Opcode or OPEcode) 701, a write position information 702, an issue source I/O mode 703, and an exclusion acquisition flag 704. It can also include other information.

The operation code 701 is a one-byte code (such as 0xDA) showing that the transmitted command is a WRFBA command. The write position information 702 is information specifying the area of the logical volume being the target of writing the write data, which includes an LDEV # and a logical block address (LBA) of the logical volume. The storage subsystem 400 having received the WRFBA command performs a process to store the write data to an area corresponding to a single slot from the LBA of the logical volume specified in the write position information 702.

Further, the issue source I/O mode 703 is information of an I/O mode of a logical volume in pair relationship with the logical volume specified by the write position information 702. That is, when instructing data write to the S-VOL of the command issue destination storage subsystem 400 (400-2), the storage subsystem 400 issuing the WRFBA command (assuming that it is storage subsystem 400-1) creates a WRFBA command containing information of the I/O mode of the P-VOL stored in its own subsystem (storage subsystem 400-1), and transmits it to the storage subsystem 400-2. The method for using this information will be described in detail later.

Either 0 or 1 is stored in the exclusion acquisition flag 704. When 1 is stored therein, the storage subsystem 400 having received the WRFBA command performs the data exclusion acquisition processing described later before performing the write processing to the logical volume. The storage subsystem 400 creates a command where the exclusion acquisition flag 704 is set to "1" only when the write target logical volume by the WRFBA command is P-VOL and the I/O mode of the P-VOL is "Mirror". Therefore, in S1432, a command where 0 is set to the exclusion acquisition flag 704 is created and transmitted.

When data write to the S-VOL is completed in the storage subsystem 400-2, it returns a response notifying that the process has been completed to the storage subsystem 400-1. In S1433, the MP 521 of the storage subsystem 400-1 receives a response from the storage subsystem 400-2 (conversely, after the storage subsystem 400-1 has issued a WRFBA command in S1432, it waits until a response is returned from the storage subsystem 400-2).

As mentioned earlier, when a write to an area corresponding to multiple slots is instructed with the WRITE SAME command, the MP 521 issues WRFBA commands multiple times to the storage subsystem 400-2 in which the S-VOL exists. More precisely, the MP 521 performs S1432 (issuing of WRFBA command) and S1433 (receiving of response from storage subsystem 400-2) for multiple times.

When the MP 521 receives a response that the process has been completed in S1433, the MP 521 returns a GOOD status to the host 100 (S1434). This process is the same process as S1424. After returning the GOOD status to the host 100, the MP 521 ends the process.

We will now describe a case where the I/O mode is Mirror. When the I/O mode is Mirror, data is written to both the P-VOL and the S-VOL. Therefore, data write to the logical volume is performed both in the storage subsystem 400-1 where the P-VOL exists and in the storage subsystem 400-2 where the S-VOL exists. The order of writing data is determined so that the write to the P-VOL is performed first and then to the S-VOL. In the following description, a case is described where the range of the access target area of the logical volume designated by the WRITE SAME command is a size corresponding to multiple slots.

In S1411, the MP 521 locks the whole range of the access target area of the logical volume designated by the WRITE SAME command. This process is called "data exclusion acquisition processing" in the present specification. By performing this process, the whole range of the access target area of the logical volume is prohibited from being accessed by other processes (such as a process for performing read or write of the relevant range) until a data exclusion freeing process described later is performed.

According to the example illustrated here, since the data exclusion acquisition processing is executed in the storage subsystem 400 (400-1) in which the P-VOL exists, the area of the P-VOL is locked by the data exclusion acquisition processing. However, the write to a logical volume whose I/O mode is Mirror is performed at first in the P-VOL. Therefore, even when a write request (such as a WRITE command) from the host 100 to the S-VOL has been received immediately after executing S1411, at first, the write processing to the P-VOL is started. At that time, since the area of the P-VOL is subjected to exclusion by the execution of S1411, the write request (such as the WRITE command) from the host 100 to the S-VOL is kept waiting (in other words, a state where other processes cannot access the volume pair can be maintained until the process related to the WRITE SAME command is completed).

The same processes as S1421 through S1423 mentioned earlier is performed in S1412 through S1414. That is, the MP 521 executes a data extension processing, a cache slot allocation processing, and a data write processing to the cache area. However, in S1413, if the range of the access target area of the logical volume has a size corresponding to multiple slots, multiple cache slots are allocated.

In S1415 and S1416, the same processes as S1432 and S1433 described earlier are performed. Thereby, writing of data to the S-VOL is performed, and a response from the storage subsystem 400-2 in which the S-VOL exists will be returned.

Here, data is written one slot at a time. Therefore, the processes of S1414 through S1416 will be performed one slot at a time (that is, if eight slots worth of data write is instructed by the WRITE SAME command, the processes of S1414 through S1416 will be repeated eight times).

After receiving a process complete response from the storage subsystem 400-2 (S1416), the MP 521 (storage subsystem 400-1) frees the lock of the area locked in S1411 (S1417). In the following description, this process is referred to as "data exclusion freeing process". Thereafter, the MP 521 executes the processes of S1424 and S1425, and ends the process. In the slot freeing process performed in S1425, all the cache slots allocated in S1413 are freed.

Figure 7:
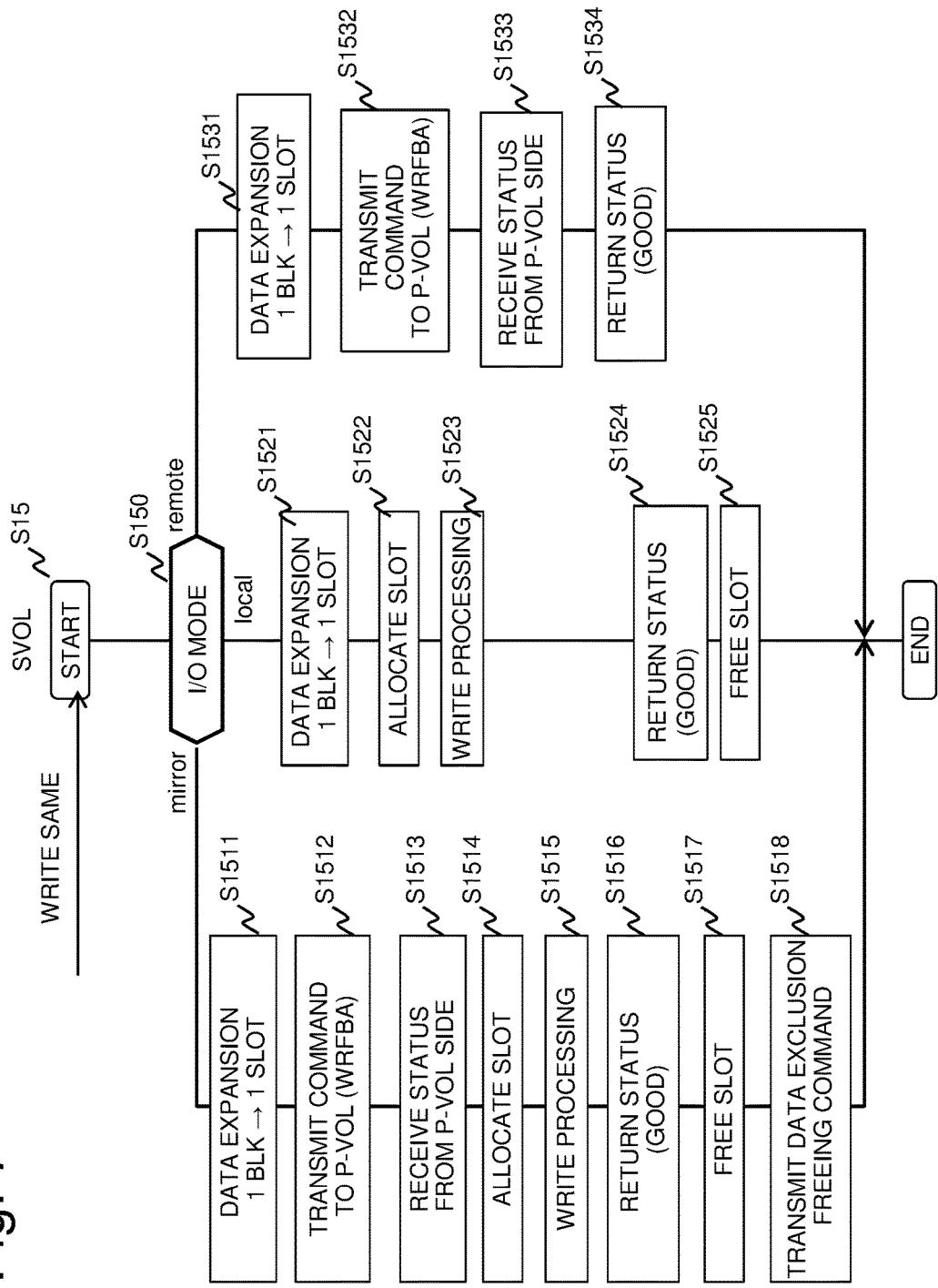
FIG. 7 is a flowchart (2) of a process according to a WRITE SAME command.

Next, with reference to FIG. 7, we will describe the flow of the processes performed in the storage subsystem 400 in a case where the storage subsystem 400 has received a WRITE SAME command and where the volume designated as the access target volume by the command is S-VOL. Similar to the description of FIG. 6, in the following process, we will describe an example where the P-VOL exists in the storage subsystem 400-1 and the volume (S-VOL) in pair relationship with the P-VOL exists in the storage subsystem 400-2. Unless stated otherwise, the following processes are executed by the MP 521 of the storage subsystem 400-2 (the storage subsystem in which the S-VOL exists).

At first, the MP 521 refers to the volume management table T300, and determines the I/O mode of the access target volume (S150). Hereafter, we will describe the cases where the I/O mode is Local, Remote, or Mirror. In the following, unless stated otherwise, we will describe a case where the range of the access target area of the logical volume designated by the WRITE SAME command corresponds to a single slot.

When the I/O mode is Local (S150: Local), the MP 521 writes data to the S-VOL by performing the processes of S1521 through S1525. The processes of S1521 through S1525 are the same as the processes of S1421 through S1425 in FIG. 6, so the description thereof will be omitted.

On the other hand, in the determination of S140, if it is determined that the I/O mode is Remote, the processes of S1531 and thereafter are executed. At first, the MP 521 performs the data extension processing (S1531). This process is the same as S1421 or S1431. However, the data corresponding to a single slot created by the data extension processing will be stored in the buffer 532b, that is, the buffer 532b of the CHA 530b connected to the storage subsystem 400-1 via the SAN 220. However, as a different embodiment, it is possible to store the created data in the LM 522, and to read and transmit the created data from the LM 522 when transmitting data to the P-VOL (storage subsystem 400-1).

Next, in S1532, the MP 521 refers to the pair management table T400, and identifies the subsystem serial number and the R-LDEV # of the volume (P-VOL) in pair relationship with the access target volume. Based on these information, the WRFBA command is created, and the WRFBA command and the data created in S1531 are transmitted to the storage subsystem in which the P-VOL exists (storage subsystem 400-1). Then, the MP 521 waits until a response is returned from the storage subsystem 400-1.

In S1533, when the MP 521 of the storage subsystem 400-2 receives a response from the storage subsystem 400-1, the MP 521 returns GOOD status to the host 100 (S1534). This process is the same as S1434. After returning the GOOD status to the host 100, the MP 521 ends the process.

Further, if it is determined in S150 that the I/O mode is Mirror, the processes of S1511 and thereafter are performed.

At first, in S1511, the MP 521 performs the data extension processing (which is the same process as S1531). Thereafter in S1512, the MP 521 creates a WRFBA command, transmits the WRFBA command and the data created in S1511 to a volume (P-VOL) in pair relationship with the access target volume, and waits for a response to be returned from the storage subsystem 400 in which the P-VOL exists (storage subsystem 400-1) (S1513). These processes are similar to S1532 and S1533. However, they are different from S1532 in that "1" is set to the exclusion acquisition flag 704 of the WRFBA command created in S1512.

When a response is received from the storage subsystem where the P-VOL exists (storage subsystem 400-1) (S1513), the MP 521 writes data to the S-VOL by performing the processes of S1514 through S1517. The processes of S1514 through S1517 are the same as the processes of S1522 through S1525.

Lastly, the MP 521 transmits a data exclusion freeing command to the storage subsystem 400 in which the P-VOL belongs (storage subsystem 400-1) (S1518), and ends the process. The details will be described later, but when an WRFBA command has been issued to the storage subsystem 400-1 (storage subsystem in which the P-VOL belongs) in S1512, data exclusion acquisition processing will be performed in the storage subsystem 400-1. Then, after writing to the S-VOL is completed, the storage subsystem 400-2 transmits the data exclusion freeing command to have the storage subsystem 400-1 execute the data exclusion freeing process. Similar to the WRFBA command, the data exclusion freeing command is a command that is only communicated among storage subsystems 400. The access target area information of the logical volume whose lock should be freed is included in the data exclusion freeing command, and the storage subsystem 400 having received the data exclusion freeing command frees the lock of the access target area of the logical volume based on the information.

Figure 8:
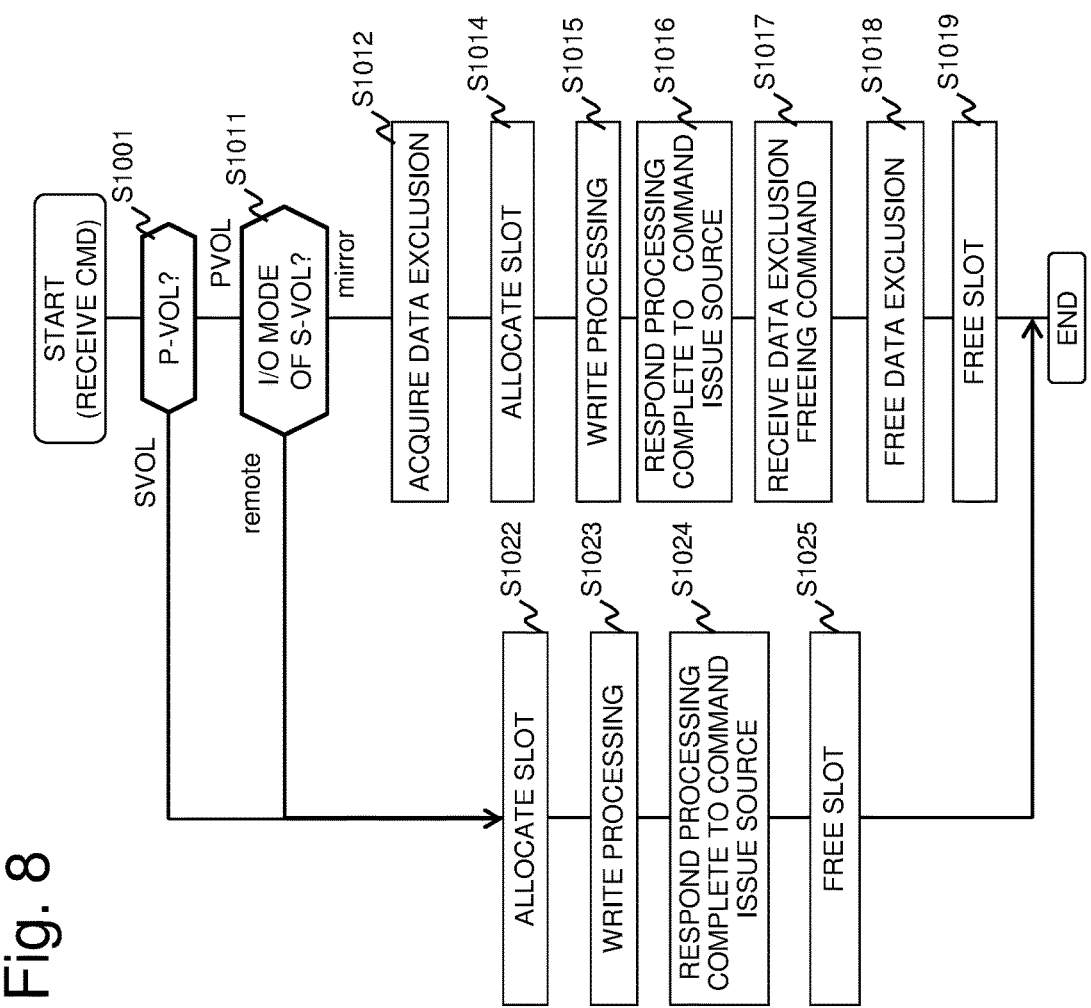
FIG. 8 is a flowchart of a process according to a WRFBA command.

Next, with reference to FIG. 8, we will describe the flow of the process performed when the storage subsystem 400 receives the WRFBA command.

When the storage subsystem 400 receives the WRFBA command, the MP 521 refers to the pair management table T400, and determines whether the access target logical volume is a P-VOL or an S-VOL (S1001). If the access target logical volume is a P-VOL, the MP 521 identifies the I/O mode of the pair volume (S-VOL) of the access target volume (S1011). Since the I/O mode of the pair volume is included in the parameter of the WRFBA command (issue source I/O mode 703), the MP 521 performs determination of S1011 by referring to the issue source I/O mode 703.

In S1011, if the I/O mode of the pair volume is Mirror, the MP 521 performs the processes of S1012 and thereafter. In S1012, it refers to the exclusion acquisition flag 704 included in the WRFBA command, and if the exclusion acquisition flag 704 is "1", it locks (acquires data exclusion of) the access target area.

Thereafter, in S1014, the MP 521 executes the cache slot allocation processing, and in S1015, the MP 521 writes the write data to the cache slot. Then, the MP 521 sends a response notifying that the process has been completed to the storage subsystem 400 which is the issue source of the WRFBA command (S1016). Then, it waits for a new instruction to arrive from the storage subsystem 400 being the issue source of the WRFBA command.

In S1017, when the MP 521 receives a data exclusion freeing command from the storage subsystem 400 being the issue source of the WRFBA command, the MP 521 executes freeing of data exclusion (S1018). Thereafter, the MP 521 frees the cache slot reserved in S1014 (S1019), and ends the process.

If the access target area is not an area corresponding to a single slot but an area extending across multiple slots (n slots, for example), the processes of S1012 through S1019 are executed for n times.

If the I/O mode of the pair volume is Remote in S1011, or if the access target logical volume is an S-VOL in S1001, the MP 521 performs the processes of S1022 through S1025. The processes of S1022 through S1025 are respectively the same processes as S1014 through S1016 and S1019, so they will not be described in detail.

The above description has illustrated the processes performed when the storage subsystem 400 has received a WRITE SAME command. According to the processes described above, prior to writing the data to the access target area in the logical volume (more precisely, it should be stated that data is written to the cache area allocated for the access target area, but as mentioned earlier, since the write operation to the logical volume is substantially completed at the point of time when the write data is stored in the cache area, it is described in this manner), a data extension processing is performed by writing the write data corresponding to a single block transmitted with the WRITE SAME command to the area in the buffer 532*a* corresponding to a single slot, and expanding the write data corresponding to a single block to a single slot.

However, if there is a frequently used type of data, such as a case where all zero is frequently used as the write data, an area corresponding to a single slot where all zero is written is prepared in the buffer 532 or the LM 522, and when writing all zero to the access target area in the logical volume, the prepared data (all zero) of an area corresponding to a single slot can be read and written to the access target area so as to cut down the data extension processing.

Therefore, according to the storage subsystem 400 of the present embodiment, an area corresponding to a single slot where all zero is written thereto is prepared in the buffer 532 (532*a* and 532*b*). Then, the MP 521 determines whether the write data transmitted together with the WRITE SAME command is all zero or not, and if it is all zero, the MP 521 writes the data of an area corresponding to a single slot (that is, all zero data corresponding to a single slot) prepared in the buffer 532 into the cache area without executing the data extension processing (for example, S1411, S1421, S1431 of FIG. 7, S1511, S1521, S1531 of FIG. 8, and so on).

Modified Example

According to the flow of the process described above, when data designated by the WRITE SAME command is written from the storage subsystem 400-1 to a volume in the storage subsystem 400-2 (or when data designated by the WRITE SAME command is written from the storage subsystem 400-2 to a volume in the storage subsystem 400-1), the WRFBA command had been used. However, the WRFBA command is a command that requires data having the same size as the data write range to be transmitted, even when the same contents is to be written throughout the whole area. Therefore, as a modified example of the embodiment described above, we will describe an example of defining and using a command (hereafter, this command is referred to as "WRITE SAME propagation command") where the same data is written to all the data write range by transmitting only a small portion (such as one block) of the write data, similar to the WRITE SAME command.

Figure 26:
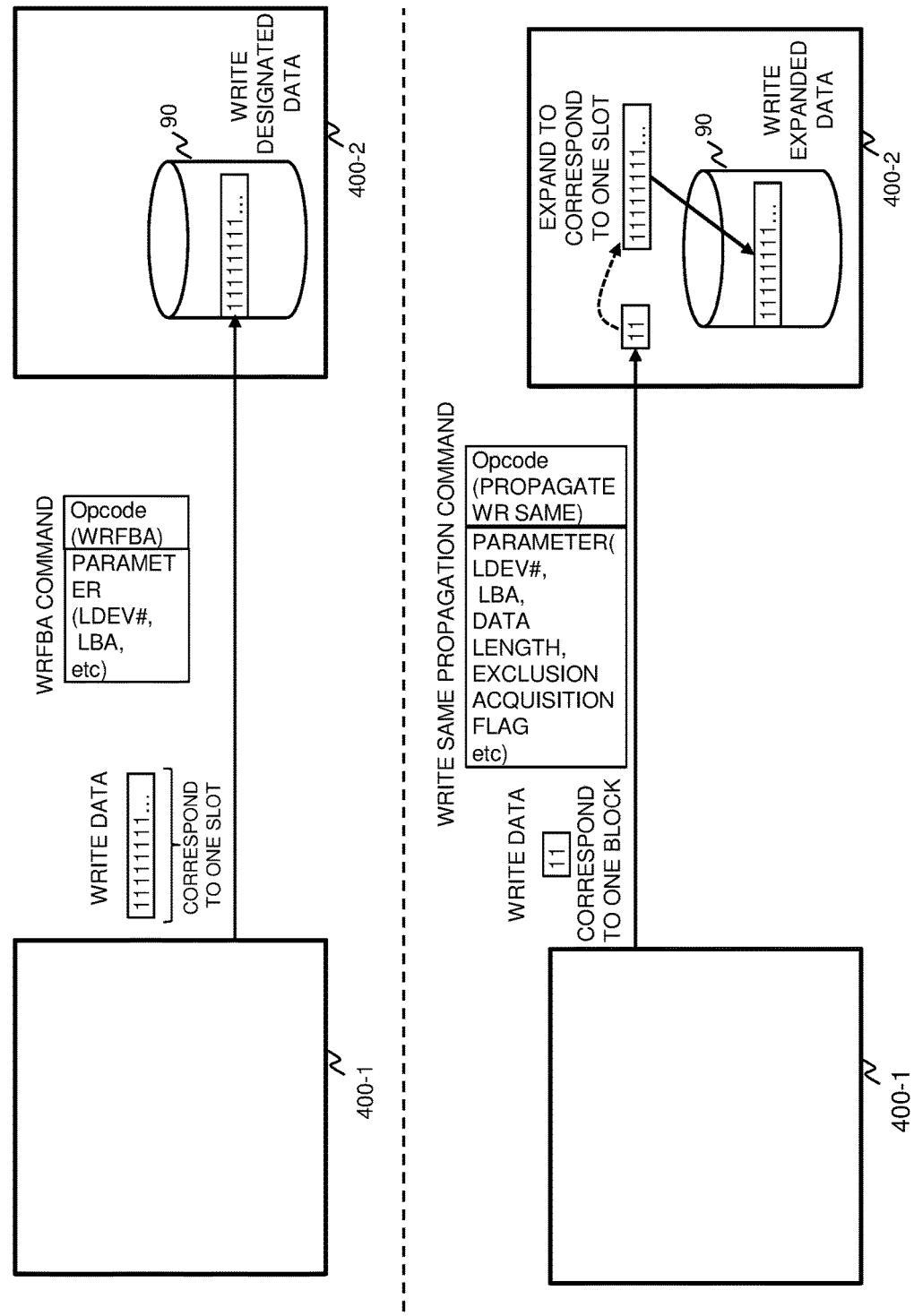
FIG. 26 is a conceptual view illustrating the flow of the process according to a WRFBA command and a WRITE SAME propagation command.

The WRITE SAME propagation command is a command for instructing the same data to be written to all the given area in the logical volume. With reference to FIG. 26, the difference between the WRFBA command and the WRITE SAME propagation command will be described. The upper section of FIG. 26 illustrates an example where "1" is written to the whole area of a slot within the logical volume using a WRFBA command from the storage subsystem 400-1 to the storage subsystem 400-2. In this case, a WRFBA command is transmitted from the storage subsystem 400-1 to the storage subsystem 400-2, and data corresponding to one slot is transmitted as the write target data. The storage subsystem 400-2 having received the WRFBA command writes the received write data as it is to the area in the logical volume designated by the parameter of the WRFBA command.

The lower section of FIG. 26 illustrates an example where "1" is written to the whole area of a slot within the logical volume using a WRITE SAME propagation command from the storage subsystem 400-1 to the storage subsystem 400-2. In this case, a command (WRITE SAME propagation command) must be transmitted from the storage subsystem 400-1 to the storage subsystem 400-2, similar to the case for using the WRFBA command. However, when using the WRITE SAME propagation command, it is necessary to transmit only a data corresponding to one block (pattern data) as the write target data. The storage subsystem 400-2 having received the WRITE SAME propagation command expands the received pattern data to a length corresponding to one slot. A process similar to the data extension processing described above will be performed here. Then, the data expanded in the storage subsystem 400-2 is written into the logical volume. Further, if the write range spreads to multiple slots, the expanded data is written to the multiple slots. In other words, the storage subsystem 400 having received the WRITE SAME propagation command performs a similar process as when a WRITE SAME command is received from the host 100.

Figure 9:
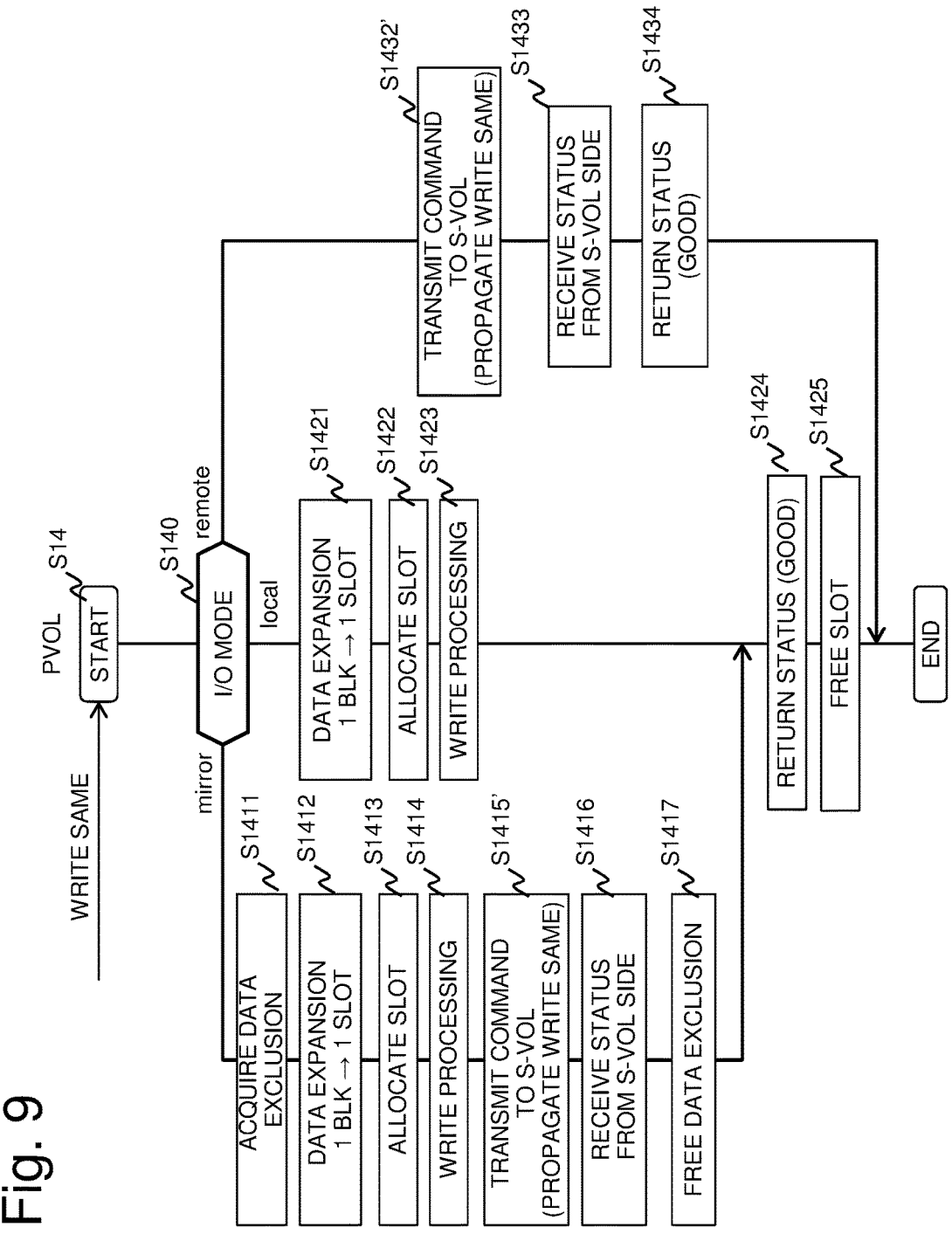
FIG. 9 is a flowchart (3) of a process according to a WRITE SAME command.

The flow of the process performed when a WRITE SAME command is received in the storage subsystem 400 regarding the modified example will be described with reference to FIGS. 9, 10 and 11. FIG. 9 illustrates a flow of the process performed in the storage subsystem 400 when the storage subsystem 400 receives a WRITE SAME command and the volume designated as the access target volume in the command is the P-VOL. Many of the processes of FIG. 9 are common with the processes described with reference to FIG. 6, so only the points that differ from FIG. 6 will mainly be described here.

If the I/O mode of the P-VOL is Mirror (S140: Mirror), the MP 521 sequentially executes the processes of S1411 through S1417, S1424 and S1425. In these processes, the only process that differs from FIG. 6 is S1415', and the remaining processes are the same as the processes illustrated in FIG. 6.

A WRFBA command has been issued in S1415 of FIG. 6, whereas in S1415', a WRITE SAME propagation command is issued to the storage subsystem 400 in which the volume in pair relationship with the P-VOL (S-VOL) exists. Further, in S1415', write data is transmitted together with the WRITE SAME propagation command, but the data transmitted here is only the data corresponding to one block (pattern data), as described earlier with reference to FIG. 26. Even when the range of the access target area of the logical volume designated by the WRITE SAME command corresponds to a range corresponding to multiple slots, the WRITE SAME propagation command of S1415' should only be issued once. This is because when designating the write range to the parameter of the WRITE SAME propagation command, it is possible to designate the same range as the access target range designated by the WRITE SAME command.

If the I/O mode of the P-VOL is Remote (S40: Remote), the MP 521 executes the processes of S1432' through S1434 sequentially. The differences from FIG. 6 are, in the process of FIG. 9, S1431 (data extension processing) of FIG. 6 will not be performed, and S1432' (transmission of WRITE SAME propagation command) is performed instead of S1432 (transmission of WRFBA command) of FIG. 6. The process of S1432' is the same as S1415', so the description of it will be omitted.

Figure 10:
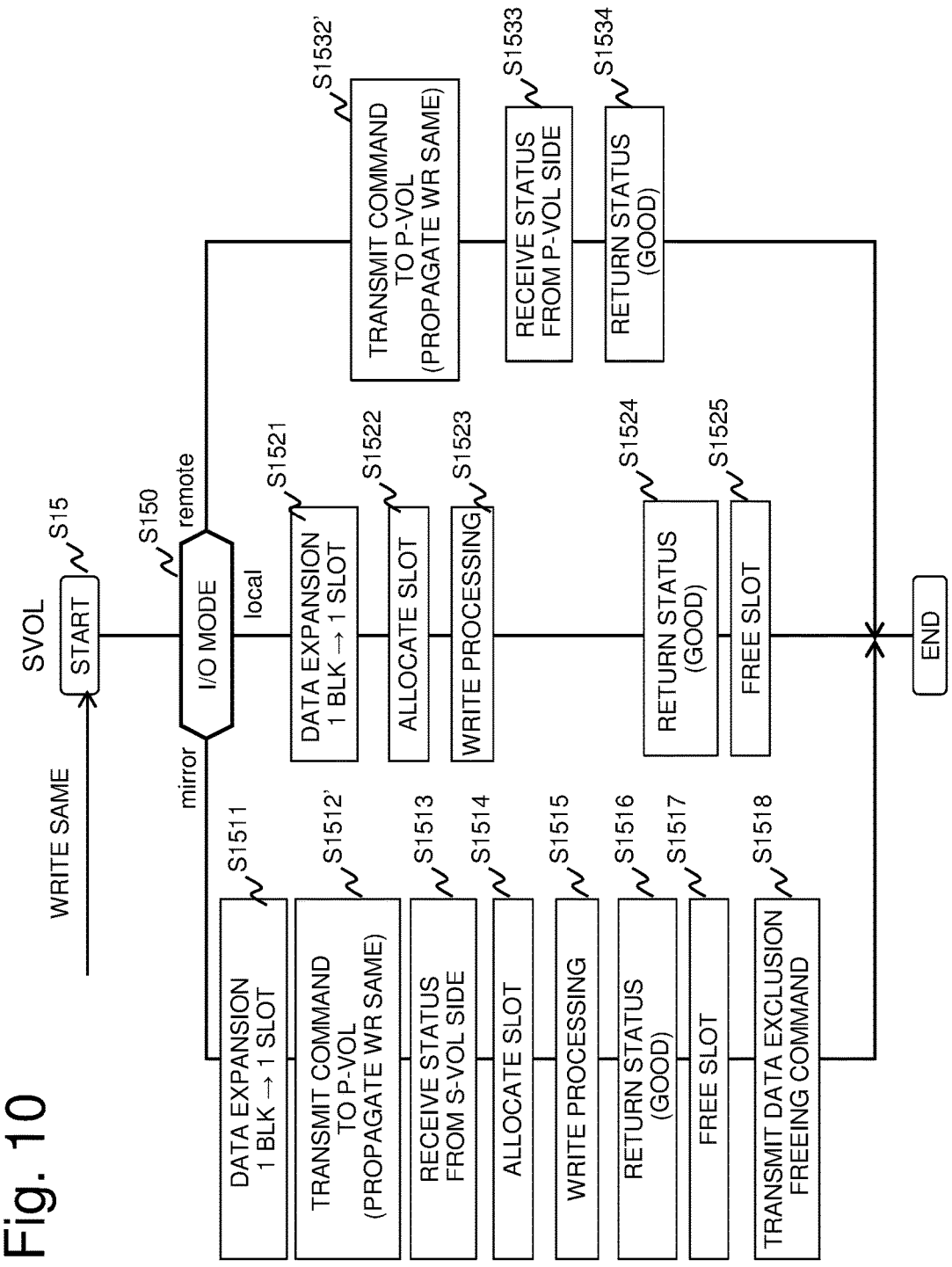
FIG. 10 is a flowchart (4) of a process according to a WRITE SAME command.

FIG. 10 illustrates a flow of the process performed in the storage subsystem 400 when the storage subsystem 400 receives a WRITE SAME command and the volume designated as the access target volume in the command is the S-VOL. Many of the processes of FIG. 10 are common to the processes described with reference to FIG. 7, so the points that differ from FIG. 7 will mainly be described here.

If the I/O mode of the S-VOL is Mirror (S150: Mirror), the MP 521 executes the processes of S1511 through S1518 sequentially. Of the processes, the only process that differs from FIG. 7 is S1512', and the other processes are the same as the processes illustrated in FIG. 7.

A WRFBA command has been issued in S1512 of FIG. 7, whereas in S1512', a WRITE SAME propagation command is issued to the storage subsystem 400 in which the volume in pair relationship with the S-VOL (P-VOL) exists. In the process, only the data corresponding to one block should be transmitted as the write data transmitted together with the WRITE SAME propagation command, similar to the process of S1415'.

The present invention is not restricted to the process sequence described above. For example, according to the process flow described above, the data extension processing (S1511) is executed before S1512', but the data extension processing should be performed any time before data write to the S-VOL is performed (in the example of FIG. 10, since WRITE SAME propagation command is used as the data write to the P-VOL, the expanded data will not be transmitted to the P-VOL). Therefore, it is possible not to perform the data extension processing before S1512', but to perform the process of S1511 before S1514 (cache slot allocation processing).

When the I/O mode of the S-VOL is Remote (S150: Remote), the MP 521 sequentially executes the processes of S1532' through S1534. The differences from FIG. 7 are that, in the process of FIG. 10, S1531 (data extension processing) of FIG. 7 is not performed, and that S1532' (transmission of WRITE SAME propagation command) is performed instead of S1532 of FIG. 7 (transmission of WRFBA command). The process of S1532' is the same as S1512', so it will not be described here.

Next, the flow of the process performed when the storage subsystem 400 receives a WRITE SAME propagation command according to the modified example will be described with reference to FIG. 11. Many of the processes of FIG. 11 are common to the processes described with reference to FIG. 8, so that only the points that differ from FIG. 8 will mainly be described here.

Figure 11:
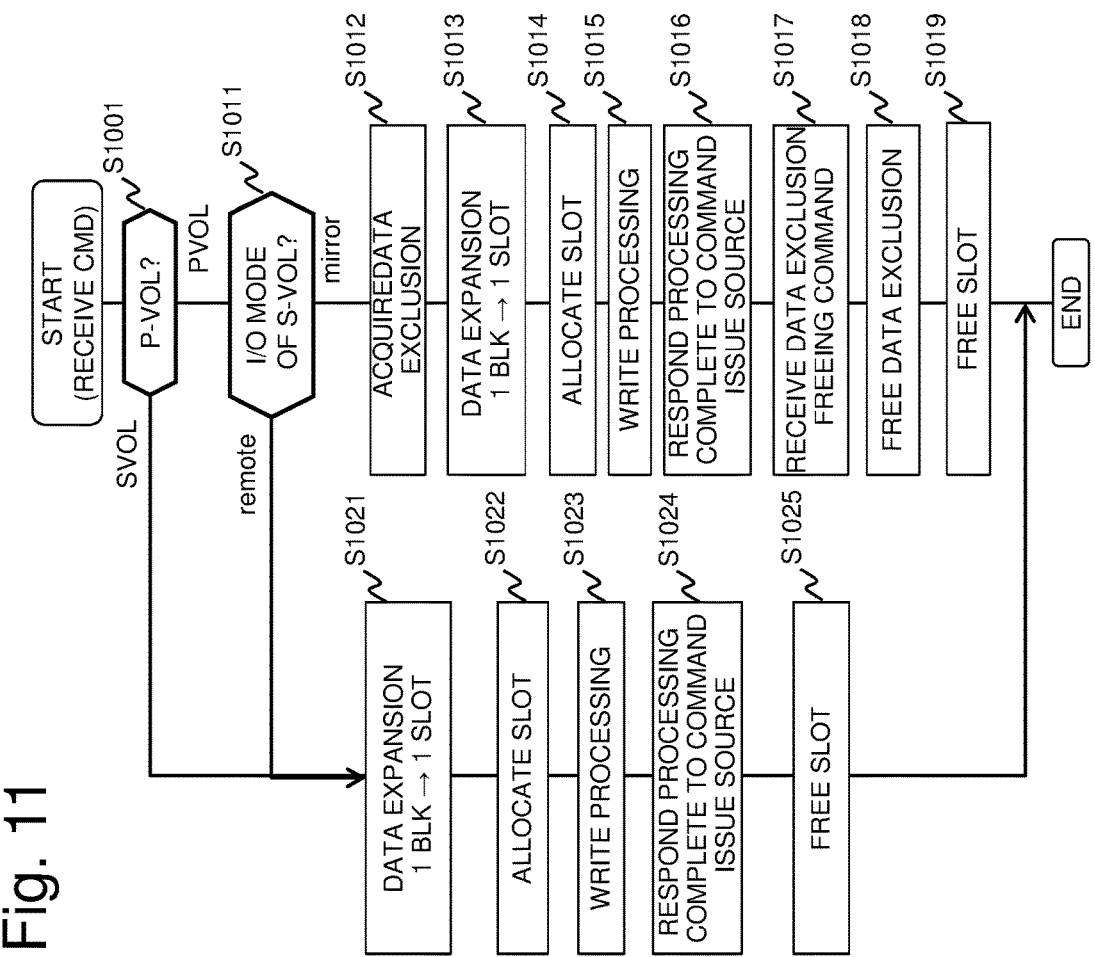
FIG. 11 is a flowchart according to a WRITE SAME propagation command.

The difference between the processes of FIG. 11 and the processes of FIG. 8 is that a data extension processing is performed in the process of FIG. 11. In the determination of S1001, if the access target logical volume is a P-VOL and the I/O mode of the volume in pair relationship with the access target logical volume (P-VOL) is Mirror, a data extension processing will be performed before the slot allocation processing of S1014 (S1013).

Further, in the determination of S1001, if the access target logical volume is P-VOL and the I/O mode of the volume (S-VOL) in pair relationship with the access target logical volume (P-VOL) is Remote, a data extension processing will be performed before the slot allocation processing of S1022 (S1021). Similarly in the determination of S1001, if the access target logical volume is S-VOL, a data extension processing is performed before the slot allocation processing of S1022 (S1021). The other points are the same as the processes of FIG. 8.

The above describes the processes related to the WRITE SAME command in the storage subsystem 400 according to the modified example. In the storage subsystem 400 according to the modified example, the WRITE SAME propagation command can be used instead of the WRFBA command to reduce the amount of write data and the number of commands to be transmitted between the storage subsystem 400-1 and the storage subsystem 400-2, and as a result, the performance of the storage system 300 can be improved.

(3-d) UNMAP Command

Next, the process performed when the storage subsystem 400 receives an UNMAP command will be described with reference to FIGS. 12 and 13. In the following description, an example is illustrated where the P-VOL exists in the storage subsystem 400-1 and where the volume in pair relationship with the P-VOL (S-VOL) exists in the storage subsystem 400-2.

Figure 12:
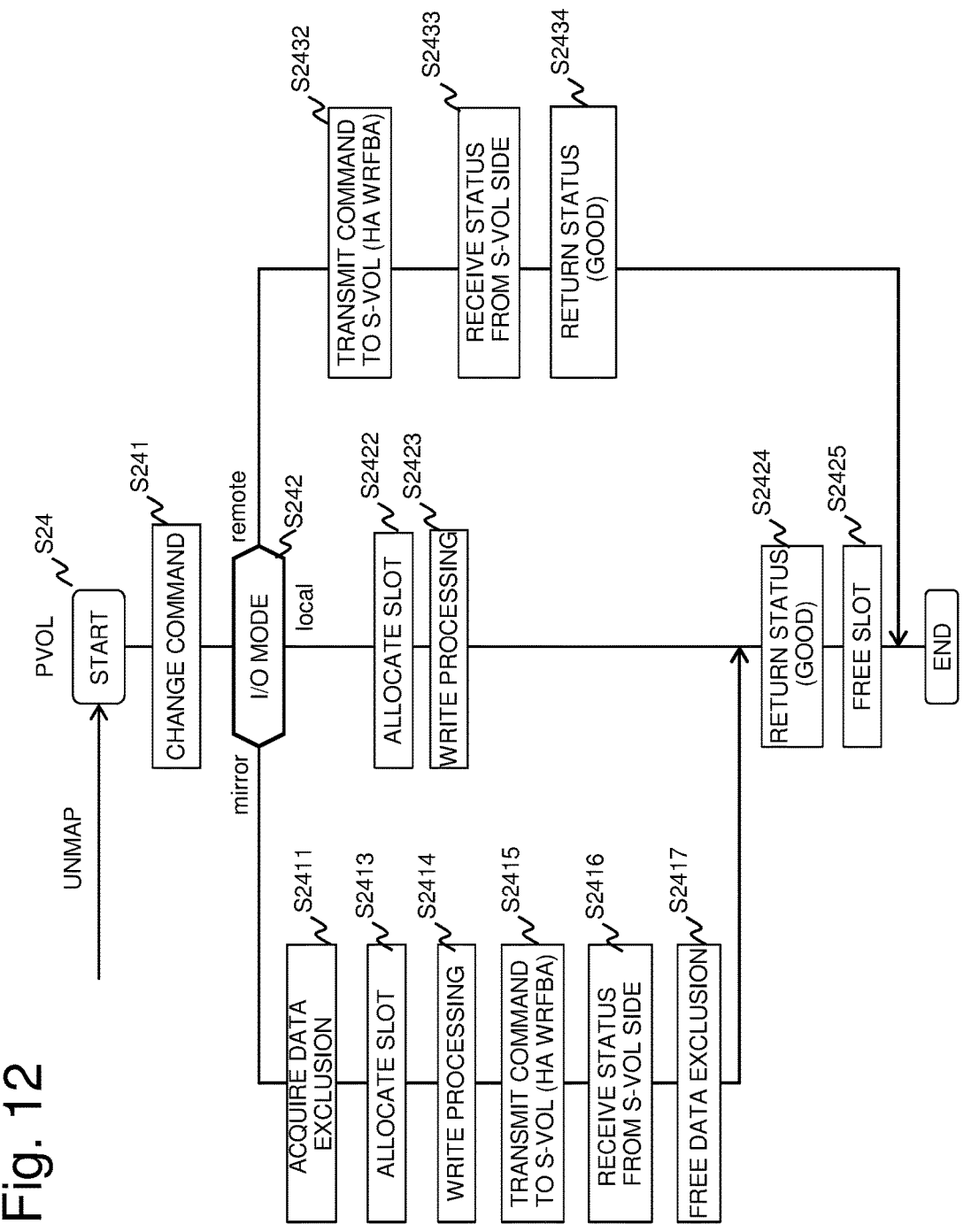
FIG. 12 is a flowchart (1) of a process according to an UNMAP command.

At first, with reference to FIG. 12, we will describe the flow of the process performed in the storage subsystem 400 when the storage subsystem 400 receives an UNMAP command and the volume designated as the access target volume by the command is the P-VOL. As mentioned earlier, in the storage subsystem 400 according to the preferred embodiment of the present invention, when it receives an UNMAP command, it performs a process to write zero to the whole area in the logical volume designated by the UNMAP command. This is substantially the same as the process performed when a WRITE SAME command is received. Therefore, when the MP 521 receives an UNMAP command, it converts the command into a WRITE SAME command instructing to write "0" to the whole area being designated (S241). After S241, processing is performed assuming that a WRITE SAME command has been received.

The subsequent processes are substantially the same as the processes performed when a WRITE SAME command has been received. The process of S242 is the same as S140 of FIG. 6. The processes of S2422 through S2425 (processes performed when the I/O mode is Local) are the same as S1432 through S1434 of FIG. 6. Further, the processes of S2432 through S2434 (processes performed when the I/O mode is Remote) are the same as S1422 through S1425 of FIG. 6. The processes of S2411 through S2417 (processes performed when the I/O mode is Mirror) are the same as S1411 and S1413 through S1417 of FIG. 6.

As mentioned earlier, if the write target data of the WRITE SAME command is all zero, the data extension processing will not be performed. Therefore, similarly in the case where the UNMAP command is received, instead of performing the data extension processing, the MP 521 performs a process to write data of an area in the buffer 532 corresponding to one slot storing all zero in the write processing (S2414 and S2423). Further, in the process of S2432 (process for transmitting the WRFBA command and the write data to the S-VOL), data of an area in the buffer 532 corresponding to one slot storing all zero data is transmitted.

Figure 13:
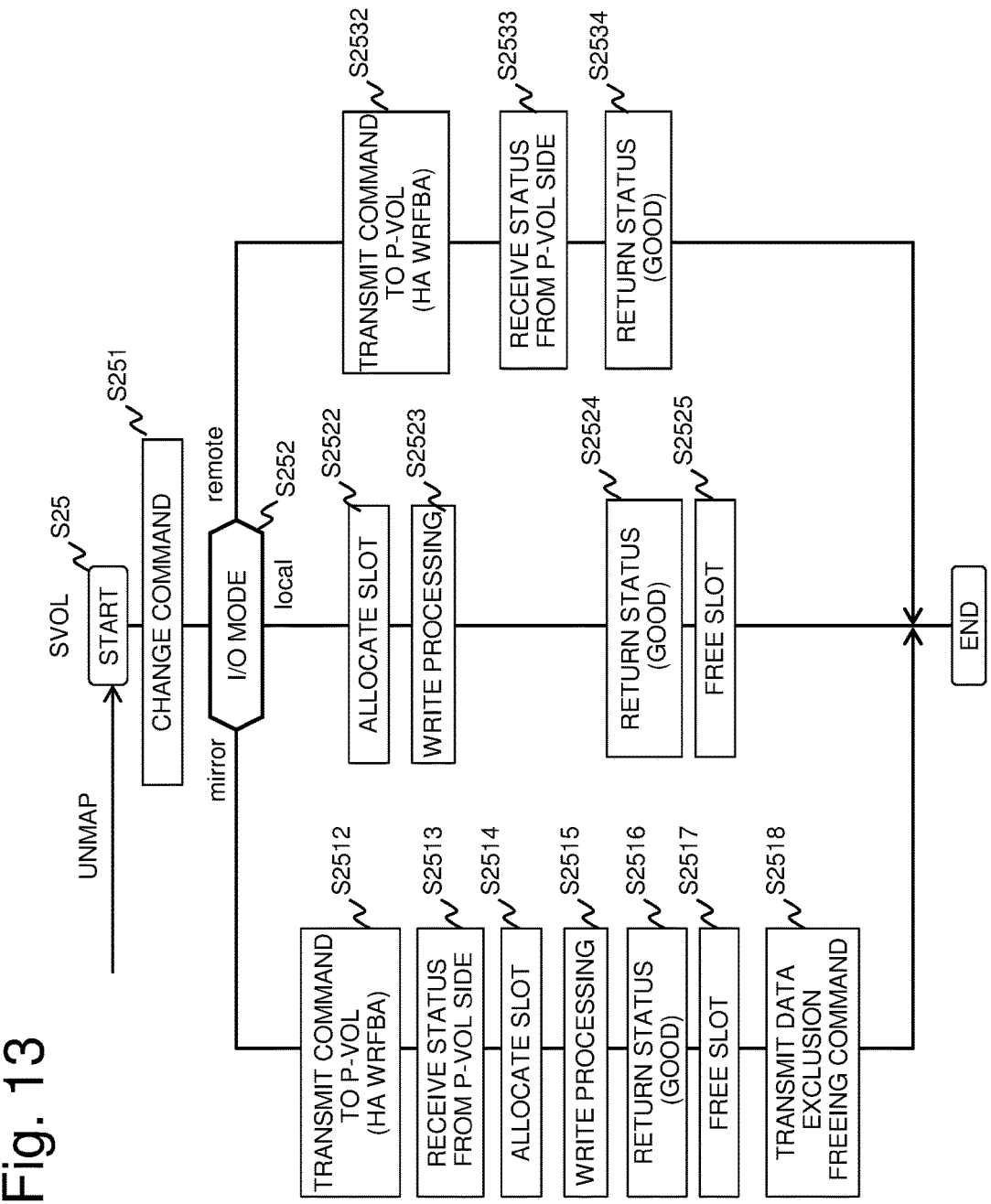
FIG. 13 is a flowchart (2) of a process according to an UNMAP command.

Next, with reference to FIG. 13, we will describe the flow of the process performed in the storage subsystem 400 of a case where the storage subsystem 400 has received an UNMAP command and the volume designated as the access target volume in the command is the S-VOL. The major portion of this process is the same as the process performed when a WRITE SAME command is received. At first, when an UNMAP command is received in the storage subsystem 400, the command is converted to a WRITE SAME command instructing to write "0" to the whole designated area (S251).

The subsequent processes are substantially the same as the process performed when a WRITE SAME command is received (FIG. 7). The difference between the processes of FIG. 13 and FIG. 7 is that the data extension processing will not be performed in the process of FIG. 13. The process of S252 is the same as S150 of FIG. 7. The processes of S2522 through S2525 (processes performed when the I/O mode is Local) are the same as S1522 through S1525 of FIG. 7. The processes of S2532 through S2534 (processes performed when the I/O mode is Remote) are the same as S1532 through S1534 of FIG. 7. The processes of S2512 through S2518 (processes performed when the I/O mode is Mirror) are the same as S1512 through S1518 of FIG. 7.

By having S2415, S2432, S2512 or S2532 executed, a WRFBA command is issued to the storage subsystem 400 in which the S-VOL (or P-VOL) exists. However, the process to be performed by the storage subsystem 400 having received this command is the same as the process according to the WRITE SAME command (FIG. 8), so it will not be described here.

Further, after the processes of FIG. 12, FIG. 13 or FIG. 8 have been completed, the MP 521 determines whether all zero data is stored in the whole area within the page in which the write target area is included. If all zero is stored, a cancellation of page allocation is performed for that page. This determination and cancellation of page allocation can be either necessarily performed in succession of the processes of FIG. 12, FIG. 13 or FIG. 8, or executed at an asynchronous timing as the processes of FIG. 12, FIG. 13 or FIG. 8. For example, it is possible to periodically determine whether 0 is stored in the whole area within each page and to cancel page allocation.

Further, according to the above-described process, data (all zero) is written to the S-VOL (or P-VOL) by issuing an WRFBA command to the storage subsystem 400 in which the S-VOL (or P-VOL) exists, but it is also possible to issue a WRITE SAME propagation command as described in the modified example. Thus, it becomes possible to reduce the amount of write data and the number of commands to be transmitted between the storage subsystem 400-1 and the storage subsystem 400-2.

(3-e) COMPARE AND WRITE (ATS) Command

Next, we will describe the process performed when the storage subsystem 400 has received a COMPARE AND WRITE (ATS) command. In the following description, an example is illustrated where the P-VOL exists in the storage subsystem 400-1 and the volume in pair relationship with the P-VOL (S-VOL) exists in the storage subsystem 400-2.

Figure 14:
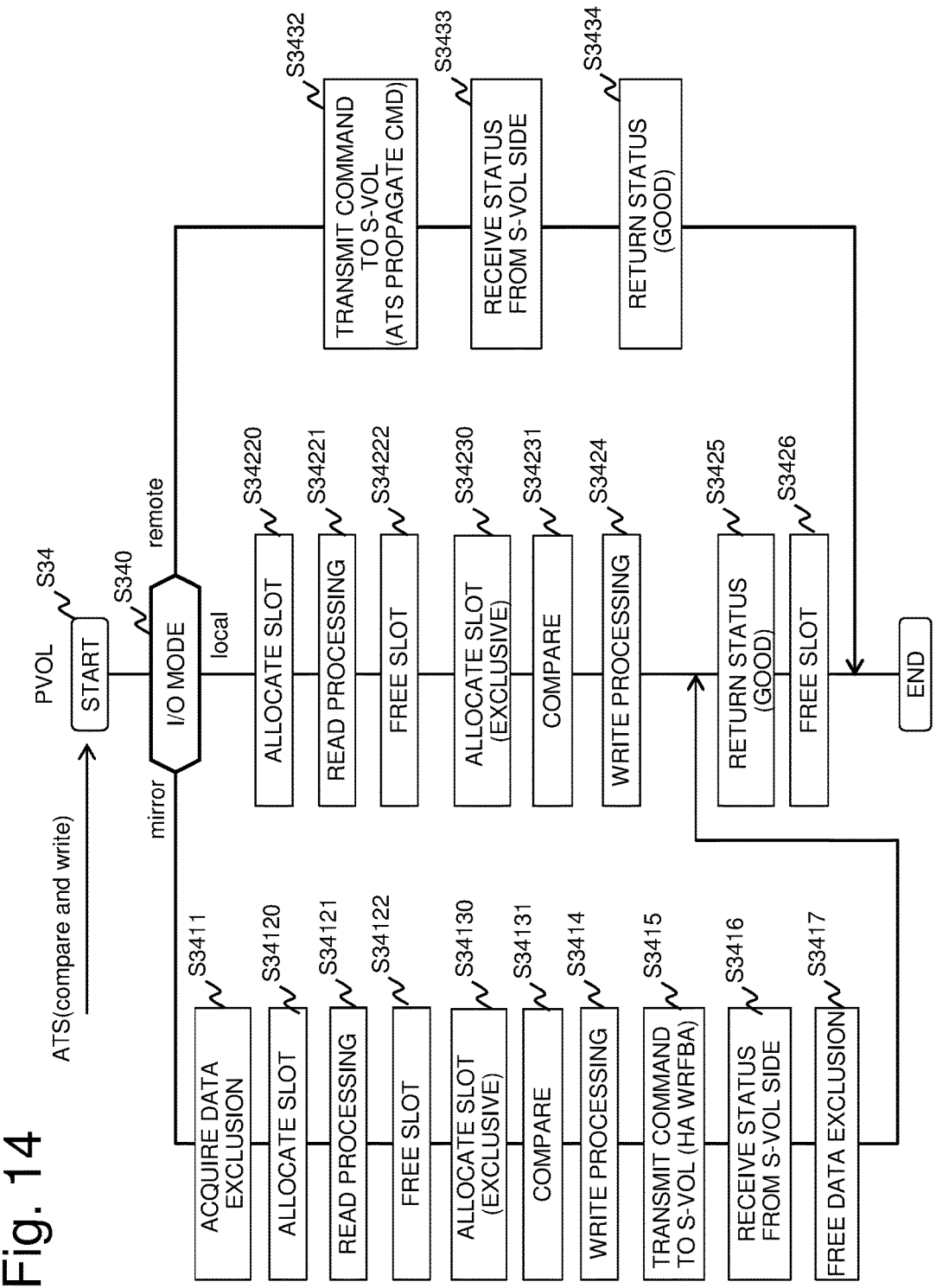
FIG. 14 is a flowchart (1) of a process according to a COMPARE AND WRITE (ATS) command.

At first, the flow of the process performed in the storage subsystem 400 when the storage subsystem 400 receives an ATS command and the volume designated as the access target volume by the received ATS command is a P-VOL will be described with reference to FIG. 14. Unless stated otherwise, in the following description, the processes are executed by the MP 521 of the storage subsystem 400-1 (storage subsystem in which the P-VOL exists).

At first, the MP 521 refers to the volume management table T300, and identifies the I/O mode of the access target volume (S340). This process is the same process as S140. Hereafter, cases where the I/O mode is Local, Remote, or Mirror, will be described. In order to prevent redundant description, unless stated otherwise, a case is described where the range of the access target area of the logical volume designated by the ATS command corresponds to a single slot.

When the I/O mode is Local, the MP 521 executes a cache slot allocation processing (S34220). This process is the same as S1422. Also similar to S1422, when the range of the access target area of the logical volume designated by the ATS command is a range corresponding to multiple slots, multiple slots are allocated.

In S34221, the MP 521 reads the data in the range of the access target area in the logical volume designated by the ATS command to the cache area allocated in S34220. When the read processing is ended, the MP 521 temporarily frees the cache area (S34222). Even if the cache area is freed, the data of the relevant area will not be deleted from the cache area, and the data in the range of the access target area in the logical volume is stored in the relevant area.

Further, there may be a case where the cache area storing the data in the range of the access target area in the logical volume already exists prior to execution of the cache slot allocation processing (S34220) (a so-called "cache hit" state). In that case, there is no need to execute the read processing of S34221.

In S34230, the MP 521 re-allocates the cache area which had been freed in S34222. The allocation processing performed here somewhat differs from the cache slot allocation processing performed in S34220, and it is called an exclusive allocation processing. The cache area allocated by the exclusive allocation processing will be in a state not capable of being accessed by other processes. For example, when a WRITE command requesting to write data to a same range as the range of the access target area in the logical volume designated by the ATS command is received, the MP 521 attempts to allocate the cache area, but when exclusive allocation processing has been performed, the cache slot allocation processing based on the WRITE command must wait until the processing based on the ATS command is ended.

In S34231, the MP 521 compares the data in the cache slot exclusively allocated in S34230 with the compare data received together with the ATS command. Although not shown, if the two data do not correspond as a result of comparison in S34231, the MP 521 returns an error to the host 100, and ends the process concerning the ATS command.

As a result of the comparison in S34231, if the data in the cache slot exclusively allocated in S34231 and the compare data received together with the ATS command are the same, the processes of S3424 and thereafter are performed. In S3424, the MP 521 stores the write data received together with the ATS command to the cache slot exclusively allocated in S34220. By doing this, the write data received together with the ATS command will be stored in the logical volume.

When the process of S3424 is ended, the MP 521 returns a GOOD status to the host 100 (S3425). Then, in S3426, the MP 521 frees the allocated cache slot (S3426) and ends the process.

On the other hand, when it is determined that the I/O mode is Remote in S340, the processes of S3432 and thereafter are executed. In S3432, the MP 521 refers to the pair management table T400, and identifies the subsystem serial number and the LDEV # of the volume (S-VOL) in pair relationship with the access target volume. Then, it transmits a command called ATS propagation command to the storage subsystem 400 in which the S-VOL exists (storage subsystem 400-2).

The ATS propagation command is a command that is only effective among storage subsystems 400, similar to the WRFBA command. Information for specifying the area of the access target logical volume is included in the parameter of the ATS propagation command. Therefore, the storage subsystem 400 having received the ATS propagation command can perform a process similar to when the ATS command is received (specifically, processes similar to S34220 through S3424) to the access target logical volume based on the information designated in the parameter.

Further, when an ATS propagation command is transmitted, similar to the case when the host 100 issues an ATS command to the storage subsystem 400, compare data and write data are transmitted together with the ATS propagation command to the storage subsystem 400 of the command issue destination. The storage subsystem 400 having received the ATS propagation command performs a compare processing using the received compare data, and when the compare result is correct (the compare data and the data stored in the access target range of the logical volume are the same), it performs a process to store the write data in the logical volume. This process will be described in detail later.

In S3432, when the MP 521 (in the storage subsystem 400-1) transmits an ATS propagation command to the storage subsystem 400-2, the MP 521 waits for a response to be returned from the storage subsystem 400-2. In S3433, when a response from the storage subsystem 400-2 is received and the result thereof is normal (that is, when compare and write are successful), the MP 521 returns a GOOD status to the host 100 (S3434), and ends the process.

If it is determined at S340 that the I/O mode is Mirror, the processes of S3411 and thereafter are executed. In S3411, the lock of the whole range of the access target area in the logical volume is acquired. This process is similar to S1411. Then, the processes of S34120 through S3414 are executed to perform compare and write of the access target area in its own logical volume (P-VOL). This process is the same as the processes (S34220 through S3424) performed when it is determined that the I/O mode is Local.

In S3415, the MP 521 issues a WRFBA command to the storage subsystem 400 in which the S-VOL exists (storage subsystem 400-2) to make the write data transmitted together with the ATS command to the S-VOL store in the access target area of the S-VOL. The write data to be transmitted together with the WRFBA command is the write data transmitted together with the ATS command to the storage subsystem 400-1. Compare data will not be transmitted. When the transmission of the WRFBA command is ended, the MP 521 waits until a response is returned from the storage subsystem 400-2.

When the MP 521 receives a response from the storage subsystem 400-2 in S3416, it performs the data exclusion freeing process (S3417), returns a GOOD status to the host 100 (S3425), frees the cache slot (S3426), and ends the process.

Figure 15:
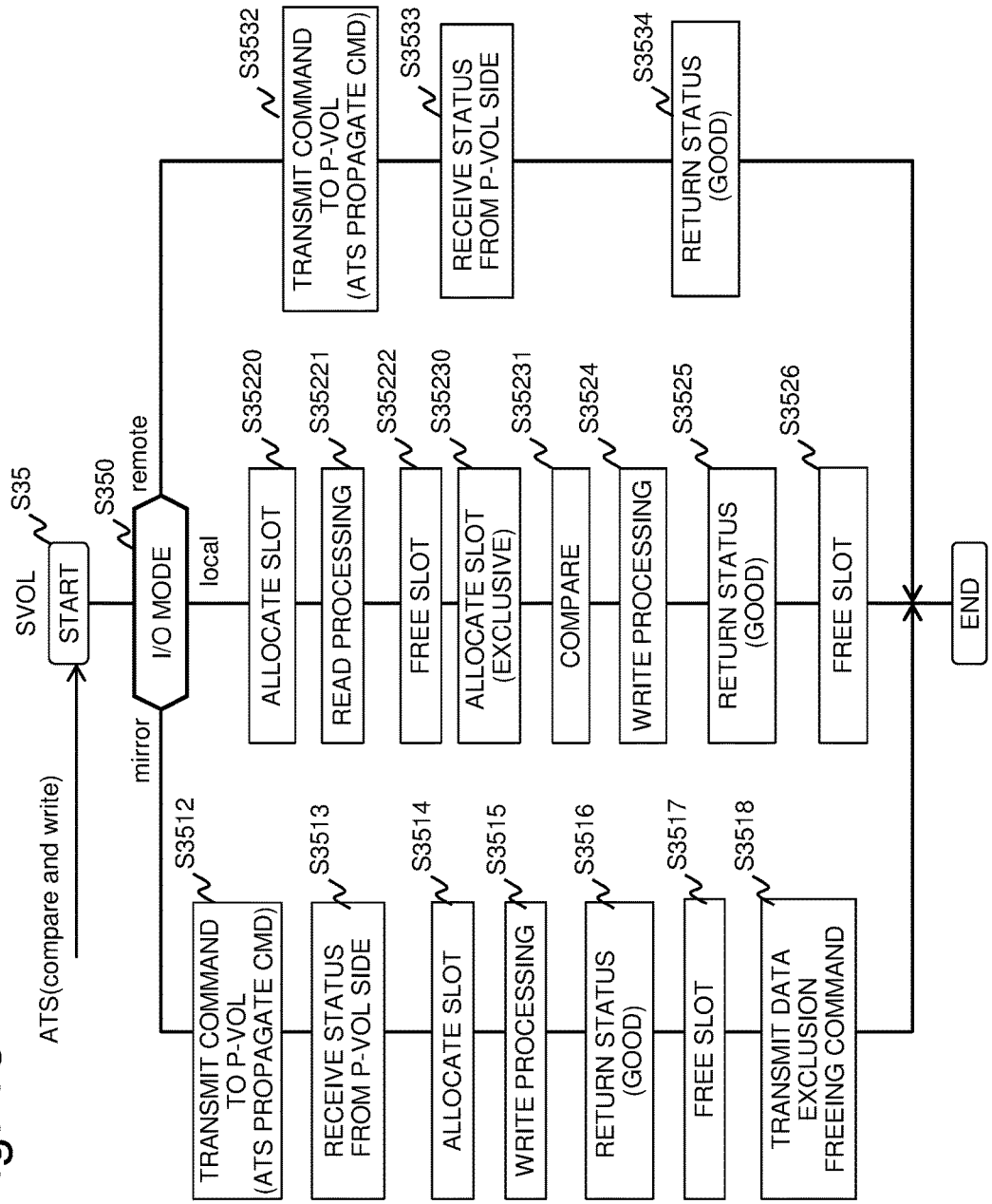
FIG. 15 is a flowchart (2) of a process according to a COMPARE AND WRITE (ATS) command.

Next, the flow of the process performed in the storage subsystem 400 when the storage subsystem 400 receives an ATS command and the volume designated as the access target volume by the command is the S-VOL will be described with reference to FIG. 15. Unless stated otherwise, the processes are executed by the MP 521 of the storage subsystem 400-2 (storage subsystem in which the S-VOL exists).

At first, the MP 521 refers to the volume management table T300, and identifies the I/O mode of the access target volume (S350). This process is the same as the process of S340.

When the I/O mode is Local, the MP 521 executes the processes of S35220 through S3526. These processes are the same processes as S34220 through S3426 in FIG. 14.

When the I/O mode is Remote, the MP 521 performs the processes of S3532 through S3534. These processes are substantially the same as the processes of S3432 through S3434 in FIG. 14. In processes S3532 through S3534, the difference from S3432 through S3434 is that in the process of FIG. 14, the ATS propagation command is transmitted to the storage subsystem 400 (400-2) in which the S-VOL exists, whereas in S3532 of FIG. 15, the MP 521 transmits the ATS propagation command to the storage subsystem 400 (400-1) in which the P-VOL exists, and that in S3533, it receives a response not from the storage subsystem 400-2 but from the storage subsystem 400-1 (storage subsystem in which the P-VOL exists).

When it is determined that the I/O mode is a Mirror at S350, the processes of S3512 and thereafter are executed. The processes of S3512 and S3513 are the same as S3532 and S3533, wherein a process of transmitting an ATS propagation command to the storage subsystem 400-1 in which the P-VOL exists, and receiving the processing result thereof are performed.

In S3514, the MP 521 executes a cache slot allocation processing, and thereafter, stores the write data received together with the ATS command to the cache area allocated in S3514 (S3515). In S3516, the MP 512 returns a GOOD status to the host 100, and in S3517, performs a freeing process of the cache slot allocated in S3514. Thereafter, the MP 521 transmits a data exclusion freeing command to the storage subsystem 400-1, causes the storage subsystem 400-1 to perform the data exclusion freeing process (S3518), and ends the process.

Figure 16:
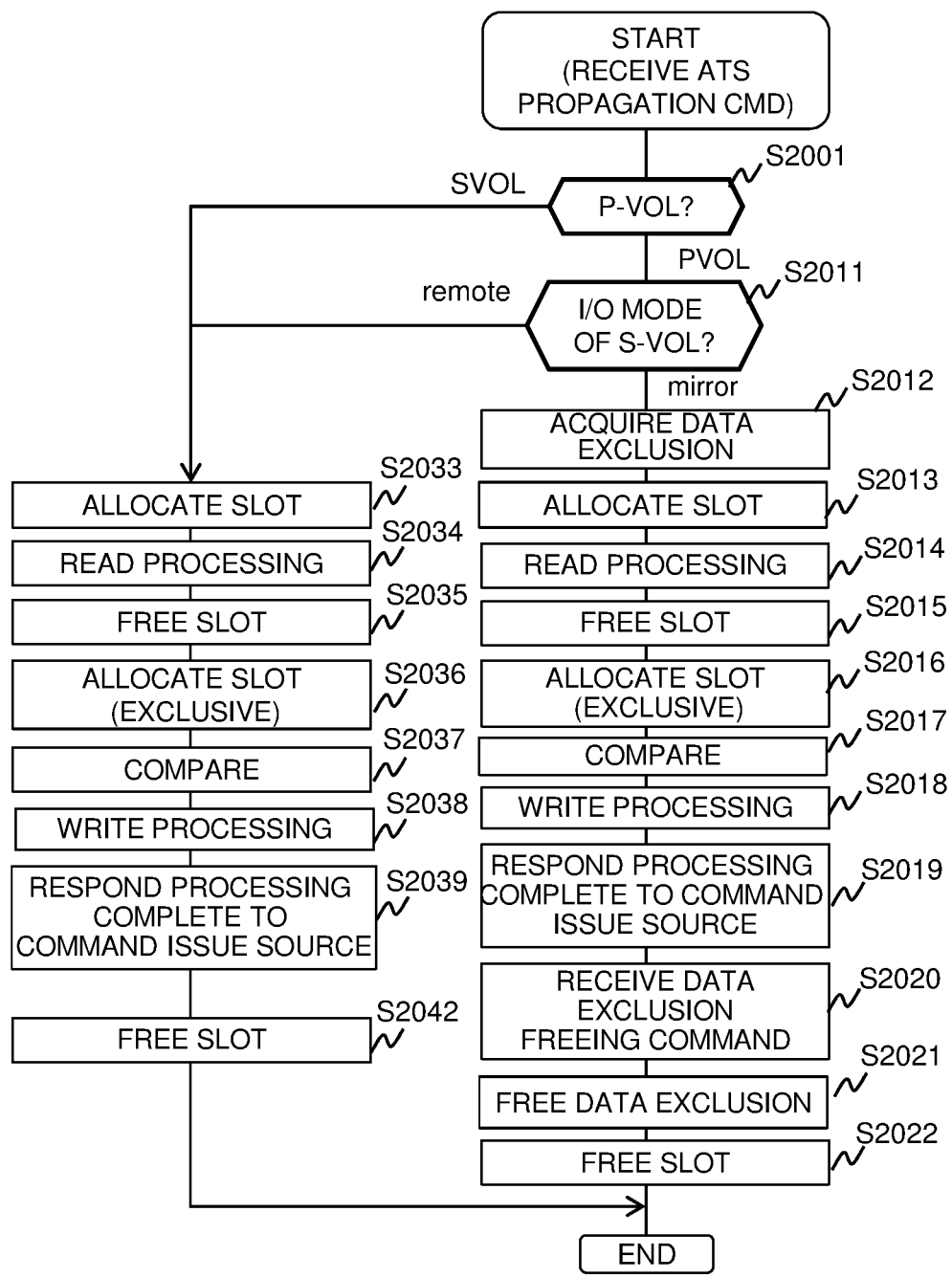
FIG. 16 is a flowchart of a process according to an ATS propagation command.

Next, the flow of the process performed when the storage subsystem 400 receives an ATS propagation command will be described with reference to FIG. 16. As mentioned earlier, the storage subsystem 400 having received the ATS propagation command performs a similar process to the one when receiving an ATS command.

When the storage subsystem 400 receives an ATS propagation command, the MP 521 determines whether the access target logical volume is a P-VOL or an S-VOL (S2001). If the access target logical volume is a P-VOL (S2001: PVOL), the MP 521 identifies the I/O mode of the pair volume (S-VOL) of the access target volume in S2011. Since the I/O mode of the pair volume is included in the parameter of the ATS propagation command (similar to the WRFBA command), the MP 521 can perform the determination of S2011 by referring to the parameter of the ATS propagation command.

If the I/O mode of the pair volume is a Mirror in S2011, the MP 521 performs the processes of S2012 and thereafter. S2012 through S2018 are a process for performing data compare and write to the P-VOL, and the same processes as S3411 through S3414 in FIG. 14 are performed.

When data write to the P-VOL (S2018) is completed, the MP 521 returns a response notifying that the process has been completed to the storage subsystem being the issue source of the ATS propagation command (for example, when the P-VOL exists in the storage subsystem 400-1, the issue source storage subsystem of the ATS propagation command is the storage subsystem 400-2). Thereafter, the MP 521 waits for a data exclusion freeing command to be transmitted from the storage subsystem being the issue source of the ATS propagation command.

In S2020, when the MP 521 receives a data exclusion freeing command, the MP 521 frees the data exclusion (S2021). Thereafter, the MP 521 frees the cache area allocated exclusively in S2016 (S2022), and ends the process.

When the access target logical volume is the S-VOL (S2001: SVOL), or when the access target logical volume is the P-VOL but the I/O mode of the pair volume (S-VOL) is Remote (S2011: remote), the processes of S2033 and thereafter are performed. The processes of S2033 through S2039 are the same as the processes of S2013 through S2019 described earlier. After S2039, the MP 521 frees the cache slot allocated in S2036 (S2042), and ends the process.

(3-f) Processing of WRITE Command and Error

We have described the flow of the process performed by the storage subsystem 400 when WRITE SAME, UNMAP, or COMPARE AND WRITE command has been received, but in principle, the above description describes the processes performed when no error occurs during the processing. However, in reality, error may occur during the processing depending on the state of the storage subsystem 400, so we will describe the processes performed by the storage subsystem 400 when an error occurs.

As mentioned earlier, the storage subsystem according to the present invention provides a volume (logical volume) formed by a Thin Provisioning technique to the host 100. By adopting the Thin Provisioning technique, (at least in the initial state) the size of the physical storage area can be smaller than the total capacity of the logical volume. However, if the storage subsystem 400 continues operation maintaining the state where the size of the physical storage area is smaller than the total capacity of the logical volume, a case may occur where there is no more physical storage area to be allocated to a page of the logical volume when a large amount of data is written from the host 100 to the logical volume. In that case, the storage subsystem 400 cannot store the write data transmitted from the host 100, and it must report to the host 100 that the write processing or the like cannot be executed since there are no more physical storage areas.

When there still remains some physical storage areas to be allocated to a logical volume but the amount of (unused) physical storage areas that can be allocated to a page becomes small (such as when it becomes equal to or smaller than a given threshold), it is preferable to notify the same to the host 100. In the following description, the processes to be performed by the storage subsystem 400 when there are no more unused physical storage areas, or when the amount of unused physical storage areas becomes small (when the amount of unused physical storage areas becomes equal to or smaller than a given threshold), will be described, taking as an example the processes performed by the storage subsystem 400 when a WRITE command is received.

Figure 17:
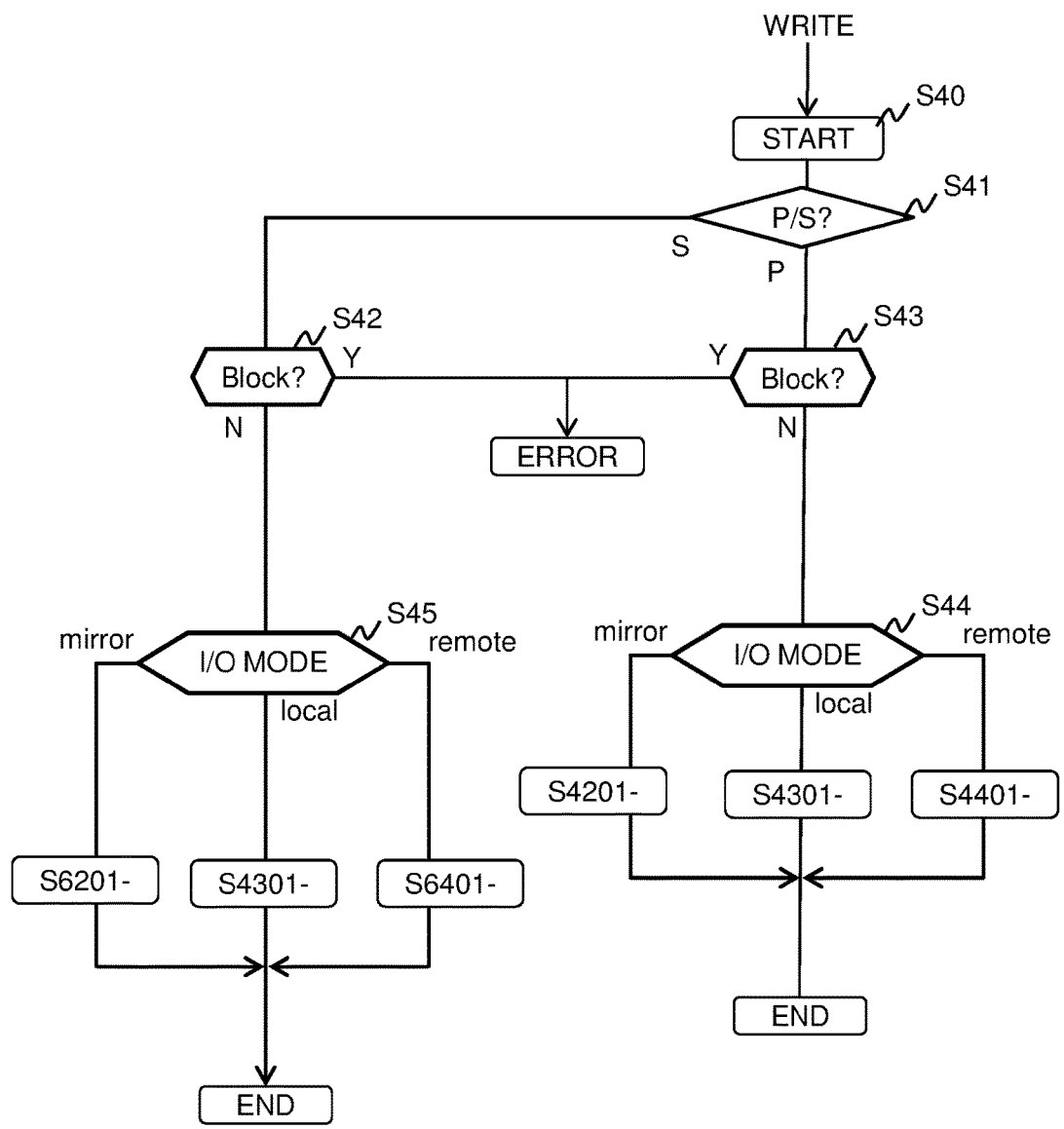
FIG. 17 is a flowchart illustrating an overall flow of a process according to a WRITE command.

FIG. 17 is a view illustrating the flow of the process when the command received from the host 100 is a WRITE command (process corresponding to S40 of FIG. 5). In the following description, an example is illustrated where the P-VOL exists in the storage subsystem 400-1 and the S-VOL in pair relationship with the P-VOL (within the storage subsystem 400-1) exists in the storage subsystem 400-2.

In S41, the MP 521 refers to the volume management table T300, and converts the LUN designated by the command to a logical volume number. Then, it refers to the pair management table T400, and determines whether the logical volume (access target volume) specified by the converted logical volume number is a P-VOL or an S-VOL.

Thereafter, the MP 521 determines whether the status of the access target volume is Block or not (S42, S43). If the status of the access target volume is Block, the MP 521 returns an error to the host 100, and ends the process. If the status of the access target volume is not Block, it performs the process of S44 or S45.

In S44 or S45, it refers to the volume management table T300, and identifies the I/O mode of the access target volume. Then, it performs processes according to the I/O mode. Hereafter, we will describe the flow of the processes performed for each I/O mode of the access target volume.

Figure 18:
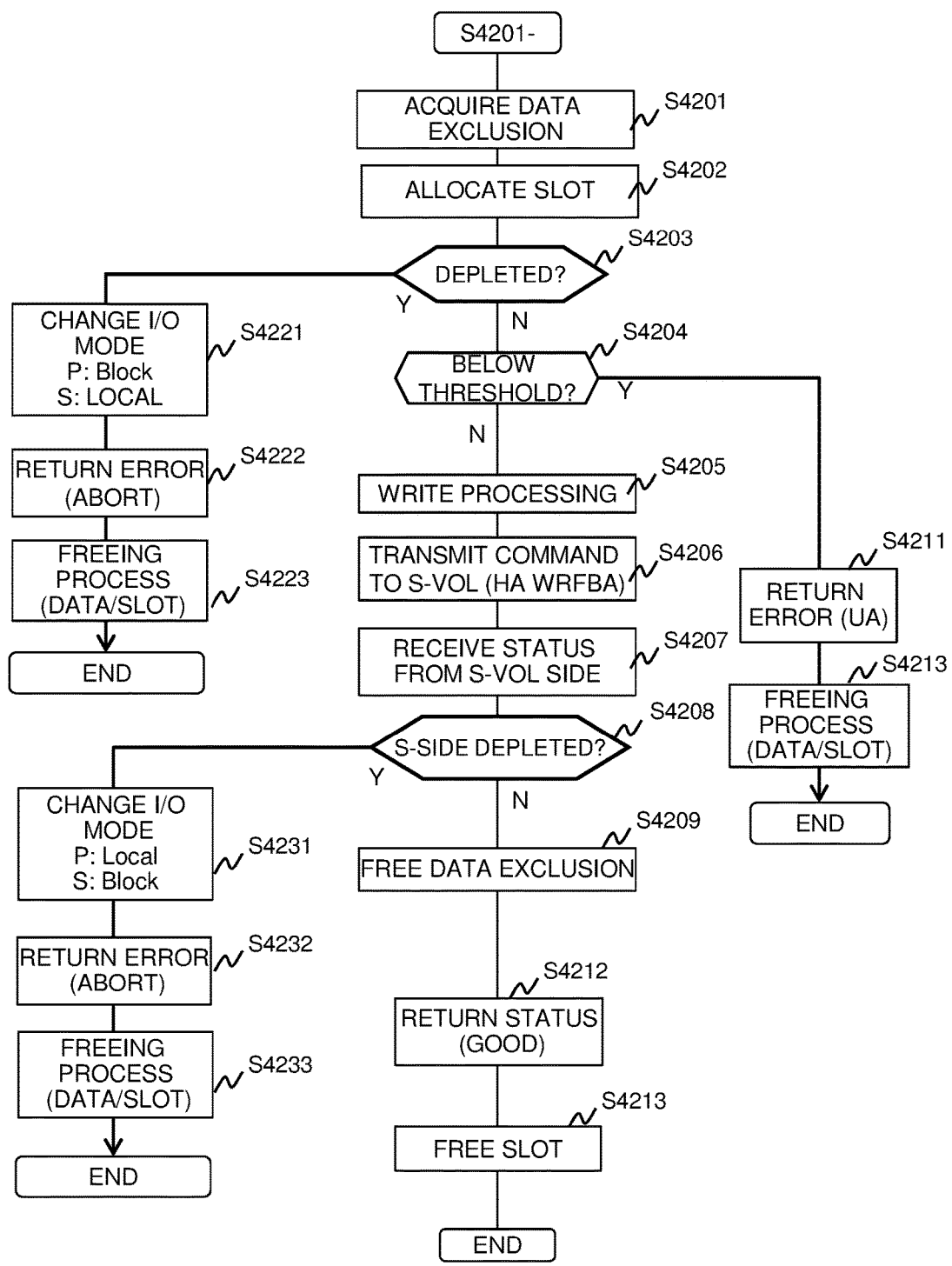
FIG. 18 is a flowchart (1) of a process performed when an error occurs during processing of a WRITE command.

FIG. 18 shows a flow of the processes performed by the storage subsystem 400 when the access target volume is the P-VOL and the I/O mode thereof is Mirror. In S4201, the MP 521 executes a process for acquiring the lock of the whole range of the access target area of the logical volume designated by the WRITE command (data exclusion acquisition processing). Thereafter in S4202, the MP 521 executes a cache slot allocation processing.

Next, the MP 521 determines whether an unused physical storage area must be newly allocated to the page corresponding to the access target area in the logical volume, and if allocation is required, determines whether an unused physical storage area exists or not (S4203). Hereafter, the state where an unused physical storage area does not exist is referred to as "state where unused physical storage areas are depleted" (or the term "unused" can be omitted as follows; "state where physical storage areas are depleted").

When it is determined that the physical storage areas are depleted, the MP 521 changes the I/O mode and the pair status of the access target logical volume (S4221). Specifically, it changes the I/O mode of the P-VOL to "Block". Further, it changes the pair status to "SUSPEND". At the same time, it outputs an instruction to the storage subsystem 400-2 having the pair volume (S-VOL) of the access target logical volume to change the I/O mode of the pair volume (S-VOL) to "Local" and the pair status to "SUSPEND".

In S4222, the MP 521 returns an error to the host 100. As mentioned earlier, when the processing is not ended correctly due to an error having occurred during the processing, the storage subsystem 400 returns a "CHECK CONDITION" status to the host 100. At this time, according to SCSI standards, the detailed information of the error, such as Sense Key, Sense Code and the like, is also returned. In S4222, the MP 521 returns a Sense Key of "ABORTED COMMAND" showing that the processing has been discontinued to the host 100 as detailed information. Hereafter, the MP 521 returning a Sense Key of "ABORTED COMMAND" as the detailed information of the error to the host 100 is referred to as "returning an error (ABORT)".

Lastly, the MP 521 performs a data exclusion freeing process and slot freeing process (S4223), and ends the process.

In the determination of S4203, if it is determined that there is no need to newly allocate an unused physical storage area, or if allocation is necessary but an unused physical storage area exists, the MP 521 executes the processes of S4204 and thereafter. In S4204, the MP 521 determines whether the amount of unused physical storage area of the storage subsystem 400 (storage subsystem having the access target volume) has become equal to or smaller than a given threshold. If the amount of unused physical storage area has become equal to or smaller than a given threshold value (S4204: Y), the MP 521 returns an error to the host 100 notifying that the unused physical storage area is equal to or smaller than a given threshold (S4211). According to the storage subsystem 400 of the present embodiment, if the amount of unused physical storage area is equal to or smaller than a given threshold value, "UNIT ATTENTION" is returned as the Sense Key, and detailed information enabling the host 100 to recognize that the amount of unused physical storage areas has become equal to or smaller than a given threshold is included in the Additional Sense Code and the like and returned to the host. Hereafter, the action to respond to the host 100 notifying that the unused physical storage area has become equal to or smaller than a given threshold is referred to as "returning an error (UNIT ATTENTION)" or "returning an error (UA)". The above description illustrates an example of determining whether the amount of unused physical storage area has become equal to or smaller than a given threshold, but it is possible to adopt other determination methods. For example, it is possible to determine whether the amount of already-used physical storage area (physical storage area already allocated to a page of the logical volume) (or the use rate of the physical storage area, that is, the "amount of already-used physical storage area divided by the total amount of physical storage area capable of being allocated to pages") has exceeded a given upper limit value or not, and when it has exceeded the given upper limit value, an error notifying the same (amount of used physical storage area has reached the upper limit value, or has exceeded the upper limit value) can be returned to the host 100.

Thereafter, the MP 521 performs the cache slot freeing process (S4213), and ends the process.

If the unused physical storage area is equal to or smaller than a given threshold (S4204: Y), the process of S4205 is performed. In S4205, the MP 521 stores the write data transmitted together with the WRITE command from the host 100 to the cache slot allocated in S4202.

In S4206, the MP 521 instructs to store write data to the S-VOL by sending an WRFBA command to the storage subsystem 400-2 having a pair volume (S-VOL) of the access target volume, and waits for a response from the storage subsystem 400-2. Further, if the storage subsystem 400-2 fails to write data to the S-VOL since the unused physical storage area to be allocated to the S-VOL is depleted, it returns the same as response information to the storage subsystem 400-1. Further, even when the unused physical storage area to be allocated to the S-VOL has become equal to or smaller than the given threshold, the storage subsystem 400-2 returns the same as response information to the storage subsystem 400-1.

In S4207, when the MP 521 receives a response from the storage subsystem 400-2, the MP 521 refers to the contents of the response, and determines whether unused physical storage areas to be allocated to the S-VOL have been depleted in the storage subsystem 400-2 or not (S4208).

If information stating that the unused physical storage areas to be allocated to the S-VOL have been depleted is included in the response information from the storage subsystem 400-2, the MP 521 performs the processes of S4231 and thereafter. In S4231, the MP 521 changes the I/O mode of the access target logical volume. Specifically, it changes the I/O mode of the P-VOL to "Local". Moreover, it changes the pair status to "SUSPEND". Even further, it instructs the storage subsystem 400-2 having a pair volume (S-VOL) of the access target logical volume to change the I/O mode of the pair volume (S-VOL) into "Block" and change the pair status into "SUSPEND".

In S4232, the MP 521 returns an error (ABORT) to the host 100, and performs data exclusion freeing process and slot freeing process in S4233, before ending the process. The order of performing the respective steps is not restricted to the one described above. For example, the data exclusion freeing process can be performed before S4231 or before S4232.

In S4208, when it is determined that the unused physical storage area to be allocated to the S-VOL is not depleted, the processes of S4209 and thereafter are performed. The MP 521 executes the data exclusion freeing process (S4209), returns a GOOD status to the host 100 (S4212), performs the slot freeing process (S4213), and ends the process.

Next, the flow of the process performed by the storage subsystem 400 when the access target volume is a P-VOL and the I/O mode thereof is Local will be described with reference to FIG. 19. At first, the MP 521 performs the cache slot allocation processing in S4301.

Next, the MP 521 determines whether the physical storage area is depleted or not (S4302). When it is determined that the physical storage area is depleted (S4302: Y), the MP 521 returns an error to the host 100 (S4311), and ends the process. The detailed information returned in S4311 includes information showing that the physical storage area is depleted. Hereafter, the returning of the information showing that the physical storage area is depleted to the host 100 is referred to as "returning an error (Stun)". On the other hand, if the I/O mode is Mirror, when the physical storage area is depleted (a case corresponding to S4203: Y, or S4208: Y), it is possible that the physical storage area of the pair volume (such as S-VOL) is not yet depleted. In other words, it may be possible to write to the S-VOL storing the same contents as the P-VOL, so that an error (Stun) is not returned.

When the physical storage area is not depleted (S4302: N), the MP 521 determines in S4304 whether the amount of unused physical storage area of the storage subsystem 400 (storage subsystem having an access target volume) has been equal to or smaller than a given threshold or not. If the unused physical storage area is equal to or smaller than a given threshold value (S4304: Y), the MP 521 returns an error (UA) to the host 100 (S4315). Thereafter, the MP 521 performs the cache slot freeing process (S4306), and ends the process.

If the amount of unused physical storage area is greater than a given threshold (S4304: N), the MP 521 stores the write data to the cache slot allocated in S4301 (S4303), and returns a notice that the write processing has been correctly ended to the host 100 (S4305). Thereafter, the MP 521 performs the cache slot allocation process (S4306), and ends the process.

Thereafter, the flow of the process performed by the storage subsystem when the access target volume is a P-VOL and the I/O mode thereof is Remote will be described with reference to FIG. 20. At first, the MP 521 transmits an WRFBA command to the storage subsystem (storage subsystem 400-2) having a pair volume (S-VOL) of the access target volume, to instruct to write data to the S-VOL (S4401), and thereafter, waits for a response from the storage subsystem 400-2.

In S4402, when the MP 521 receives a response from the storage subsystem 400-2, the MP 521 determines whether the physical storage area to be allocated to the S-VOL is depleted in the storage subsystem 400-2 or not (S4403), by referring to the contents of the response. If it is determined that the physical storage area to be allocated to the S-VOL is depleted (S4403: Y), the MP 521 returns an error (Stun) to the host 100 (S4405), and ends the process.

If it is determined that the physical storage area to be allocated to the S-VOL is not depleted (S4403: N), the MP 521 determines whether the unused physical storage area in the storage subsystem 400-2 has becomes equal to or smaller than a given threshold or not (S4404). If the unused physical storage area has become equal to or smaller than a given threshold (S4404: Y), the MP 521 returns an error (UA) to the host 100 (S4411), and ends the process. If the unused physical storage area has not become equal to or smaller than a given threshold (S4404: N), the MP 521 returns a GOOD status to the host 100 (S4405), and ends the process.

Figure 21:
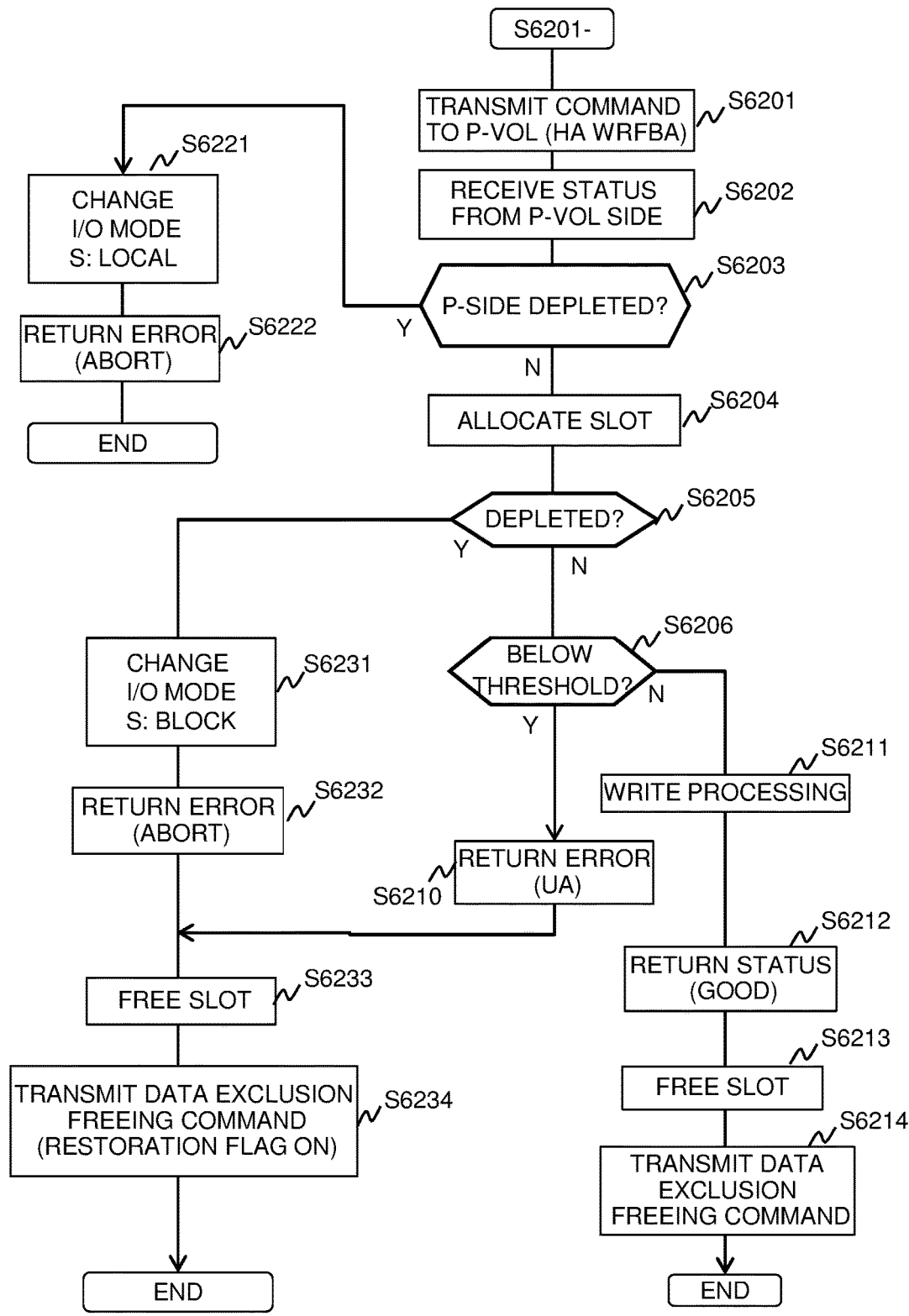
FIG. 21 is a flowchart (4) of a process performed when an error occurs during processing of a WRITE command.

FIG. 21 illustrates a flow of the process performed by the storage subsystem 400 when the access target volume is an S-VOL and the I/O mode thereof is Mirror (hereafter, an example where the storage subsystem 400-2 performs the processes is described).

In S6201, the MP 521 transmits an WRFBA command to the storage subsystem 400-1 having a pair volume (P-VOL) of the access target volume to instruct to store write data into the P-VOL, and waits for a response from the storage subsystem 400-1. Similar to the storage subsystem 400-2, if the storage subsystem 400-1 failed to write data to the P-VOL since the physical storage area to be allocated to the P-VOL is depleted, it returns the result as response information to the storage subsystem 400-2. Further, also when the amount of unused physical storage area to be allocated to the P-VOL has become equal to or smaller than a given threshold, the storage subsystem 400-1 returns the result as response information to the storage subsystem 400-2.

In S6202, when the MP 521 receives the response from the storage subsystem 400-1, the MP 521 refers to the contents of the response, and determines whether the unused physical storage area to be allocated to the P-VOL is depleted or not in the storage subsystem 400-1 (S6203).

In the determination of S6203, if it is determined that the physical storage area is depleted (S6203: Y), the MP 521 performs the processes of S6221 and thereafter. In S6221, the MP 521 changes the I/O mode of the access target logical volume. Specifically, it changes the I/O mode of the S-VOL to "Local". Further, it changes the pair status to "SUSPEND". Then, in S6222, the MP 521 returns an error (ABORT) to the host 100, and ends the process.

On the other hand, when it is determined that the physical storage area is not depleted (S6203: N), the MP 521 executes the cache slot allocation processing (S6204). Next, whether the unused physical storage area to be allocated to the S-VOL is depleted or not is determined in the storage subsystem 400-2 (S6205), and if it is depleted (S6205), the processes of S6231 and thereafter are performed.

In S6231, the MP 521 changes the I/O mode of the access target logical volume. Specifically, it changes the I/O mode of the S-VOL to "Block". Then, in S6232, the MP 521 returns an error (ABORT) to the host 100, and in S6233, executes the cache slot freeing process.

In S6234, the MP 521 performs transmission of the data exclusion freeing command to the storage subsystem 400-1. In S6234, the MP 521 creates a data exclusion freeing command including an instruction to turn the restoration flag ON in the parameter of the data exclusion freeing command. Then, the storage subsystem 400-1 having received the data exclusion freeing command turns the restoration flag (T407) of the volume management table T300 ON (store 1), and stores the information of the access target area designated by the WRITE command (or the WRFBA command) into the position (T408). This is because the data designated by the WRITE command is written in the P-VOL, but data is not written in the S-VOL, and the contents of the P-VOL and the S-VOL have become unidentical.

Regarding the area where the restoration flag (T407) has been set to ON, a process for reflecting the contents of the P-VOL to the S-VOL is performed when an access request targeted to the area is received from the host 100 after the depleted state of the unused physical storage area to be allocated to the S-VOL has been resolved. Thereby, the state where the contents of the P-VOL and the S-VOL is identical (synchronized) can be made again.

When the unused physical storage area to be allocated to the S-VOL is not depleted (S6205: N), the MP 521 determines the amount of unused physical storage area (S6206), and when the unused physical storage area is equal to or smaller than a given threshold (S6206: Y), the MP 521 returns an error (UA) to the host 100 (S6210). Thereafter, the MP 521 frees slots (S6233), transmits a data exclusion freeing command (S6234), and ends the process.

If the unused physical storage area is greater than a given threshold (S6206: N), it executes a write processing (S6211), and returns a GOOD status to the host 100 (S6212). Thereafter, the MP 521 performs a cache slot freeing process (S6213), transmits a data exclusion freeing command to the storage subsystem 400-1 (S6214), and ends the process. Unlike the process of S6234, in the process of S6214, instruction to turn the restoration flag ON is not included in the parameter of the data exclusion freeing command.

Next, we will describe the flow of the process performed by the storage subsystem 400 when the access target volume is an S-VOL and the I/O mode thereof is not Mirror. The process performed when the access target volume is an S-VOL and the I/O mode thereof is Local is the same as that illustrated in FIG. 19, so the description thereof is omitted.

Next, the case where the access target volume is an S-VOL and the I/O mode thereof is Remote will be described with reference to FIG. 22. This process is substantially similar to the process of FIG. 20.

At first, in S6401, the MP 521 transmits an WRFBA command to the storage subsystem (storage subsystem 400-1) having a pair volume (P-VOL) of the access target volume, to thereby instruct writing of write data to the P-VOL, and waits for a response from the storage subsystem 400-1.

In S6402, when the MP 521 receives a response from the storage subsystem 400-1, the MP 521 refers to the response contents, and determines whether the physical storage area to be allocated to the P-VOL in the storage subsystem 400-1 is depleted or not (S6403). When it is determined that the physical storage area to be allocated to the P-VOL is depleted (S6403: Y), the MP 521 returns an error (Stun) to the host 100, and ends the process.

If it is determined that the physical storage area to be allocated to the P-VOL is not depleted (S6403: N), the MP 521 determines whether the unused physical storage area has become equal to or smaller than a given threshold or not in the storage subsystem 400-1 (S6404). If the unused physical storage area has become equal to or smaller than a given threshold (S6404: Y), the MP 521 returns an error (UA) to the host 100 (S6411), and ends the process. If the unused physical storage area has not become equal to or smaller than a given threshold (S6404: N), the MP 521 returns a GOOD status to the host 100 (S6405), and ends the process.

Next, the flow of the processes performed when the storage subsystem 400 receives a WRFBA command will be described with reference to FIGS. 23 and 24. The flow of the processes performed when the storage subsystem 400 receives a WRFBA command has been described with reference to FIG. 8, but the processes illustrated in FIGS. 23 and 24 differ from FIG. 8 in that the processes performed when depletion of the physical storage area has been detected is added, and the other processes are the same.

In the present embodiment, after the storage subsystem 400 has executed a process regarding the WRFBA command, a status in compliance with SCSI standards is returned in order to notify that the process has been performed correctly or an error has occurred. Therefore, when the process has been performed correctly, a GOOD status is returned. Further, if the unused physical storage area of the storage subsystem 400 is depleted, an error (Stun) is returned. If the unused physical storage area of the storage subsystem 400 has become equal to or smaller than a given threshold, an error (UNIT ATTENTION) is returned. However, since the WRFBA command is a uniquely defined command used only among storage subsystems 400, unique information can be used as the status or error information being returned to the command issue source storage subsystem 400.

Figure 24:
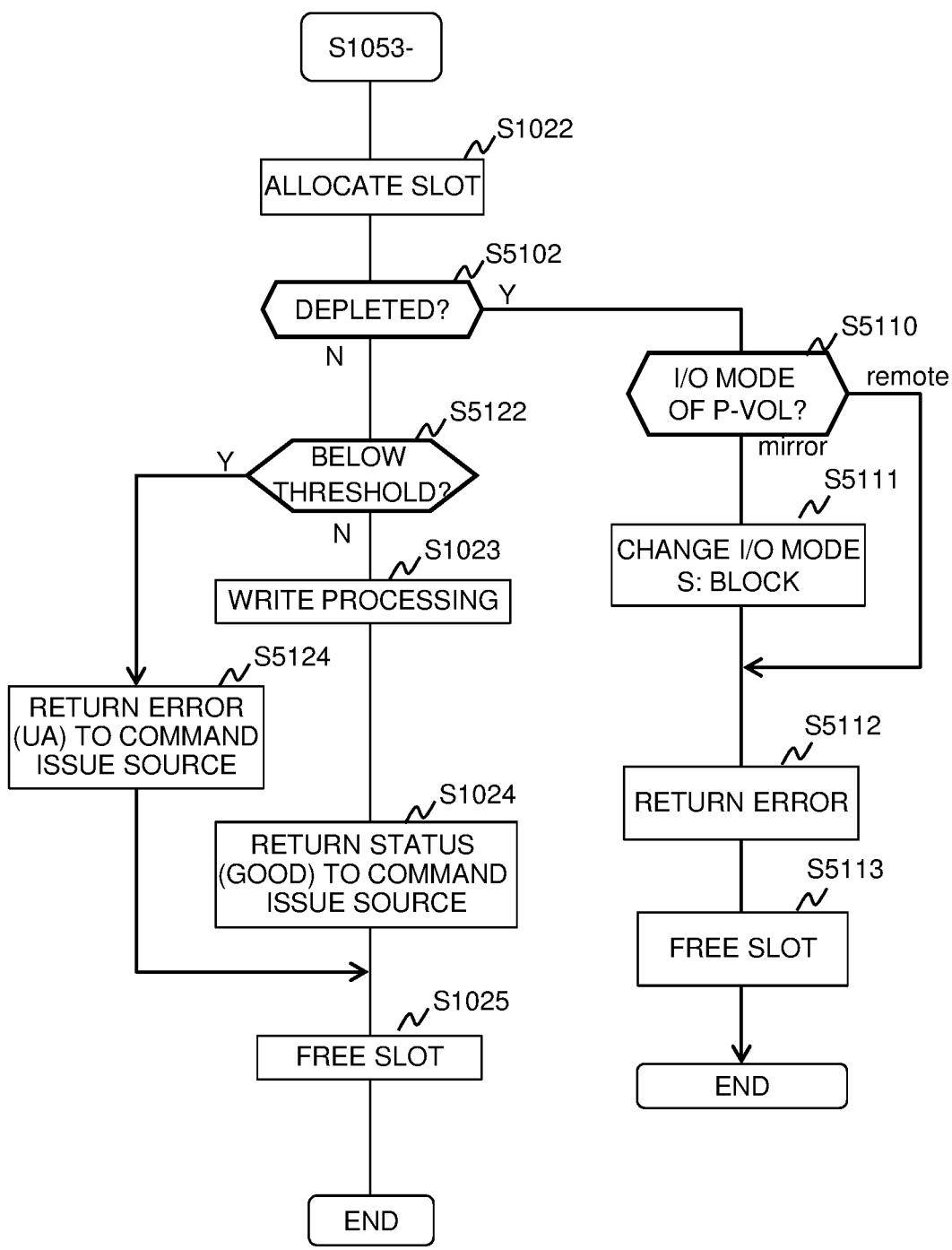
FIG. 24 is a flowchart (2) of a process performed when an error occurs during processing of a WRFBA command.

In FIG. 24, a determination step of whether the physical storage area is depleted or not (S5014, S5015) is placed after the cache slot allocation processing (S1014, S1022). Then, when it is determined that the I/O mode of the S-VOL is Mirror and the physical storage area is depleted (S5014: Y), the MP 521 of the storage subsystem 400 having received the WRFBA command changes the I/O mode of the access target volume (P-VOL) to "Block" (S5221), returns an error (Stun) to the command issue source storage subsystem 400 (S5222), finally executes a cache slot freeing process and a data exclusion fleeing process (S5223), and ends the process. Similarly, when the I/O mode of the S-VOL is Remote, and when it is determined that the physical storage area is depleted (S5015: Y), an error (Stun) is returned to the command issue source storage subsystem 400 (S5222), and finally, a cache slot freeing process (S5223) is executed and the process is ended. However, changing of the I/O mode (S5221) is not performed.

If the access target logical volume being designated by the received WRFBA command is a P-VOL and the I/O mode of the pair volume of the P-VOL (S-VOL) is Mirror (S1011: Mirror), write processing (S1015) to the P-VOL is performed when the physical storage area is not depleted. Then, after the write processing to the P-VOL (S1015) is ended, it waits for the reception of a data exclusion freeing command from the storage subsystem 400 having the S-VOL (S1017).

There may be a case where the physical storage area is depleted in the storage subsystem 400 having the S-VOL. In that case, the data exclusion freeing command received in S1017 includes a notice notifying that the data write to the S-VOL has failed since the physical storage area is depleted. In S1017, when a notice notifying that the data write to the S-VOL has failed had been received, the MP 521 executes the data exclusion freeing process (S1018), and in S5018, changes the I/O mode of the access target volume (P-VOL) to "Local". Then, in S5018, the MP 521 stores 1 in the restoration flag (T407) regarding the row corresponding to the P-VOL in the volume management table T300, and stores the information regarding the area where restoration is necessary in the position (T408).

When the access target logical volume designated by the received WRFBA command is a P-VOL and the I/O mode of the pair volume of the P-VOL (S-VOL) is Remote (S1011: remote), after determining whether the physical storage area is depleted or not (S5015), whether the amount of the unused physical storage area is equal to or smaller than a given threshold or not is determined (S5022). If the amount of the unused physical storage area is not equal to or smaller than the given threshold (S5022: N), similar to FIG. 8, the MP 521 performs the write processing (S1023), responds that the processing has been completed (GOOD status) to the storage subsystem 400 being the issue source of the WRFBA command (S1024), performs the cache slot freeing process (S1025), and ends the process.

On the other hand, when it is determined in S5022 that the unused physical storage area is equal to or smaller than the given threshold (S5022: Y), the MP 521 returns an error (UNIT ATTENTION) to the storage subsystem 400 (400-2) being the issue source of the WRFBA command, so as to notify that the amount of the unused physical storage area has become equal to or smaller than the given threshold (S5024). In this case, the write processing (S1023) will not be performed.

Thereafter, the MP 521 performs a cache slot freeing process (S1025), and ends the process. The above described the difference with FIG. 8 and the other points are the same as the processes described in FIG. 8.

Moreover, if the access target logical volume designated by the received WRFBA command is the S-VOL (S1001: SVOL), the processes of S1053 and thereafter described in FIG. 24 will be performed. This process is similar to the processes of S1053 and thereafter described in FIG. 8. Hereafter, the points that differ from the processes of FIG. 8 will be described.

Figure 23:
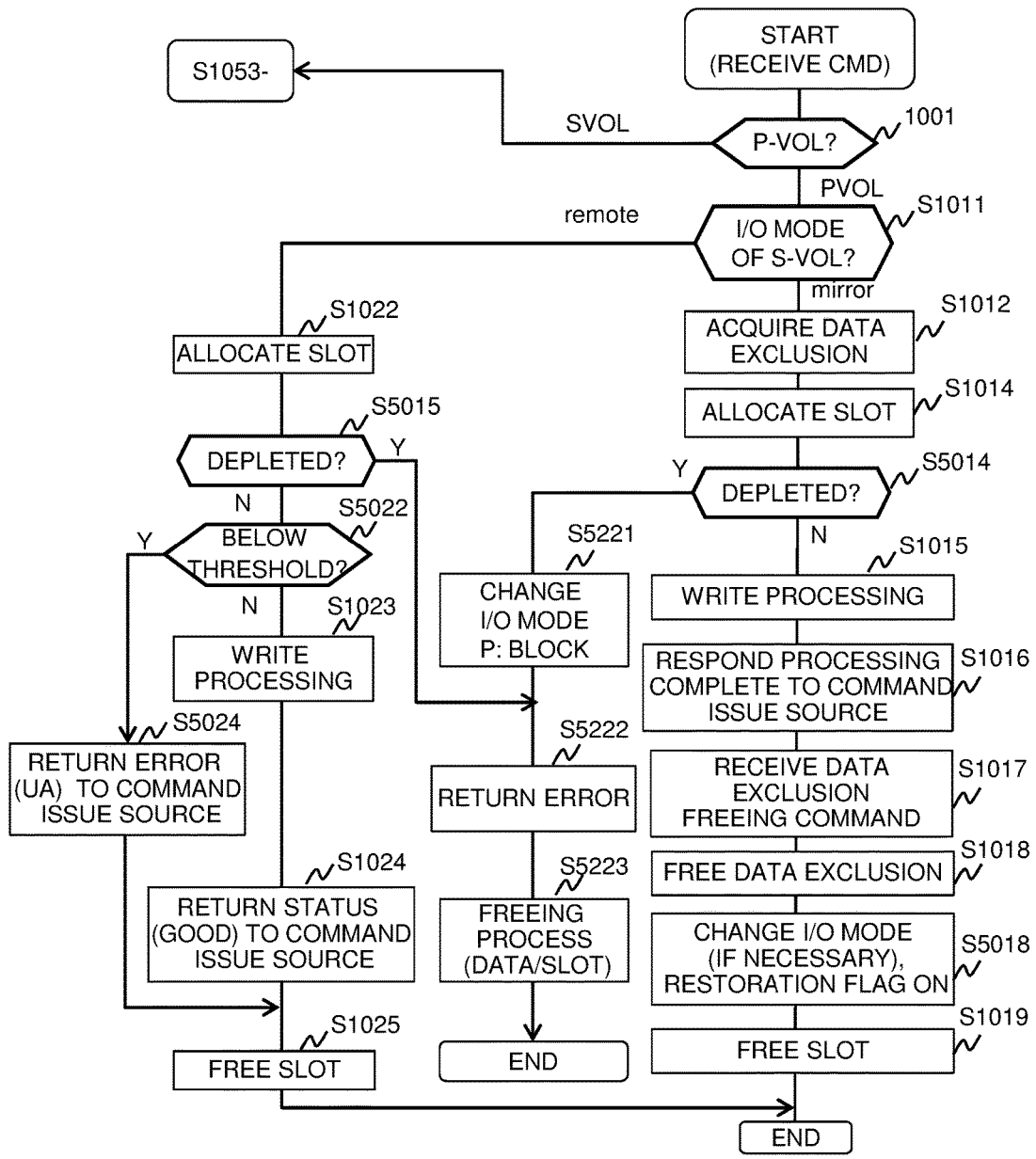
FIG. 23 is a flowchart (1) of a process performed when an error occurs during processing of a WRFBA command.

Similar to the process illustrated in FIG. 23, the determination of whether the physical storage area is depleted or not (S5102) is placed after the cache slot allocation processing (S1022). Then, when it is determined that the physical storage area is depleted (S5102: Y), the MP 521 of the storage subsystem 400 having received the WRFBA command identifies the I/O mode of the P-VOL (S5110). When the I/O mode is a Mirror in S5110, the MP 521 changes the I/O mode of the access target volume (S-VOL) to "Block" (S5111), and returns an error (Stun) to the command issue source storage subsystem 400 (S5112). Finally, the MP 521 performs a cache slot freeing process (S5113), and ends the process. Further, if the I/O mode is a Remote in S5110, the MP 521 executes S5112 and S5113, but it does not execute S5111 (change of I/O mode).

On the other hand, in the determination of S5102, if it is determined that the physical storage area is not depleted (S5102: N), determination on whether the unused physical storage area is equal to or smaller than a given threshold or not is performed (S5122). If the unused physical storage area is not equal to or smaller than a given threshold (S5122: N), similar to the process of FIG. 8, the MP 521 performs a write processing (S1023), a response stating that the process has been completed (GOOD status) to the storage subsystem 400 being the issue source of the WRFBA command (S1024), executes a cache slot freeing process (S1025), and ends the process.

On the other hand, if it is determined in S5022 that the unused physical storage area is equal to or smaller than the given threshold (S5022: Y), the MP 521 returns an error (UNIT ATTENTION) to the storage subsystem 400 (400-1) being the issue source of the WRFBA command, to notify that the unused physical storage area has become equal to or smaller than a given threshold (S5124). In this case, write processing will not be performed.

Thereafter, the MP 521 performs a cache slot freeing process (S1025), and ends the process. The other points are the same as the process described in FIG. 8.

The above has described the flow of the process performed when the storage subsystem 400 has received a WRITE command from the host 100. For reference, we will describe the change of the state of the computer system when the physical storage area is depleted when the host 100 has issued a WRITE command to the volume pair of P-VOL and S-VOL, with reference to FIGS. 27 and 28.

FIG. 27 is a view illustrating the change of the state of the computer system when the physical storage is depleted in the storage subsystem 400 having the P-VOL when the host 100 issues a WRITE command to P-VOL (however, the physical storage area is not depleted in the storage subsystem 400 having the S-VOL). In the example illustrated below, an example is described where the pair status of the volume pair before the host 100 issues a WRITE command is "Pair". Further, in the configuration, the P-VOL exists in the storage subsystem 400-1, and the S-VOL exists in the storage subsystem 400-2.

The state of the computer system before the host 100 issues the WRITE command is called [state 1]. In state 1, when a WRITE command regarding a P-VOL is received, the processing flow illustrated in FIG. 18 is performed in the storage subsystem 400-1. When it detects that the physical storage area is depleted (FIG. 18, S4203), it returns an error (ABORT) to the host (FIG. 18, S4222). Further, the state is changed (FIG. 27 [State 2]) so that the I/O mode of the P-VOL is changed to Block, the I/O mode of the S-VOL is changed to Local, and the pair status is changed to Suspend (FIG. 18, S4221).

In [State 2], since the I/O mode of the P-VOL is set to Block, the host 100 will not issue commands to the P-VOL (the host 100 may retry issuing a command to the P-VOL; however, when the I/O mode of the P-VOL is set to Block, the storage subsystem 400 returns an error to the host 100, and also returns information such as NOT READY and the like stating that access to the P-VOL is not possible, as a detailed information of the error (Sense Key and the like); therefore, the host 100 will no longer issue commands to the P-VOL). Instead, (the alternate path software 1111 of) the host 100 issues an I/O request to the S-VOL. In the storage subsystem 400-2 having the S-VOL, since the physical storage area is not depleted, a write processing to the S-VOL (process illustrated in FIG. 19) is executed. That is, even if the physical storage area is depleted in the storage subsystem 400-1 having the P-VOL, if the physical storage area is not depleted in the storage subsystem 400-2 having the S-VOL, the host 100 can continue operation.

However, as a result of executing the write processing to the S-VOL for several times, when the physical storage area in the storage subsystem 400-2 is also depleted, an error status (Stun) is returned (FIG. 27, [State 3]). By having the error status (Stun) returned, the user of the computer system can recognize that the physical storage area is depleted in the storage subsystem 400. Therefore, the user can resolve the depleted state by adding a physical storage area to the storage subsystem 400, and to recover the state of the volume pair to a normal state (Pair state).

Further, if the physical storage area in the storage subsystem 400 having the S-VOL is depleted when the host 100 issues a WRITE command to the P-VOL (however, the physical storage area is not depleted in the storage subsystem 400 having the P-VOL), the state of the computer system is changed, like [state 1'] through [state 3'] shown in FIG. 28. Hereafter, the change of state will be described with reference to FIG. 28. The example illustrated hereafter is an example where the pair status of the volume pair prior to having the WRITE command issued by the host 100 is "Pair". Further, in the configuration, the P-VOL exists in the storage subsystem 400-1, and the S-VOL exists in the storage subsystem 400-2.

[State 1'] shows the state of the computer system before the host 100 issues the WRITE command. In state 1', when a WRITE command to the P-VOL is received, the process according to the process flow described in FIG. 18 is performed in the storage subsystem 400-1. When it detects that the physical storage area is depleted in the storage subsystem 400-2 having the S-VOL (FIG. 18, S4208), the storage subsystem 400-1 returns an error status (ABORT) to the host 100 (FIG. 18, S4232). Further, the state is changed (FIG. 27, [state 2']) so that the I/O mode of the P-VOL is changed to Local, the I/O mode of the S-VOL is changed to Block, and the pair status is changed to Suspend (FIG. 18, S4231).

In [state 2'], since the I/O mode of the P-VOL is not Block, the host 100 retries to issue the WRITE command to the P-VOL. Since the I/O mode of the P-VOL is Local and the pair status is Suspend (copy to the S-VOL is not performed), when a WRITE command from the host 100 is received, the storage subsystem 400-1 having the P-VOL operates to perform data write to the P-VOL and to return a GOOD status to the host 100.

In other words, similar to the case of FIG. 27, even if the physical storage area is depleted in the storage subsystem 400-2 having the S-VOL, if the physical storage area in the storage subsystem 400-1 having the P-VOL is not depleted, the host 100 can continue operation. Supposing that the I/O node of the P-VOL is changed to Block, similar to [state 2], (the alternate path software 1111 of) the host 100 issues an I/O request to the S-VOL. However in the case of [state 2'], since the physical storage area in the storage subsystem 400-2 having the S-VOL is depleted, WRITE commands cannot be accepted, therefore the host 100 cannot continue operation. Because of it, according to the storage subsystem 400 of the present embodiment, when the state of the computer system transits from [state 1'] to [state 2'], the I/O mode of the P-VOL is set to Local. In the above description, an example has been described where the host 100 issues an I/O command such as a WRITE command to the P-VOL, but a similar operation is performed in the computer system even when the host 100 issues an I/O command to the S-VOL.

The above description illustrated a case where the (unused) physical storage area has been depleted, but continuation of operation is also achieved similarly in the case where other failures occur. Depending on the type of the failure, the I/O mode of the volume in which failure has occurred can be changed to Remote instead of being changed to Block. For example, under the [state 1] in FIG. 27, when failure occurs to the physical storage area (drive 900) of P-VOL and access to the P-VOL is not possible (however, other components are operating normally and the storage subsystem 400-1 having the P-VOL is also operating normally), it is possible to change the I/O mode of the P-VOL to Remote and the I/O mode of the S-VOL to Local.

According to such arrangement, when the host 100 retries to access (such as WRITE to) the P-VOL, since the I/O mode of the P-VOL is Remote, the data according to the WRITE command is written to the S-VOL (via the storage subsystem 400-2 from the storage subsystem 400-1). That is, in addition to enabling continuous operation in the host 100, there is no need to change the access path.

Of course, in this case, the host 100 can access the S-VOL (the storage subsystem 400-2). That is, since the host 100 can use both the access path from the host 100 to the P-VOL and the access path from the host 200 to the P-VOL, the load of the access path can be distributed.

The above description has described the processes performed when the unused physical storage area in the storage subsystem 400 is depleted or when the amount of unused physical storage area has becomes equal to or smaller than a given threshold. The above description has explained a case where the storage subsystem 400 has received a WRITE command, but even when other update type commands (such as WRITE SAME, UNMAP, and ATS commands described above) have been received, it is preferable to similarly cope with the case where the unused physical storage area in the storage subsystem 400 is depleted or when the amount of unused physical storage area has becomes equal to or smaller than a given threshold.

According to the processes described above (processes when a WRITE command has been received), the process to be performed in the case when the unused physical storage area in the storage subsystem 400 is depleted or when the amount of unused physical storage area has becomes equal to or smaller than a given threshold (hereinafter called depleted error processing) is inserted before the data write processing to the logical volume (more accurately, the cache slot allocated to temporarily store the write data to the logical volume) (FIG. 18, S4205 etc.) and after the process for receiving a response from the storage subsystem 400 having the pair volume (FIG. 18, S4207 etc.). Therefore, in order to cope with the state where the unused physical storage area in the storage subsystem 400 is depleted or when the amount of unused physical storage area has becomes equal to or smaller than a given threshold, it is merely necessary to insert the depleted error processing before the data write processing to the logical volume (FIG. 6, S1414 etc.) and after the process of receiving a response from the storage subsystem 400 having the pair volume (FIG. 18, S1416 etc.).

Hereafter, the specific areas in which the depleted error processing should be inserted in the processes of the cases where the WRITE SAME command has been received (FIGS. 6 and 7) are listed. When a WRFBA command is received, the processes illustrated in FIGS. 23 and 24 should be performed instead of the process illustrated in FIG. 8.

(1) Before S1414 of FIG. 6, the processes of S4203 and S4221 through S4223 of FIG. 18 and the processes of S4204 and S4211 through S4213 of FIG. 18 are inserted.

(2) Before S1416 of FIG. 6, the processes of S4208 and S4231 through S4233 of FIG. 18 are inserted.

(3) Before S1423 of FIG. 6, the processes of S4302 and S4311 of FIG. 19 and the processes of S4304 and S4315 of FIG. 19 are inserted.

Figure 20:
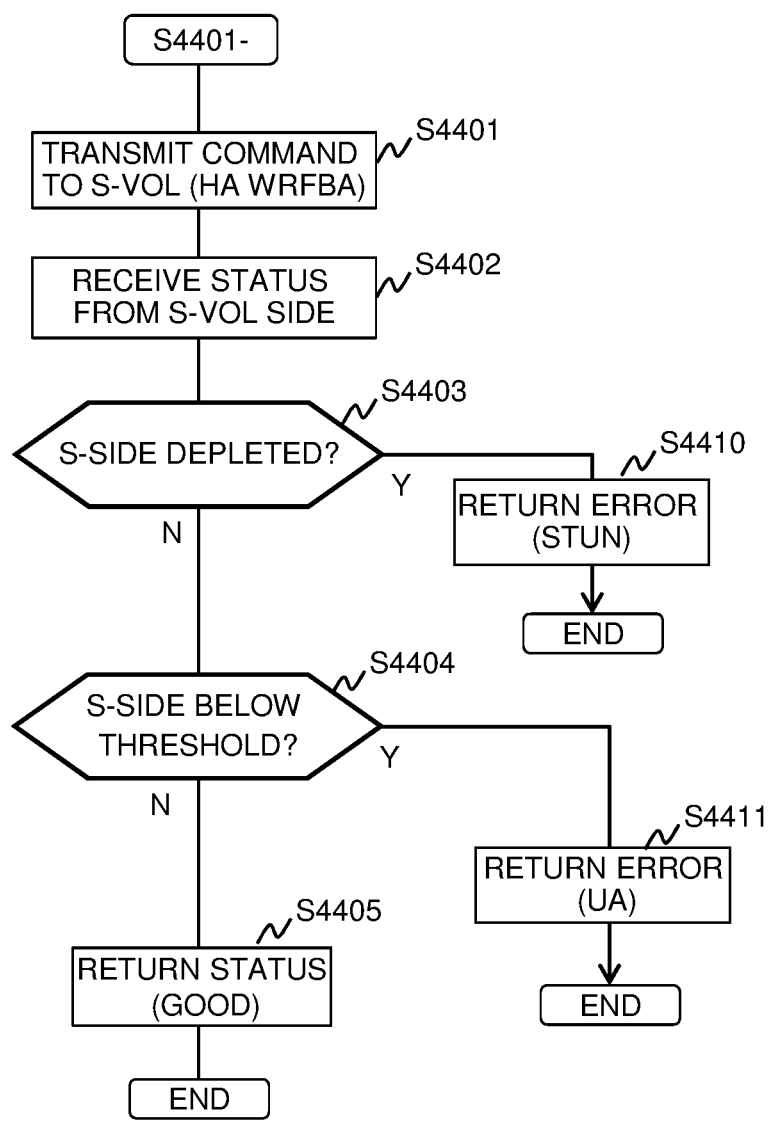
FIG. 20 is a flowchart (3) of a process performed when an error occurs during processing of a WRITE command.

(4) Before S1433 of FIG. 6, the processes of S4403, S4410, S4404 and S4411 of FIG. 20 are inserted.

(5) After S1513 of FIG. 7, the processes of S6203 and S6221 through S6222 of FIG. 21 are inserted.

(6) Before S1515 of FIG. 7, the processes of S6205, S6206, S6210 and S6231 through S5234 of FIG. 21 are inserted.

(7) Before S1523 of FIG. 7, the processes of S4302 and S4311 of FIG. 19 and the processes of S4304 and S4315 of FIG. 19 are inserted.

Figure 22:
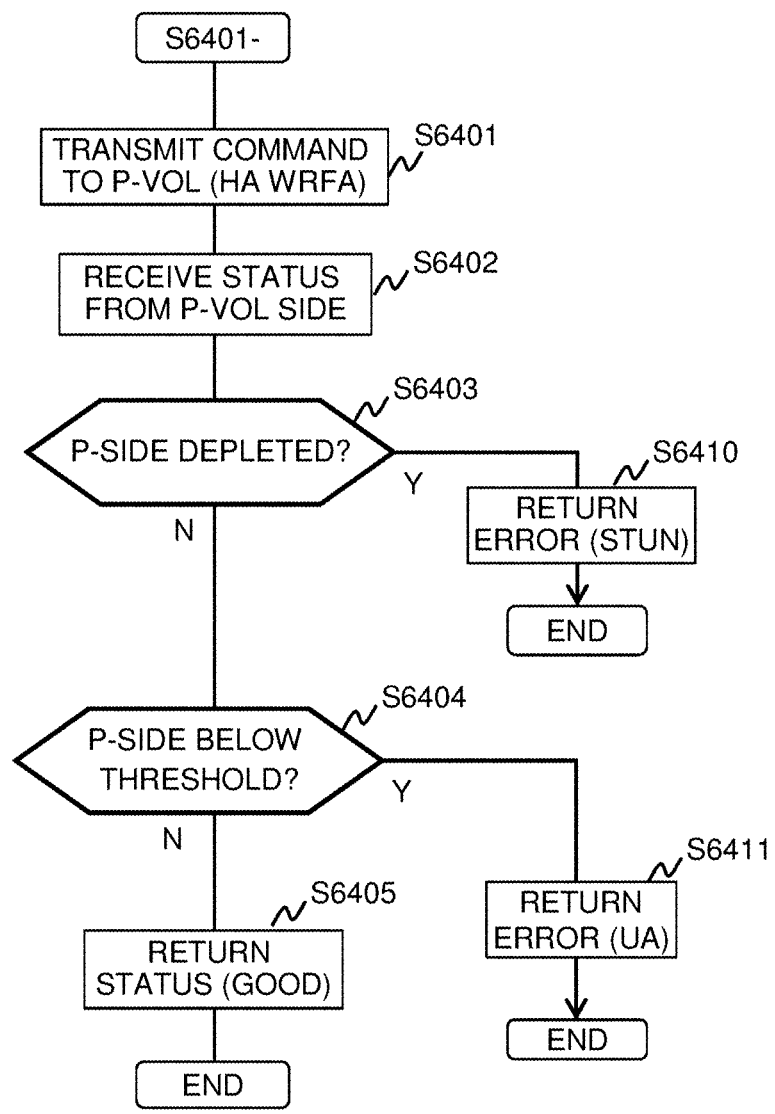

(8) After S1533 of FIG. 7, the processes of S6403, S6410, S6404 and S6411 of FIG. 22 are inserted.

By changing the processes of FIGS. 6 through 8 as described above, appropriate processing can be performed even when the unused physical storage area in the storage subsystem 400 is depleted or when the amount of unused physical storage area has becomes equal to or smaller than a given threshold during execution of processes concerning a WRITE SAME command in the storage subsystem 400. Even further, regarding other commands (UNMAP, ATS), by inserting the depleted error processing before the data write processing to the logical volume and after the process of receiving a response from the storage subsystem 400 having the pair volume, appropriate processes can be performed even if the unused physical storage area is depleted or the amount of unused physical storage area has become equal to or smaller than a given threshold.

The above description has illustrated the contents of the processes performed in the storage system according to the preferred embodiment of the present invention. In the storage system of the present invention, attribute information is set to the volumes of two storage subsystems. When an I/O command is received from the host to a volume, determination is performed on whether to execute the I/O processing to the access target volume or to execute the I/O processing to a pair volume of the access target volume, based on the attribute information of the volume (Local, Remote, Mirror or Block). If the I/O processing is to be executed to both the access target volume and the pair volume thereof, determination is performed regarding which volume the I/O processing should be executed first.

Usually, by setting Mirror attribute as attribute information to each volume (primary volume, secondary volume) of the two storage subsystems, the host can perform data update to either one of the primary volume or secondary volume, and by having either the primary volume or the secondary volume updated, the contents thereof can be reflected in the other volume, so that the primary and secondary volumes can be operated to maintain a duplicated state.

When the unused physical storage area in one storage subsystem is depleted, by changing the attribute information of the volume of the storage subsystem whose unused physical storage area is depleted to Block, the I/O from the host is set to an inacceptable state, while the attribute information of the volume of the remaining storage subsystem is set to Local attribute so that the duplication of volumes will not be performed but the I/O (read, write) of the volume is enabled. Thus, even when the state of the storage subsystem is changed, such as the depletion of the physical storage area, continuous operation of the computer system is enabled.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be added to, deleted from or replaced with the configuration of another embodiment. A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory media such as an IC card, an SD card or a DVD. Only the control lines and information lines considered necessary for description are illustrated in the drawings, and not necessarily all the control lines and information lines required for production are illustrated.

REFERENCE SIGNS LIST

100: Host
210: SAN
220: SAN
300: Storage system
400: Storage subsystem
500: Storage controller
510: Memory
520: MP package
521: MP
521: Local Memory
530: Channel adapter
531: Interface
532: Buffer
540: Disk adapter
900: Drive

The invention claimed is:

1. A method for controlling a computer system comprising a storage system having a first storage subsystem and a second storage subsystem connected to the first storage subsystem, and a host computer connected to the first and second storage subsystems;
  each of the first storage subsystem and the second storage subsystem has a volume, and one or more storage devices, and is capable of receiving an input/output (I/O) command according to SCSI standards from a host computer; the method comprising:
  managing an attribute information indicating at least one of a write order and whether write is enabled or not for each of a first volume in the first storage subsystem and a second volume in the second storage subsystem;
  managing the first volume and the second volume as volumes in a pair relationship where write data from the host computer is written to both the first volume and the second volume;
  configuring the host computer to access both the first volume and the second volume; and
  on the condition that the first storage subsystem receives an I/O command to the first volume from the host computer, determining whether I/O to the first volume and the second volume are required or not based on the attribute information,
  wherein
  the first volume and the second volume have one of the following information as the attribute information: Mirror attribute, Local attribute or Remote attribute;
  the first volume and the second volume have a second attribute information, which is one of the following information: P-VOL attribute indicating that the volume having that attribute should be update first, or S-VOL attribute indicating that the volume having that attribute should be updated second;
  when the Mirror attribute is set as the attribute information to the first volume, processing designated by the I/O command is executed to the first volume and the second volume;
  when the Local attribute is set as the attribute information to the first volume, processing designated by the I/O command is executed only to the first volume; and when the Remote attribute is set as the attribute information to the first volume, processing designated by the I/O command is executed only to the second volume.

2. The method for controlling a computer system according to claim 1, wherein
the storage system manages a storage space of a volume in units of pages, which are areas having a fixed size;
the first storage subsystem is configured to allocate a storage area corresponding to the size of the page from the storage device of the first storage subsystem when an I/O command to the page of the first volume is received;
the second storage subsystem is configured to allocate a storage area corresponding to the size of the page from the storage device of the second storage subsystem when an I/O command to the page of the second volume is received;
on the condition that the host computer is in a state where the first volume and the second volume are recognized as an identical volume based on an identification information of the first volume received from the first storage subsystem and an identification information of the second volume received from the second storage subsystem, and that the storage system receives an I/O command regarding the first volume having the Mirror attribute set thereto as the attribute information from the host computer;
if a storage area allocatable to the first volume is depleted in the first storage subsystem, after setting a Block attribute showing that the I/O command cannot be accepted as the attribute information of the first volume, and setting the Local attribute as the attribute information of the second volume, the storage system returns an error to the host computer;
in response to receiving the error, the host computer issues an I/O command to the second volume instead of the first volume;
the second storage subsystem having received the I/O command to the second volume from the host computer determines whether a storage area allocatable to the second volume is depleted or not;
when the storage area allocatable to the second volume is not depleted, the second storage subsystem performs processes designated by the I/O command to the second volume; and
if the storage area allocatable to the second volume is depleted, the second storage subsystem returns an error information to the host computer stating that the storage area is depleted.

3. A storage system having a first storage subsystem, and a second storage subsystem connected to the first storage subsystem;
each of the first storage subsystem and the second storage subsystem has a volume and one or more storage devices, and is capable of receiving an input/output (I/O) command according to SCSI standards from a host computer;
each of a first volume in the first storage subsystem and a second volume in the second storage subsystem has an attribute information indicating at least one of a write order and whether write is enabled or not;
the first volume and the second volume are managed as volumes in a pair relationship to which write data from the host computer is written;
wherein
when the first storage subsystem receives an I/O command with respect to the first volume from the host computer, the first storage subsystem determines whether I/O to the first volume and the second volume are required or not based on the attribute information,
the first volume and the second volume have one of the following information as the attribute information: Mirror attribute, Local attribute or Remote attribute,
the first volume and the second volume have a second attribute information which is one of the following information: primary volume (P-VOL) attribute indicating that the volume having that attribute should be updated first, or secondary volume (S-VOL) attribute indicating that the volume having that attribute should be updated second,
when the Mirror attribute is set as the attribute information to the first volume, processing designated by the I/O command is executed to the first volume and the second volume,
when the Local attribute is set as the attribute information to the first volume, processing designated by the I/O command is executed only to the first volume, and
when the Remote attribute is set as the attribute information to the first volume, processing designated by the I/O command is executed only to the second volume.

4. The storage system according to claim 1, wherein
when the first storage subsystem receives a WRITE SAME command to the first volume and a pattern data corresponding to one block as I/O command, if the Mirror attribute is set as the attribute information;
the first storage subsystem executes:
a process of storing the received pattern data to all of the areas designated by the WRITE SAME command in the first volume; and
a process of instructing the second storage subsystem to write the received pattern data to all of the areas designated by the WRITE SAME command in the second volume.

5. The storage system according to claim 4, wherein
when the first storage subsystem receives the WRITE SAME command to the first volume and the pattern data corresponding to one block as the I/O command;
the first storage subsystem creates a write data of a given size, the pattern data being written in the whole area of the write data; and
the first storage subsystem makes the second storage subsystem write the received pattern data to all of the areas designated by the WRITE SAME command, by sending another command once or more times to the second storage subsystem, the another command being a command to instruct to write the write data of the given size to a specified location in the second volume and the write data of the given size.

6. The storage system according to claim 4, wherein
when the first storage subsystem receives the WRITE SAME command to the first volume and the pattern data corresponding to one block as the I/O command,
the first storage subsystem makes the second storage subsystem write the received pattern data to all of the areas designated by the WRITE SAME command, by sending a WRITE SAME propagation command designating an area designated by the WRITE SAME command in the second volume and the pattern data to the second storage subsystem.

7. The storage system according to claim 4, wherein
when the first storage subsystem receives the WRITE SAME command to the first volume and the pattern data corresponding to one block as the I/O command, if the S-VOL attribute is set to the first volume;

after the received pattern data is written to all of the areas in the second volume designated by the WRITE SAME command, the first storage subsystem stores the received pattern data to all of the areas in the first volume designated by the WRITE SAME command.

8. The storage system according to claim 4, wherein
when the first storage subsystem receives the WRITE SAME command to the first volume and the pattern data corresponding to one block as the I/O command, if the P-VOL attribute is set to the first volume;
the first storage subsystem stores the received pattern data to all of the areas in the first volume designated by the WRITE SAME command; and thereafter,
instructs the second storage subsystem to write the received pattern data to all of the areas in the second volume designated by the WRITE SAME command.

9. The storage system according to claim 1, wherein
when the first storage subsystem receives an UNMAP command to the first volume as the I/O command,
zero data is stored to all of the areas designated by the UNMAP command of the first volume and/or the second volume based on the attribute information set to the first volume and the second volume.

10. The storage system according to claim 9, wherein
the storage system manages a storage space of the volume in units of pages, which are areas having a fixed size;
the first storage subsystem is configured to allocate a storage area corresponding to the size of the page from the storage device when an I/O command to the page of the first volume is received; and
when zero data is stored in all areas in the page, the first storage subsystem changes the page into the state that no storage area is allocated to the page.

11. The storage system according to claim 1, wherein
when the Mirror attribute is set as the attribute information to the first volume;
when the first storage subsystem receives a COMPARE AND WRITE command to the first volume with a compare data and a write data as the I/O command,
the storage system reads a data from an area designated by the COMPARE AND WRITE command out of a volume having the P-VOL attribute from the first and second volumes, and compares the read data with the compare data; and
if the contents of the read data and the compare data are the same, stores the write data to the volume having the P-VOL attribute, and thereafter, stores the writes data to the volume having the S-VOL attribute.

12. The storage system according to claim 1, wherein
the storage system manages a storage space of a volume in units of pages, which are areas having a fixed size;
the first storage subsystem is configured to allocate a storage area corresponding to a size of the page from the storage device in the first storage subsystem when an I/O command to the page of the first volume is received;
the second storage subsystem is configured to allocate a storage area corresponding to the size of the page from the storage device in the second storage subsystem when an I/O command to the page of the second volume is received;
when the storage system receives an I/O command to the first volume or the second volume having the Mirror attribute as the attribute information from the host computer;
if the storage area allocatable to the first volume is depleted in the first storage subsystem, after setting a Block attribute showing that the I/O command cannot be accepted as the attribute information of the first volume, and setting the Local attribute as the attribute information of the second volume, an error is returned to the host computer; and
if the storage area allocatable to the second volume is depleted in the second storage subsystem, after setting the Block attribute showing that the I/O command cannot be accepted as the attribute information of the second volume, and setting the Local attribute as the attribute information of the first volume, an error is returned to the host computer.

13. The storage system according to claim 12, wherein
when the first storage subsystem receives the I/O command to the first volume from the host computer after returning the error to the host computer;
if the Local attribute is set as the attribute information to the first volume, the first storage subsystem determines whether the storage area allocatable to the first volume is depleted or not;
if the storage area allocatable to the first volume is not depleted, the first storage subsystem performs a process designated by the I/O command to the first volume; and
if the storage area allocatable to the first volume is depleted, the first storage subsystem returns an error information to the host computer showing that the storage area is depleted.

* * * * *